(12) United States Patent
Kobayashi et al.

(10) Patent No.: US 12,464,104 B2
(45) Date of Patent: Nov. 4, 2025

(54) THREE-DIMENSIONAL VIDEO IMAGING DEVICE

(71) Applicant: JVCKENWOOD Corporation, Yokohama (JP)

(72) Inventors: Toshihide Kobayashi, Yokohama (JP); Shogo Masuda, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/080,697

(22) Filed: Mar. 14, 2025

(65) Prior Publication Data

US 2025/0220150 A1    Jul. 3, 2025

Related U.S. Application Data

(63) Continuation of application No. PCT/JP2023/022064, filed on Jun. 14, 2023.

(30) Foreign Application Priority Data

Sep. 20, 2022   (JP) .................................. 2022-149232

(51) Int. Cl.
| | |
|---|---|
| *H04N 23/11* | (2023.01) |
| *H04N 13/243* | (2018.01) |
| *H04N 13/254* | (2018.01) |
| *H04N 13/296* | (2018.01) |
| *H04N 25/50* | (2023.01) |

(52) U.S. Cl.
CPC ......... *H04N 13/254* (2018.05); *H04N 13/243* (2018.05); *H04N 13/296* (2018.05); *H04N 23/11* (2023.01); *H04N 25/50* (2023.01)

(58) Field of Classification Search
CPC .. H04N 13/254; H04N 13/243; H04N 13/296; H04N 23/11; H04N 25/50; H04N 25/705; H04N 13/239; H04N 13/271; H04N 23/13; H04N 23/16; H04N 23/45; H04N 23/55; H04N 23/56; H04N 23/60; G01B 11/25; G01C 3/06; G02B 7/32; G03B 35/10

See application file for complete search history.

(56) References Cited

U.S. PATENT DOCUMENTS

2019/0361252 A1* 11/2019 Nagae ................ A61B 1/00186

FOREIGN PATENT DOCUMENTS

JP       2020-027174 A       2/2020

* cited by examiner

*Primary Examiner* — Hesham K Abouzahra
(74) *Attorney, Agent, or Firm* — PROCOPIO, CORY, HARGREAVES & SAVITCH LLP

(57) ABSTRACT

A three-dimensional video imaging device includes a light source unit, a three-chip imaging element unit, and a processing unit. The three-chip imaging element unit includes a first prism, a reflection dichroic film, a first imaging element, a second imaging element that is a short-range time-of-flight (TOF) sensor, a third imaging element, a second prism, a half mirror, and a third prism. The processing unit includes an emission control unit, a second imaging element control unit, a third imaging element control unit, a first distance data calculation unit, a second distance data calculation unit, a measurement range determination unit, and a distance data output switching unit.

6 Claims, 27 Drawing Sheets

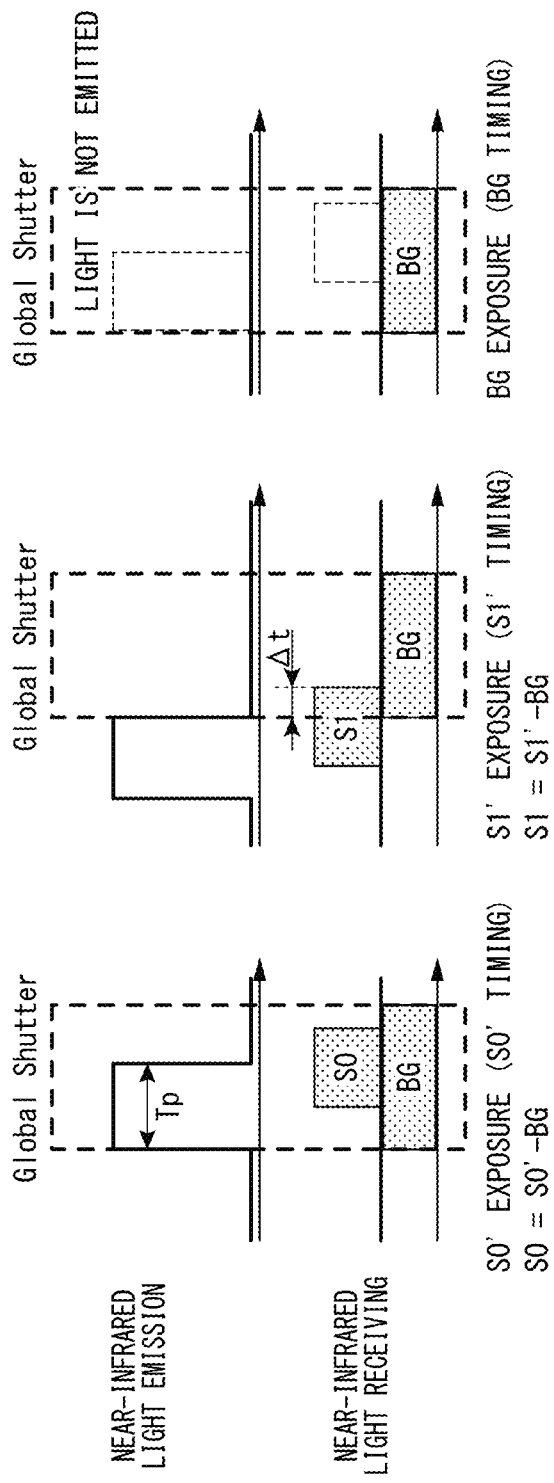

SO' EXPOSURE
SO = SO' −BG

S1' EXPOSURE
S1 = S1' −BG

BG EXPOSURE

SO' EXPOSURE
SO = SO' −BG

S1' EXPOSURE
S1 = S1' −BG

BG EXPOSURE

GLOBAL SHUTTER PERIOD GS1 = Tp + (1000 mm − 300 mm − 2 × 300 mm × 0.01)/C IS NEEDED

S0' EXPOSURE
S0 = S0'−BG

S1' EXPOSURE
S1 = S1'−BG

BG EXPOSURE

S0' EXPOSURE
S0 = S0'−BG

S1' EXPOSURE
S1 = S1'−BG

BG EXPOSURE

GLOBAL SHUTTER PERIOD GS2 = Tp + (4000 mm − 1000 mm + 2 × 1000 mm × 0.1)/C IS NEEDED

WHEN SUBJECT DISTANCE Far_max (mm) IS EXCEEDED AREA[2:0]=4

WHEN SUBJECT DISTANCE 300 mm IS EXCEEDED AREA[2:0]=1

WHEN SUBJECT DISTANCE 950 mm IS EXCEEDED, AND AT TIME OF OVERLAPPING OF NOT MORE THAN 1050 mm
AREA[2:0]=2

THREE-DIMENSIONAL VIDEO IMAGING DEVICE

CROSS REFERENCE TO RELATED APPLICATION

This application is a bypass continuation of PCT/JP2023/022064, filed Jun. 14, 2023, which claims priority to Japanese Patent Application No. 2022-149232, filed Sep. 20, 2022, the contents of both of which are incorporated herein by reference.

The present invention relates to a three-dimensional video imaging device.

BACKGROUND

Patent Document 1 describes an electromagnetic wave detection device in which optical axes of a plurality of sensors may be consistent with each other. Also, Patent Document 1 describes that one object may be detected by an image sensor of visible light, an image sensor of infrared light, or the like, that incident electromagnetic waves are separated into electromagnetic waves with different wavelengths and are caused to be incident on a plurality of sensors, that images of a certain object seen by the sensors in the same direction are detected as images of electromagnetic waves with a plurality of different wavelengths, and the like. The electromagnetic wave detection device described in Patent Document 1 includes a first prism, a second prism, a third prism, and a first layer and a second layer (at least one of a visible light reflection coating, a half mirror, a beam splitter, a dichroic mirror, a cold mirror, a hot mirror, a meta-surface, a short pass filter, a long pass filter, a band pass filter, and a deflection element).

Unlike the electromagnetic wave detection device described in Patent Document 1, an imaging device that includes a red-green-blue (RGB) lens and sensor and an infrared image lens and sensor, obtains RGB image data, and obtains a distance from infrared image data is conceivable. However, since parallax occurs between the RGB lens and the infrared time-of-flight (TOF) lens in such an imaging device, processing of correcting the parallax is needed to apply the imaging device to a system that synthesizes RGB image data and distance data.

Also, a method using one TOF sensor to perform short-range measurement and long-range measurement for each frame by changing a shutter speed (exposure period) and an exposure timing of the TOF sensor is conceivable. However, the distance obtained from a measurement result is not smoothly switched in a case where an object (subject) moves according to the method. Also, since a frame rate of the distance obtained by synthesizing frame data obtained through the short-range measurement and frame data obtained in the long-range measurement is ½ of an original frame rate of the TOF sensor, it is not possible to address a smooth motion.

CITATION LIST

Patent Document

Patent Document 1: Japanese Unexamined Patent Application, First Publication No. 2020-027174

SUMMARY

An aspect of the present embodiment is a three-dimensional video imaging device including: a light source unit configured to irradiate a subject with infrared light; a three-chip imaging element unit on which reflected light of the infrared light emitted by the light source unit and reflected by the subject and reflected light of visible light from the subject are incident; and a processing unit configured to perform control of the light source unit and the three-chip imaging element unit and processing of a signal output from the three-chip imaging element unit, in which the three-chip imaging element unit includes a first prism on which the infrared light and the visible light from the subject are incident, a reflection dichroic film configured to reflect the visible light and transmit the infrared light out of the infrared light and the visible light that have been incident on the first prism, a first imaging element configured to receive the visible light reflected by the reflection dichroic film, a second prism on which the infrared light transmitted by the reflection dichroic film is incident, a half mirror configured to reflect a part of the infrared light that has been incident on the second prism and transmit a remainder of the infrared light that has been incident on the second prism, a third prism on which the infrared light transmitted by the half mirror is incident, one of a second imaging element and a third imaging element configured to receive the infrared light transmitted by the half mirror, and the other one of the second imaging element and the third imaging element configured to receive the infrared light reflected by the half mirror, the second imaging element is a short-range time-of-flight (TOF) sensor used to measure a short range, which is a distance range from a short-distance minimum value to a short-distance maximum value, the third imaging element is a long-range TOF sensor used to measure a long range, which is a distance range that is further than the short range and is a distance range from a long-distance minimum value to a long-distance maximum value, the second imaging element includes a first part configured to accumulate an electric charge at a first exposure timing of the second imaging element, which is an exposure timing of the second imaging element, at least most of a light emission period of the light source unit being included in an exposure period of the second imaging element, and a second part configured to accumulate an electric charge at a second exposure timing of the second imaging element, which is an exposure timing of the second imaging element, the exposure period of the second imaging element starting after the light emission period of the light source unit ends, a third imaging element includes a first part configured to accumulate an electric charge at a first exposure timing of the third imaging element, which is an exposure timing of the third imaging element, at least a part of the exposure period of the light source unit being included in an exposure period of the third imaging element, and a second part configured to accumulate an electric charge at a second exposure timing of the third imaging element, which is an exposure timing of the third imaging element, the exposure period of the third imaging element starting after the light emission period of the light source unit ends, the processing unit includes an emission control unit configured to perform light emission control of the light source unit, a second imaging element control unit configured to control the exposure timing of the second imaging element, a third imaging element control unit configured to control the exposure timing of the third imaging element, a first distance data calculation unit configured to calculate first distance data indicating a distance between the three-dimensional video imaging device and the subject on the basis of at least the electric charge accumulated in the first part of the second imaging element and the electric charge accumulated in the second part of the second imaging element, a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element, a measurement range determination unit configured to determine at least which of the short range and the long range distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and a distance data output switching unit configured to output the first distance data calculated by the first distance data calculation unit in a case where the measurement range determination unit determines that the distance between the three-dimensional video imaging device and the subject measured by the three-dimensional video imaging device is included in the short range and output the second distance data calculated by the second distance data calculation unit in a case where the measurement range determination unit determines that the distance between the three-dimensional video imaging device and the subject measured by the three-dimensional video imaging device is included in the long range.

An aspect of the present embodiment is a three-dimensional video imaging device including: a light source unit configured to irradiate a subject with infrared light; a three-chip imaging element unit on which reflected light of the infrared light emitted by the light source unit and reflected by the subject and reflected light of visible light from the subject are incident; and a processing unit configured to perform control of the light source unit and the three-chip imaging element unit and processing of a signal output from the three-chip imaging element unit, in which the three-chip imaging element unit includes a first prism on which the infrared light and the visible light from the subject are incident, a reflection dichroic film configured to reflect the visible light and transmit the infrared light out of the infrared light and the visible light that have been incident on the first prism, a first imaging element configured to receive the visible light reflected by the reflection dichroic film, a second prism on which the infrared light transmitted by the reflection dichroic film is incident, a half mirror configured to reflect a part of the infrared light that has been incident on the second prism and transmit a remainder of the infrared light that has been incident on the second prism, a third prism on which the infrared light transmitted by the half mirror is incident, one of a second imaging element and a third imaging element configured to receive the infrared light transmitted by the half mirror, and the other one of the second imaging element and the third imaging element configured to receive the infrared light reflected by the half mirror, the second imaging element is a short-range time-of-flight (TOF) sensor used to measure a distance range from a short-distance minimum value to a short-distance maximum value, the third imaging element is a long-range TOF sensor used to measure a distance range, which is a distance range that is further than the distance range from the short-distance minimum value to the short-distance maximum value and is a distance range from a long-distance minimum value to a long-distance maximum value, a part of the distance range from the short-distance minimum value to the short-distance maximum value and a part of the distance range from the long-distance minimum value to the long-distance maximum value overlap with each other and configure an overlapping measurement range, a range obtained by excluding the overlapping measurement range from the distance range from the short-distance minimum value to the short-distance maximum value is a short-distance measurement range, a range obtained by excluding the overlapping measurement range from the distance range from the long-distance minimum value to the long-distance maximum value is a long-distance measurement range, the second imaging element includes a first part configured to accumulate an electric charge at a first exposure timing of the second imaging element, which is an exposure timing of the second imaging element, at least most of a light emission period of the light source unit being included in an exposure period of the second imaging element, and a second part configured to accumulate an electric charge at a second exposure timing of the second imaging element, which is an exposure timing of the second imaging element, the exposure period of the second imaging element starting after the light emission period of the light source unit ends, the third imaging element includes a first part configured to accumulate an electric charge at a first exposure timing of the third imaging element, which is an exposure timing of the third imaging element, at least a part of the exposure period of the light source unit being included in an exposure period of the third imaging element, and a second part configured to accumulate an electric charge at a second exposure timing of the third imaging element, which is an exposure timing of the third imaging element, the exposure period of the third imaging element starting after the light emission period of the light source unit ends, the processing unit includes an emission control unit configured to perform light emission control of the light source unit, a second imaging element control unit configured to control the exposure timing of the second imaging element, a third imaging element control unit configured to control the exposure timing of the third imaging element, a first distance data calculation unit configured to calculate first distance data indicating a distance between the three-dimensional video imaging device and the subject on the basis of at least the electric charge accumulated in the first part of the second imaging element and the electric charge accumulated in the second part of the second imaging element, a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element, a measurement range determination unit configured to determine at least which of the short-distance measurement range, the overlapping measurement range, and the long-distance measurement range distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and a distance data output switching unit configured to output the first distance data calculated by the first distance data calculation unit in a case where the measurement range determination unit determines that the distance between the three-dimensional video imaging device and the subject measured by the three-dimensional video imaging device is included in the short-distance measurement range, output the second distance data calculated by the second distance data calculation unit in a case where the measurement range determination unit determines that the distance between the three-dimensional video imaging device and the subject measured by the three-dimensional video imaging device is included in the long-distance measurement range, and mix and output the first distance data calculated by the first distance data calculation unit and the second distance data calculated by the distance data calculation unit in a case where the measurement range determination unit determines that the distance between the three-dimensional video imaging device and the subject measured by the three-dimensional video imaging device is included in the overlapping measurement range.

An aspect of the present embodiment is a three-dimensional video imaging device including: a light source unit configured to irradiate a subject with infrared light; a three-chip imaging element unit on which reflected light of the infrared light emitted by the light source unit and reflected by the subject and reflected light of visible light from the subject are incident; and a processing unit configured to perform control of the light source unit and the three-chip imaging element unit and processing of a signal output from the three-chip imaging element unit, in which the three-chip imaging element unit includes a first prism on which the infrared light and the visible light from the subject are incident, a reflection dichroic film configured to reflect the visible light and transmit the infrared light out of the infrared light and the visible light that have been incident on the first prism, a first imaging element configured to receive the visible light reflected by the reflection dichroic film, a second prism on which the infrared light transmitted by the reflection dichroic film is incident, a half mirror configured to reflect a part of the infrared light that has been incident on the second prism and transmit a remainder of the infrared light that has been incident on the second prism, a third prism on which the infrared light transmitted by the half mirror is incident, one of a second imaging element and a third imaging element configured to receive the infrared light transmitted by the half mirror, and the other one of the second imaging element and the third imaging element configured to receive the infrared light reflected by the half mirror, the second imaging element is a short-range time-of-flight (TOF) sensor used to measure a short range, which is a distance range from a short-distance minimum value to a short-distance maximum value, the third imaging element is a long-range TOF sensor used to measure a long range, which is a distance range that is further than the short range and is a distance range from a long-distance minimum value to a long-distance maximum value, the short-distance maximum value is smaller than the long-distance minimum value, the second imaging element includes a first part configured to accumulate an electric charge at a first exposure timing of the second imaging element, which is an exposure timing of the second imaging element, at least most of a light emission period of the light source unit being included in an exposure period of the second imaging element, and a second part configured to accumulate an electric charge at a second exposure timing of the second imaging element, which is an exposure timing of the second imaging element, the exposure period of the second imaging element starting after the light emission period of the light source unit ends, the third imaging element includes a first part configured to accumulate an electric charge at a first exposure timing of the third imaging element, which is an exposure timing of the third imaging element, at least a part of the light emission period of the light source unit being included in an exposure period of the third imaging element, and a second part configured to accumulate an electric charge at a second exposure timing of the third imaging element, which is an exposure timing of the third imaging element, the exposure period of the third imaging element starting after the light emission period of the light source unit ends, and the processing unit includes an emission control unit configured to perform light emission control of the light source unit, a second imaging element control unit configured to control the exposure timing of the second imaging element, a third imaging element control unit configured to control the exposure timing of the third imaging element, a first distance data calculation unit configured to calculate first distance data indicating the distance between the three-dimensional video imaging device and the subject on the basis of at least the electric charge accumulated in the first part of the second imaging element and the electric charge accumulated in the second part of the second imaging element, a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element, a measurement range determination unit configured to determine at least which of the short range, the long range, and a range that is greater than the short-distance maximum value and is smaller than the long-distance minimum value the distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and a distance data output switching unit configured to output the first distance data calculated by the first distance data calculation unit in a case where the measurement range determination unit determines that the distance between the three-dimensional video imaging device and the subject measured by the three-dimensional video imaging device is included in the short range, output the second distance data calculated by the second distance data calculation unit in a case where the measurement range determination unit determines that the distance between the three-dimensional video imaging device and the subject measured by the three-dimensional video imaging device is included in the long range, and output zero as distance data in a case where the measurement range determination unit determines that the distance between the three-dimensional video imaging device and the subject measured by the three-dimensional video imaging device is included in the range that is greater than the short-distance maximum value and is smaller than the long-distance minimum value.

BRIEF DESCRIPTION OF DRAWINGS

FIG. 6B is a diagram showing mechanisms of three-exposure charge accumulation and distance measurement of a first exposure timing of the second imaging element 12E2.

FIG. 6C is a diagram showing mechanisms of three-exposure charge accumulation and distance measurement of a second imaging element 12E2.

FIG. 6D is a diagram showing mechanisms of three-exposure charge accumulation and distance measurement of a third exposure timing of the second imaging element 12E2.

DETAILED DESCRIPTION

Hereinafter, embodiments of a three-dimensional video imaging device according to the present invention will be described with reference to the accompanying drawings.

First Embodiment

Figure 1:
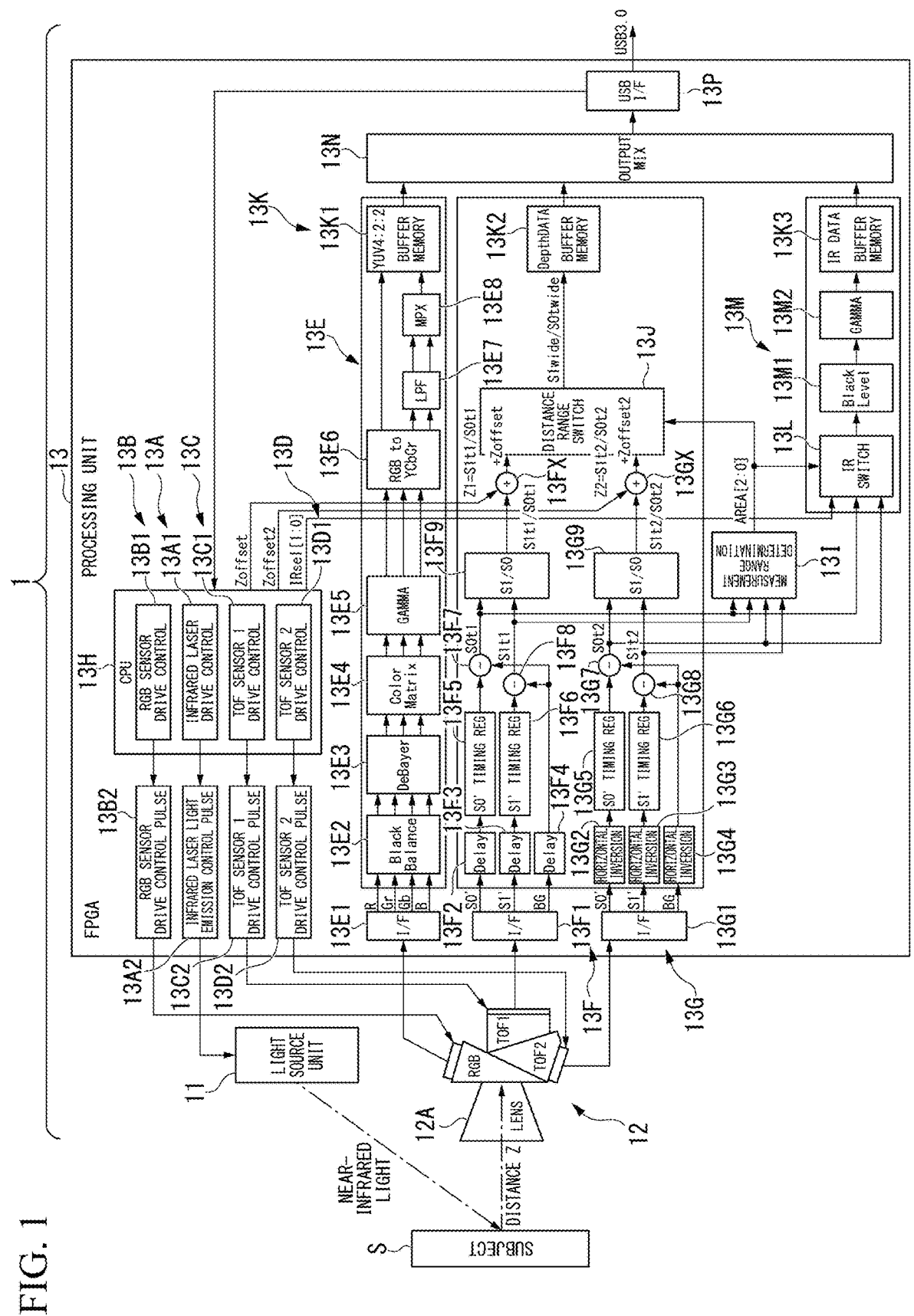
FIG. 1 is a diagram illustrating an example of a three-dimensional video imaging device 1 according to a first embodiment.

FIG. 1 is a diagram illustrating an example of a three-dimensional video imaging device 1 according to a first embodiment.

In the example illustrated in FIG. 1, the three-dimensional video imaging device 1 includes a light source unit 11, a three-chip imaging element unit 12, and a processing unit 13. The light source unit 11 irradiates a subject S with infrared light (specifically, distance measurement light).

In the example illustrated in FIG. 1, the light source unit 11 is configured of an infrared laser diode array. In another example, the light source unit 11 may be configured of a light source unit other than the infrared laser diode array, such as an infrared light emitting diode (LED), for example. In the example illustrated in FIG. 1, a laser light-emitting element with a light output peak at a wavelength of 850 nm is used.

In the example illustrated in FIG. 1, the subject S is irradiated not only with the infrared light from the light source unit 11 but also visible light from the sun, an illumination facility (not illustrated), and the like. Therefore, reflected light of the infrared light emitted by the light source unit 11 and reflected by the subject S and reflected light of the visible light from the subject S (that is, reflected light of the of the visible light emitted by the sun, the illumination facility, and the like and reflected by the subject S) are incident on the three-chip imaging element unit 12.

Figure 2:
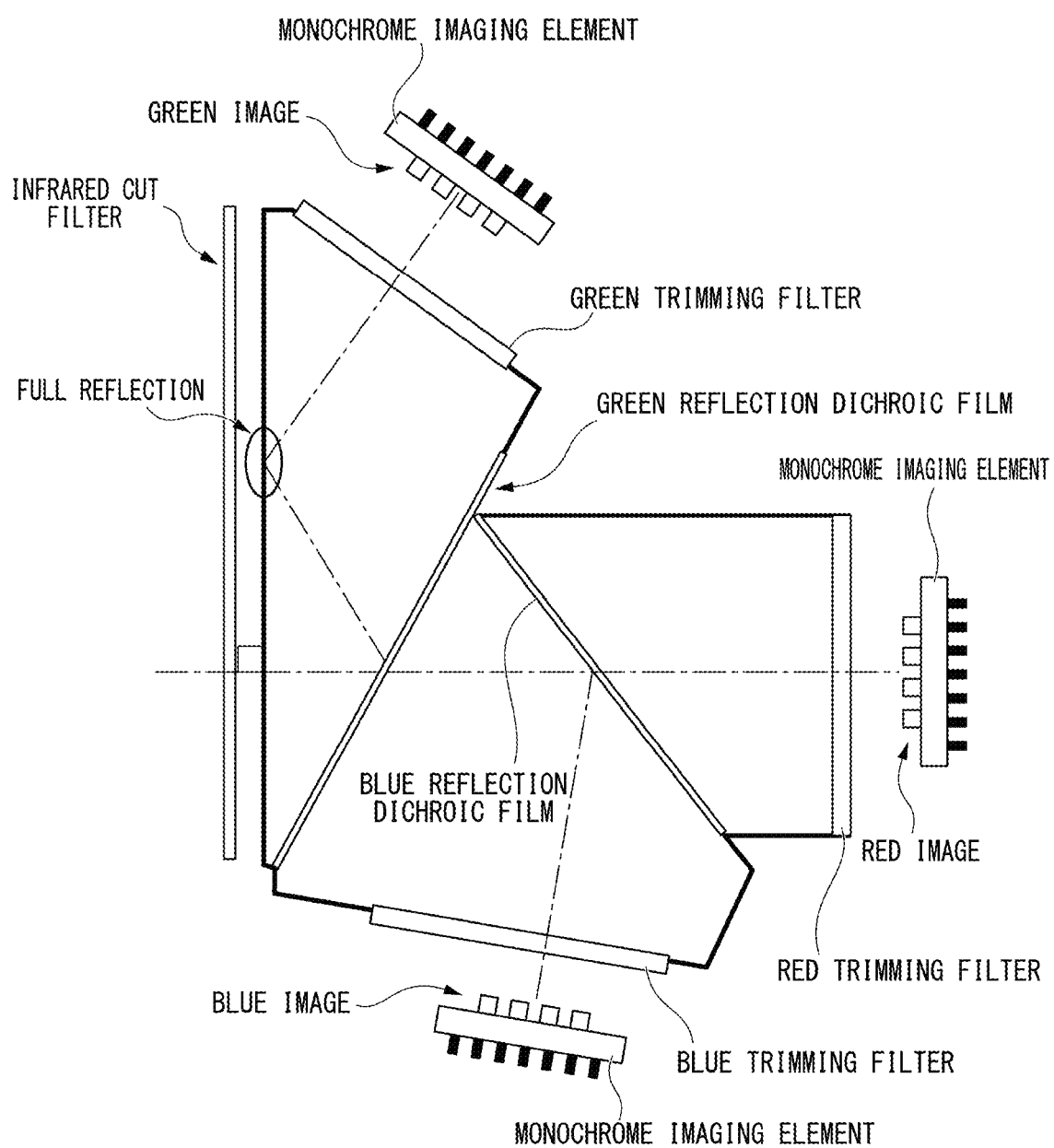
FIG. 2 is a diagram showing an example of a general technique with a configuration similar to the configuration of a three-chip imaging element unit 12 illustrated in FIG. 1.

FIG. 2 is a diagram showing an example of a general technique with a configuration similar to a configuration of the three-chip imaging element unit 12 illustrated in FIG. 1. Specifically, FIG. 2 illustrates an example of a prism of a general RGB three-chip camera.

In the example illustrated in FIG. 2, a part of a visible light transmitted by an infrared cut filter is reflected by a green reflection dichroic film and is then incident on a green monochrome imaging element (complementary metal oxide semiconductor (CMOS) sensor) via a green trimming filter. A part of the remainder of the visible light transmitted by a blue reflection dichroic film in the part of the visible light transmitted by the green reflection dichroic film is incident on a red monochrome imaging element (CMOS sensor) via a red trimming filter, and the remainder of the visible light transmitted by the green reflection dichroic film is reflected by a blue reflection dichroic film and is then incident on a blue monochrome imaging element (CMOS sensor) via a blue trimming filter. In other words, the wavelength of the visible light is split into a red wavelength band region, a green wavelength band region, and a blue wavelength band region, the visible light is incident on the monochrome imaging elements thereof, and an R signal, a G signal, and a B signal are obtained.

Figure 3:
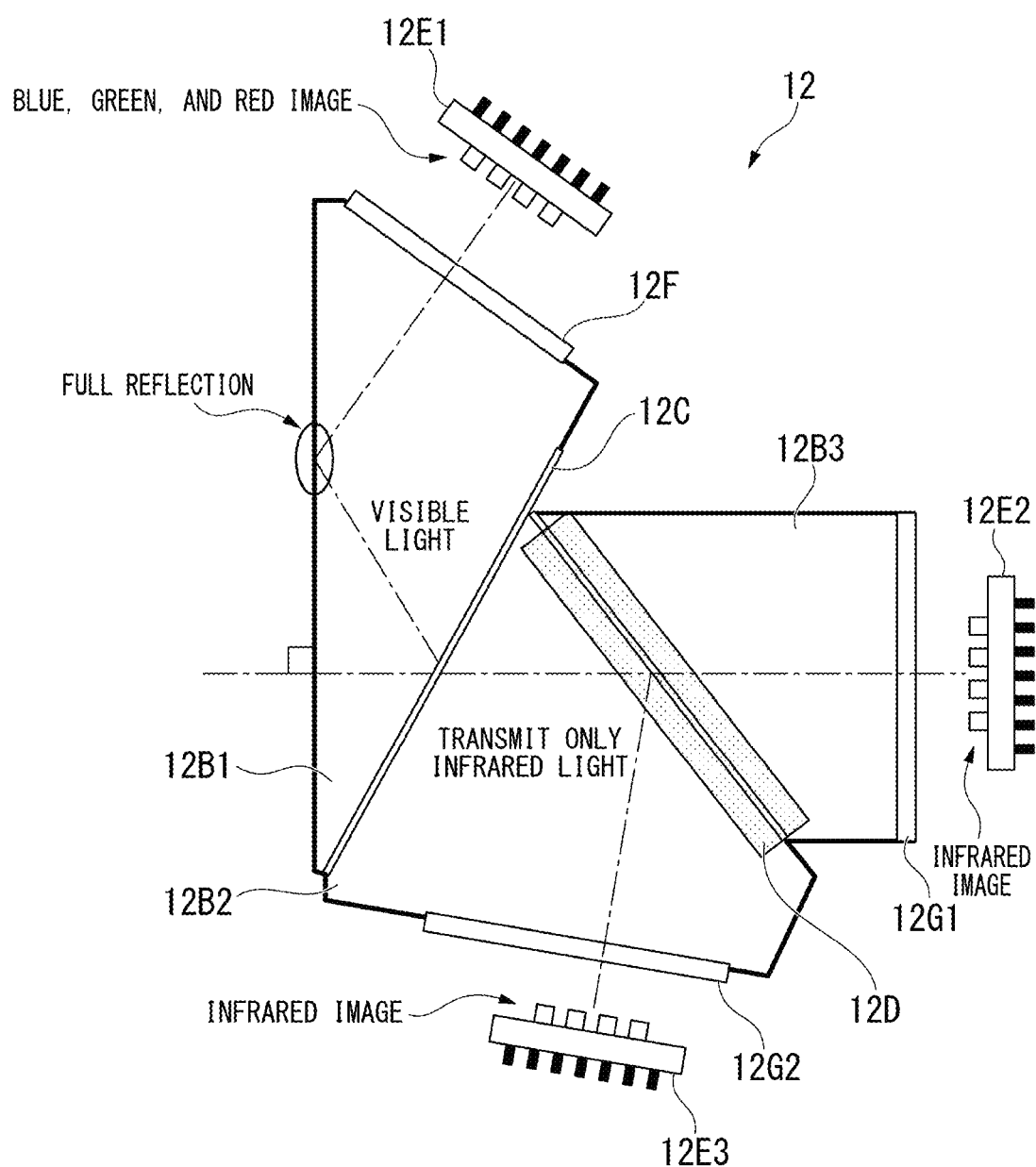
FIG. 3 is a diagram illustrating a part of the three-chip imaging element unit 12 illustrated in FIG. 1 in an enlarged manner.

FIG. 3 is a diagram illustrating a part of the three-chip imaging element unit 12 illustrated in FIG. 1 in an enlarged manner.

In the example illustrated in FIG. 3, the three-chip imaging element unit 12 includes a lens 12A (see FIG. 1), a first prism 12B1, a second prism 12B2, a third prism 12B3, a reflection dichroic film 12C, a half mirror 12D, a first imaging element 12E1, a second imaging element 12E2, a third imaging element 12E3, an infrared cut filter 12F, an infrared 850 nm bans pass filter 12G1, and an infrared 850 nm band pass filter 12G2.

The infrared light and the visible light from the subject S (see FIG. 1) are incident on the first prism 12B1 via the lens 12A. The reflection dichroic film 12C reflects the visible light and transmits the infrared light out of the infrared light and the visible light that have been incident on the first prism 12B1. The first imaging element 12E1 receives the visible light reflected by the reflection dichroic film 12C and transmitted by the infrared cut filter 12F.

In the example illustrated in FIG. 3, the first imaging element 12E1 is a color imaging element with a Bayer array. In another example, the first imaging element 12E1 may not have the Bayer array.

Figure 4:
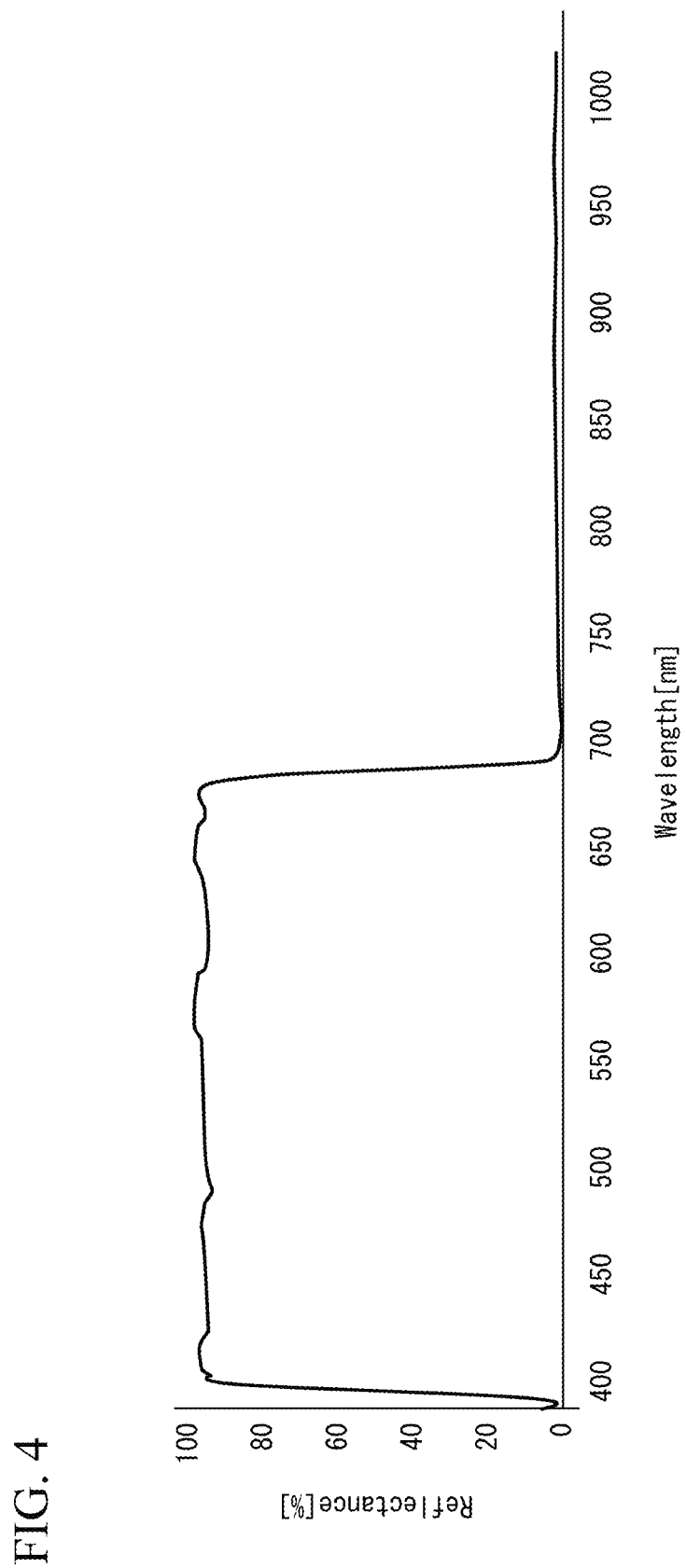
FIG. 4 is a diagram illustrating an example of reflection spectral characteristics of a reflection dichroic film 12C illustrated in FIG. 3.

FIG. 4 is a diagram illustrating an example of reflection spectral characteristics of the reflection dichroic film 12C illustrated in FIG. 3. In FIG. 4, the horizontal axis indicates a wavelength, and the vertical axis indicates reflectance.

As illustrated in FIG. 4, the reflection dichroic film 12C illustrated in FIG. 3 reflects light in the visible light region and transmits infrared light (that is, does not reflect the infrared light).

In the example illustrated in FIG. 3, a color imaging element with a Bayer pattern that obtains an R signal, a Gr signal, a Gb signal, and a B signal is used as the first imaging element 12E1.

Specifically, a CMOS sensor including a global shutter (not illustrated) is used as the first imaging element 12E1 in the example illustrated in FIG. 3. In another example, an imaging element other than the CMOS sensor such as a charge coupled device (CCD) sensor including a global shutter, for example, may be used as the first imaging element 12E1.

In the example illustrated in FIG. 3, the infrared light transmitted by the reflection dichroic film 12C is incident on the second prism 12B2. The half mirror 12D reflects a part of the infrared light that has been incident on the second prism 12B2 and transmits a remainder of the infrared light that has been incident on the second prism 12B2. The infrared light transmitted by the half mirror 12D is incident on the third prism 12B3.

The second imaging element 12E2 receives the infrared light transmitted by the half mirror 12D and transmitted by the infrared 850 nm band pass filter 12G1.

The third imaging element 12E3 receives the infrared light reflected by the half mirror 12D and transmitted by the infrared 850 nm band pass filter 12G2.

Figure 5:
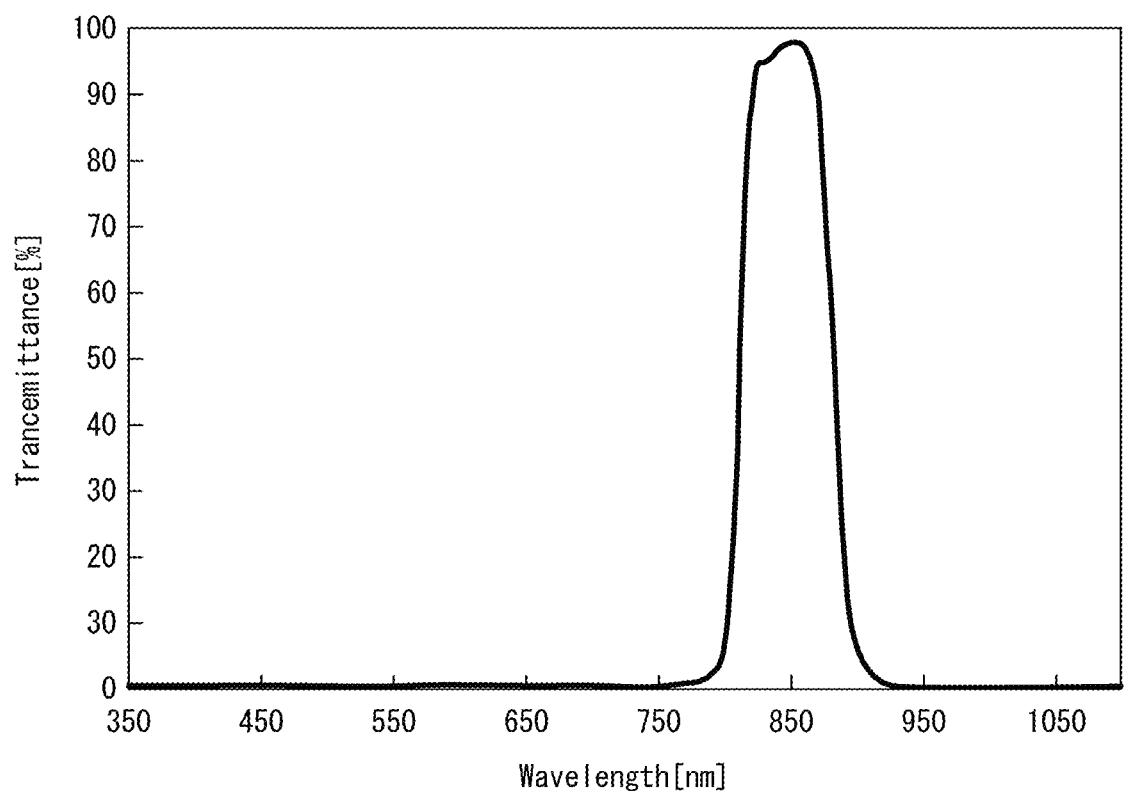
FIG. 5 is a diagram illustrating an example of characteristics of infrared 850 nm band pass filters 12G1 and 12G2 illustrated in FIG. 3.

FIG. 5 is a diagram illustrating an example of characteristics of the infrared 850 nm band pass filters 12G1 and 12G2 illustrated in FIG. 3. In FIG. 4, the horizontal axis indicates a wavelength, and the vertical axis indicates a transmittance.

In the example illustrated in FIG. 5, the infrared 850 nm band pass filters 12G1 and 12G2 illustrated in FIG. 3 have characteristics that the center wavelength is 850 nm and a half width is about 80 nm.

In the example illustrated in FIG. 3, the infrared 850 nm band pass filter 12G2 is configured by coating an emitting surface of the second prism 12B2 with a dielectric film, for example, and the infrared 850 nm band pass filter 12G1 is configured by coating an emitting surface of the third prism 12B3 with a dielectric film, for example.

In the example illustrated in FIG. 3, the second imaging element 12E2 is a short-range TOF sensor used to measure a short range Near_min to Near_max, which is a distance range from a short-distance minimum value Near_min to a short-distance maximum value Near_max. The third imaging element 12E3 is a long-range TOF sensor used to measure a long range Far_min to Far_max, which is a distance range that is further than the short range Near_min to Near_max and is a distance range from a long-distance minimum value Far_min to a long-distance maximum value Far_max. The second imaging element 12E2 and the third imaging element 12E3 have light receiving pixels with two-dimensional arrays and have spectral sensitivity characteristics that are satisfactory for the near-infrared wavelength.

In the example illustrated in FIG. 3, CMOS sensors including global shutters (not illustrated) are used as the second imaging element 12E2 and the third imaging element 12E3. In another example, imaging elements other than the CMOS sensors, such as CCD sensors with global shutters, for example, may be used as the second imaging element 12E2 and the third imaging element 12E3.

Also, the second imaging element 12E2 may be a long-range TOF sensor, and the third imaging element 12E3 may be a short-range TOF sensor in another example.

In the example illustrated in FIG. 3, an infrared image received by the third imaging element 12E3 is vertically inverted by the half mirror 12D. Therefore, the third imaging element 12E3 is arranged such that the right side in FIG. 3 corresponds to an upper side of a sensor screen of the third imaging element 12E3. As a result, the image captured by the third imaging element 12E3 is an image that has been only horizontally inverted (that is, an image that has not been vertically inverted).

Although the three-chip imaging element unit 12 is configured of a gapless prism in the example illustrated in FIG. 3, the three-chip imaging element unit 12 may be configured of a prism of a Phillips scheme in another example.

In the example illustrated in FIG. 1, the processing unit 13 performs control of the light source unit 11 and the three-chip imaging element unit 12 and processing of a signal output from the three-chip imaging element unit 12. The processing unit 13 includes, for example, an emission control unit 13A, a first imaging element control unit 13B, a second imaging element control unit 13C, a third imaging element control unit 13D, an RGB camera process processing unit 13E, a first distance data calculation unit 13F, a second distance data calculation unit 13G, a control unit 13H, a measurement range determination unit 13I, a distance data output switching unit 13J, a storage unit 13K, an IR data output switching unit 13L, an IR data processing unit 13M, an output mixing unit 13N, and an output interface unit 13P.

The emission control unit 13A performs light emission control of the light source unit 11. In other words, the emission control unit 13A controls a light emission period Tp (see FIG. 6 and the like) and a light emission timing of the light source unit 11. The emission control unit 13A includes a light source unit drive control unit 13A1 and a light source unit light emission control pulse setting unit 13A2. The light source unit drive control unit 13A1 performs control to drive the infrared laser diode array, for example, configuring the light source unit 11. The light source unit light emission control pulse setting unit 13A2 generates a pulse for causing the light source unit 11 (infrared laser diode array) to emit light.

Figure 6A:
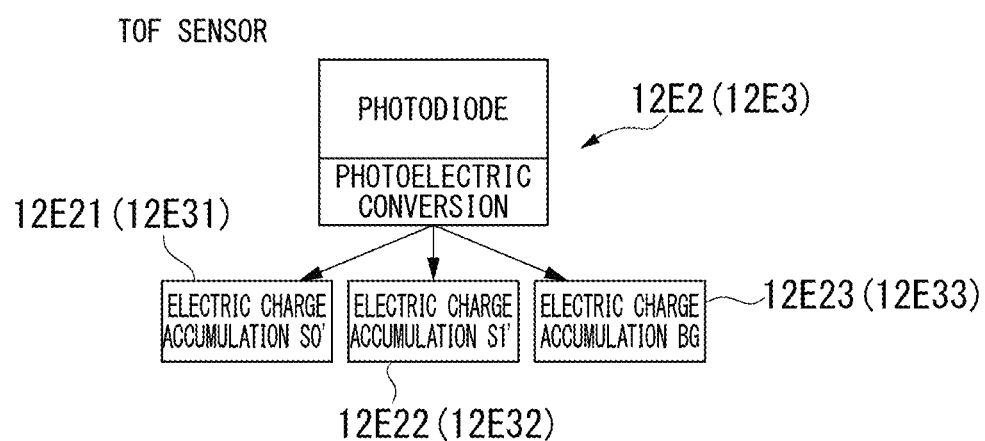
FIG. 6A is a diagram showing mechanisms of three-exposure charge accumulation and distance measurement of a second imaging element 12E2 (and a third imaging element 12E3).

FIG. 6 is a diagram showing mechanisms of three-exposure charge accumulation and distance measurement of the second imaging element 12E2 (and the third imaging element 12E3). Specifically, FIG. 6A illustrates a first part 12E21, a second part 12E22, and a third part 12E23 that the second imaging element 12E2 includes (a first part 12E31, a second part 12E32, and a third part 12E33 that the third imaging element 12E3 includes). FIG. 6B illustrates a first exposure timing of the second imaging element 12E2, FIG. 6C illustrates a second exposure timing of the second imaging element 12E2, and FIG. 6D illustrates a third exposure timing of the second imaging element 12E2.

As illustrated in FIG. 6A, the second imaging element 12E2 includes the first part 12E21, the second part 12E22, and the third part 12E23.

The first part 12E21 is a part that accumulates an electric charge at the first exposure timing (S0' exposure timing) of the second imaging element 12E2 illustrated in FIG. 6B. As illustrated in FIG. 6B, the first exposure timing (S0' exposure timing) of the second imaging element 12E2 is an exposure timing of the second imaging element 12E2, most of a light emission period Tp of the light source unit 11 being included in an exposure period (the period indicated as "Global Shutter" in FIG. 6B) of the second imaging element 12E2.

The second part 12E22 is a part that accumulates an electric charge at the second exposure timing (S1' exposure timing) of the second imaging element 12E2 illustrated in FIG. 6C. As illustrated in FIG. 6C, the second exposure timing (S1' exposure timing) of the second imaging element 12E2 is an exposure timing of the second imaging element 12E2, the exposure period of the second imaging element 12E2 (the period indicated as "Global Shutter in FIG. 6C) starting after the light emission period Tp of the light source unit 11 ends.

The third part 12E23 is a part that accumulates an electric charge at the third exposure timing (BG exposure timing) of the second imaging element 12E2 illustrated in FIG. 6D. As illustrated in FIG. 6D, the third exposure timing (BG exposure timing) of the second imaging element 12E2 is an exposure timing of the second imaging element 12E2, during which the second imaging element 12E2 does not receive the reflected light of the infrared light emitted by the light source unit 11 and reflected by the subject S.

As illustrated in FIG. 6A, the third imaging element 12E3 is configured similarly to the second imaging element 12E2. The third imaging element 12E3 includes the first part 12E31, the second part 12E32, and the third part 12E33.

The first part 12E31 is a part that accumulates an electric charge at a first exposure (S0' exposure) timing (see FIGS. 9A and 9D) of the third imaging element 12E3. The first exposure (S0' exposure) timing of the third imaging element 12E3 is an exposure timing of the third imaging element 12E3, a part of the light emission period Tp of the light source unit 11 being included in an exposure period (the period indicated as "GS2" in FIGS. 9A and 9D) of the third imaging element 12E3.

The second part 12E32 is a part that accumulates an electric charge at a second exposure (S1' exposure) timing (see FIGS. 9B and 9E) of the third imaging element 12E3. The second exposure (S1' exposure) timing of the third imaging element 12E3 is an exposure timing of the third imaging element 12E3, the exposure period (the period indicated as "GS2" in FIGS. 9B and 9C) of the third imaging element 12E3 starting after the light emission period Tp of the light source unit 11 ends.

The third part 12E33 is a part that accumulates an electric charge at a third exposure (BG exposure) timing (see FIGS. 9C and 9F) of the third imaging element 12E3. The third exposure (BG exposure) timing of the third imaging element 12E3 is an exposure timing of the third imaging element 12E3, during which the third imaging element 12E3 does not receive the reflected light of the infrared light emitted by the light source unit 11 and reflected by the subject S.

In the example illustrated in FIG. 6, a technique similar to the techniques described in PCT International Publication No. WO 2014/207788, Japanese Unexamined Patent Application, First Publication No. 2004-294420, and the like is used to store the electric charge accumulated in the S0' exposure period, the electric charge accumulated in the S1' exposure period, and the electric charge accumulated in the BG exposure period independently without being mixed.

In other words, the second imaging element 12E2 (third imaging element 12E3) includes the first part 12E21 (first part 12E31) that accumulates the electric charge at the S0' exposure timing, the second part 12E22 (second part 12E32) that accumulates the electric charge at the S1' exposure timing, and the third part 12E23 (third part 12E33) that accumulates the electric charge at the BG exposure for the electric charge that has been photoelectrically converted for each photodiode of each pixel, and has a function of outputting the electric charges in a switched manner in the example illustrated in FIG. 6.

Although the second imaging element 12E2 includes the third part 12E23 and the third imaging element 12E3 includes the third part 12E33 in the example illustrated in FIG. 6 (a first example of the three-dimensional video imaging device 1 according to the first embodiment), the second imaging element 12E2 may not include the third part 12E23 and the third imaging element 12E3 may not include the third part 12E33 in another example (a second example of the three-dimensional video imaging device 1 according to the first embodiment).

Figure 7:
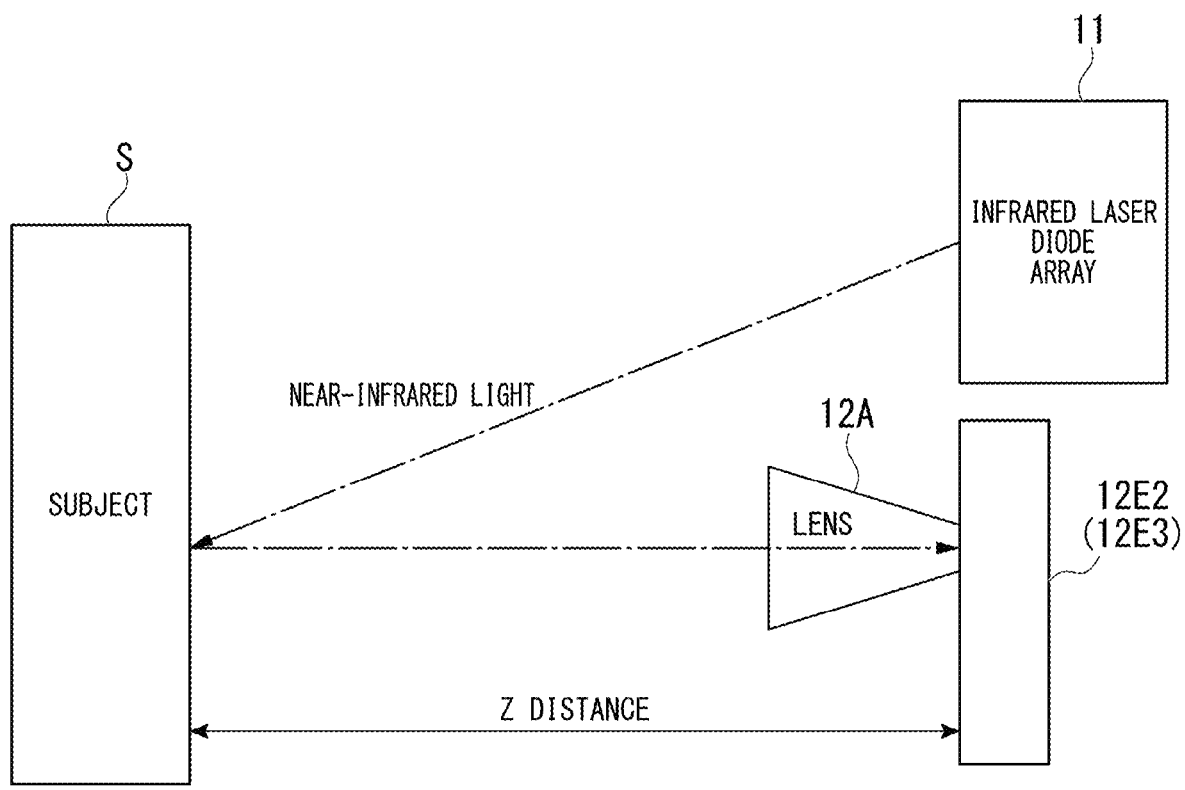
FIG. 7 is a diagram conceptually illustrating a relationship among a light source unit 11, a subject S, a lens 12A, and a second imaging element 12E2 (third imaging element 12E3).

FIG. 7 is a diagram conceptually illustrating a relationship among the light source unit 11, the subject S, the lens 12A, and the second imaging element 12E2 (third imaging element 12E3).

As illustrated in FIG. 7, the light source unit 11 emits infrared light in the light emission period Tp illustrated in FIG. 6B in the three-dimensional video imaging device 1 according to the first embodiment. The second imaging element 12E2 receives reflected light of the infrared light from the subject S, and an electric charge (signal) is accumulated in the first part 12E21, in a period indicated as "S0" in FIG. 6B in the exposure period (the period indicated as "Global Shutter" in FIG. 6B) of the second imaging element 12E2.

Also, the light source unit 11 emits infrared light in the light emission period Tp illustrated in FIG. 6C in the three-dimensional video imaging device 1 according to the first embodiment. The exposure period (the period indicated as "Global Shutter" in FIG. 6C) of the second imaging element 12E2 starts after the light emission period Tp of the light source unit 11 ends. The second imaging element 12E2 receives reflected light of the infrared light from the subject S, and the electric charge (signal) is accumulated in the second part 12E22, in the period indicated as "S1" in FIG. 6C in the exposure period (the period indicated as "Global Shutter" in FIG. 6C) of the second imaging element 12E2.

Furthermore, the light source unit 11 does not emit infrared light, and the second imaging element 12E2 receives infrared light of the background and the electric charge (signal) is accumulated in the third part 12E23 in the exposure period (the period indicated as "Global Shutter" in FIG. 6D) of the second imaging element 12E2, that is, the period indicated as "BG" in FIG. 6D in the three-dimensional video imaging device 1 according to the first embodiment.

Similarly, the second imaging element 12E2 receives the infrared light of the background and the electric charge (signal) is accumulated in the first part 12E21 in the exposure period (the period indicated as "Global Shutter" in FIG. 6B) of the second imaging element 12E2, that is, the period indicated as "BG" in FIG. 6B in the three-dimensional video imaging device 1 according to the first embodiment.

Also, the second imaging element 12E2 receives the infrared light of the background and the electric charge (signal) is accumulated in the second part 12E22 in the exposure period (the period indicated as the "global shutter" in FIG. 6C) of the second imaging element 12E2, that is, the period indicated as "BG" in FIG. 6C in the three-dimensional video imaging device 1 according to the first embodiment.

In the example illustrated in FIG. 6B (the S0' exposure timing of the second imaging element 12E2), a level S0 (=S0'−BG) of the reflection of the infrared light emission at the S0' exposure timing of the second imaging element 12E2 is obtained by subtracting the electric charge "BG" of the infrared light of the background accumulated in the first part 12E21 during the exposure period of the second imaging element 12E2 from the entire electric charge "S0" accumulated in the first part 12E21 in the exposure period (the period indicated as "Global Shutter" in FIG. 6B) of the second imaging element 12E2.

In the example illustrated in FIG. 6C (the S1' exposure timing of the second imaging element 12E2), a level S1 (=S1'−BG) of the reflection of the infrared light emission at the S1' exposure timing of the second imaging element 12E2 is obtained by subtracting the electric charge "BG" of the infrared light of the background accumulated in the second part 12E22 in the exposure period of the second imaging element 12E2 from the entire electric charge "S1" accumulated in the second part 12E22 in the exposure period (the period indicated as "Global Shutter" in FIG. 6C) of the second imaging element 12E2.

For example, a distance Z between the subject S and the three-dimensional video imaging device 1 is obtained by using Expression 1 below similarly to the technique described in the paragraph 0033 of International Publication No. WO 2014/207788, for example.

$$Z = C \times \Delta t/2 = C \cdot Tp/2 \times (S1/S0) \quad \text{Expression 1}$$

In Expression 1,
Δt: time of flight (TOF)
C: speed of light
Tp: light emission period In the example illustrated in FIG. 1, the first imaging element control unit 13B controls the first imaging element 12E1. The first imaging element control unit 13B includes a first imaging element drive control unit 13B1 and a first imaging element drive control pulse setting unit 13B2. The first imaging element drive control unit 13B1 performs control to drive the first imaging element 12E1. The first imaging element drive control pulse setting unit 13B2 generates a pulse to drive the first imaging element 12E1.

The second imaging element control unit 13C controls the exposure timing of the second imaging element 12E2 illustrated in FIGS. 6B, 6C, and 6D. The second imaging element control unit 13C includes a second imaging element drive control unit 13C1 and a second imaging element drive control pulse setting unit 13C2. The second imaging element drive control unit 13C1 performs control to drive the second imaging element 12E2. The second imaging element drive control pulse setting unit 13C2 generates a pulse to drive the second imaging element 12E2.

The third imaging element control unit 13D controls the exposure timing of the third imaging element 12E3. The third imaging element control unit 13D includes a third imaging element drive control unit 13D1 and a third imaging element drive control pulse setting unit 13D2. The third imaging element drive control unit 13D1 performs control to drive the third imaging element 12E3. The third imaging element drive control pulse setting unit 13D2 sets a pulse to drive the third imaging element 12E3.

The RGB camera process processing unit 13E performs processing on an output signal of the first imaging element 12E1. Specifically, the output signal of the first imaging element 12E1 is adjusted to have an appropriate image level inside the first imaging element 12E1, is then converted into a digital signal, is further converted into a serial signal, and is transmitted to the RGB camera process processing unit 13E through low voltage differential signaling (subLVDS).

The RGB camera process processing unit 13E includes an interface unit 13E1, a black balance unit 13E2, a debayer unit 13E3, a color matrix unit 13E4, a gamma unit 13E5, a YCbCr conversion unit 13E6, a low pass filter 13E7, and a multiplexing unit 13E8.

The interface unit 13E1 performs processing of returning the serial signal transmitted from the first imaging element 12E1 into a parallel signal (an R signal, a Gr signal, a Gb signal, and a B signal).

The black balance unit 13E2 performs black level correction. Specifically, the black balance unit 13E2 performs correction of setting a level of black data in RGB image data into a certain fixed level, for example, zero.

The debayer unit 13E3 performs debayer (demosaic) which is processing of converting a Bayer image (the R signal, the Gr signal, the Gb signal, and the B signal) into a full-color image (an R signal, a G signal, and a B signal).

The color matrix unit 13E4 performs color matrix correction of the RGB signals output by the color matrix unit 13E4.

The gamma unit 13E5 performs gamma correction on the RGB signals output by the color matrix unit 13E4.

The YCbCr conversion unit 13E6 converts values of red, green, and blue in the RGB image into values of luminance (Y) and color differences (Cb and Cr) of a YCbCr image.

The low pass filter 13E7 performs chroma sampling (processing of reducing color information in signals to be advantageous for luminance data) on data including luminance data and coloring data after the YCbCr conversion unit 13E6 performs the conversion.

The multiplexing unit 13E8 performs multiplexing of the data (data of YCbCr 4:2:2) including the luminance data and the color difference data after the low pass filter 13E7 performs chroma sampling.

In the example illustrated in FIG. 1, data (YUV 4:2:2 data) on which the RGB camera process processing unit 13E has performed processing is successively stored in a first buffer memory 13K1 of the storage unit 13K.

In another example, the RGB camera process processing unit 13E may perform arbitrary known RGB camera process processing (any processing described in the website indicated by the URL described above, for example) that is different from that illustrated in FIG. 1.

In the example illustrated in FIG. 1, the RGB camera process processing unit 13E performs the aforementioned processing at a frame rate of 30 Fps. In another example, the RGB camera process processing unit 13E may perform the aforementioned processing at a frame rate that is different from 30 Fps.

In the example illustrated in FIG. 1, the first distance data calculation unit 13F calculates first distance data Z1 indicating the distance between the three-dimensional video imaging device 1 and the subject S on the basis of the electric charge ("S0'" illustrated in FIG. 6A) accumulated in the first part 12E21 of the second imaging element 12E2, the electric charge ("S1'" illustrated in FIG. 6A) accumulated in the second part 12E22 of the second imaging element 12E2, and the electric charge ("BG" illustrated in FIG. 6A) accumulated in the third part 12E23 of the second imaging element 12E2.

Specifically, inside the second imaging element 12E2, an S0' signal indicating the electric charge accumulated in the first part 12E21, an S1' signal indicating the electrical charge accumulated in the second part 12E22, and a BG signal indicating the electric charge accumulated in the third part 12E23 are subjected to A/D conversion into digital signals, the digital signals are further converted into serial signals, and the serial signals are transmitted to the first distance data calculation unit 13F through subLVDS.

The first distance data calculation unit 13F includes an interface unit 13F1, a delay circuit 13F2, a delay circuit 13F3, a delay circuit 13F4, a timing adjustment unit 13F5, a timing adjustment unit 13F6, a subtraction unit 13F7, a subtraction unit 13F8, a computation unit 13F9, and an addition unit 13FX.

The interface unit 13F1 performs processing of returning the serial signals sent from the second imaging element 12E2 into 12-bit parallel signals (the S0' signal, the S1' signal, and the BG signal).

The delay circuit 13F2 performs processing of causing the S0' signal indicating the electric charge accumulated in the first part 12E21 of the second imaging element 12E2 to be delayed. A reason for causing the S0' signal to be delayed will be described later.

The delay circuit 13F3 performs processing of causing the S1' signal indicating the electric charge accumulated in the second part 12E22 of the second imaging element 12E2 to be delayed. The delay circuit 13F4 performs processing of causing the BG signal indicating the electric charge accumulated in the third part 12E23 of the second imaging element 12E2 to be delayed.

The timing adjustment unit 13F5 adjusts the timing of the processing of the S0' processing such that the timing of the processing of the S0' signal in units of pixels is the same timing as the timing of the processing of the BG signal. The timing adjustment unit 13F6 adjusts the timing of the processing of the S1' signal such that the timing of the processing of the S1' signal in units of pixels is the same timing as the timing of the processing of the BG signal.

The subtraction unit 13F7 generates an S0$t$1 signal by performing computation of "S0'−BG" on the basis of the S0' signal and the BG signal. In other words, the subtraction unit 13F7 executes processing of subtracting the electric charge "BG" of the infrared light of the background accumulated in the first part 12E21 in the exposure period of the second imaging element 12E2 from the entire electric charge "S0'" accumulated in the first part 12E21 in the exposure period (the "Global Shutter" period in FIG. 6B) of the second imaging element 12E2 described with reference to FIG. 6B).

The subtraction unit 13F8 generates an S1$t$1 signal by performing computation of "S1'−BG" on the basis of the S1' signal and the BG signal. In other words, the subtraction unit 13F8 executes processing of subtracting the electric charge "BG" of the infrared light of the background accumulated in the second part 12E22 in the exposure period of the second imaging element 12E2 from the entire electric charge "S1'" accumulated in the second part 12E22 in the exposure period (the "Global Shutter" period in FIG. 6C) of the second imaging element 12E2 described with reference to FIG. 6C).

The computation unit 13F9 performs computation (S1$t$1/S0$t$1) of dividing the S1$t$1 signal generated by the subtraction unit 13F8 by the S0$t$1 signal generated by the subtraction unit 13F7.

The addition unit 13FX performs computation of adding an offset value Zoffset set by the control unit 13H to the result of the computation (S1$t$1/S0$t$1) obtained by the computation unit 13F9 and calculates the first distance data Z1 (=S1$t$1/S0$t$1+Zoffset) indicating the distance between the three-dimensional video imaging device 1 and the subject S based on the second imaging element 12E2. The offset value Zoffset will be described later.

In the example illustrated in FIG. 1, the first distance data calculation unit 13F performs the aforementioned processing at a frame rate of 30 Fps in synchronization with the processing performed by the RGB camera process processing unit 13E. In another example (an example in which the processing performed by the RGB camera process processing unit 13E is performed at a frame rate that is different from 30 Fps), the first distance data calculation unit 13F may perform the aforementioned processing at a frame rate that is different from 30 Fps in synchronization with the processing performed by the RGB camera process processing unit 13E.

FIG. 8 is a diagram illustrating comparison of examples of a first exposure timing, a second exposure timing, and a third exposure timing of the second imaging element 12E2 in a case where the distance between the three-dimensional video imaging device 1 and the subject S is the short-distance minimum value Near_min and a first exposure timing, a second exposure timing, and a third exposure timing of the second imaging element 12E2 in a case where the distance between the three-dimensional video imaging device 1 and the subject S is the short-distance maximum value Near_max. Specifically, FIGS. 8A and 8D correspond to FIG. 6B, FIGS. 8B and 8E correspond to FIG. 6C, and FIGS. 8C and 8F correspond to FIG. 6D.

Figure 8A:
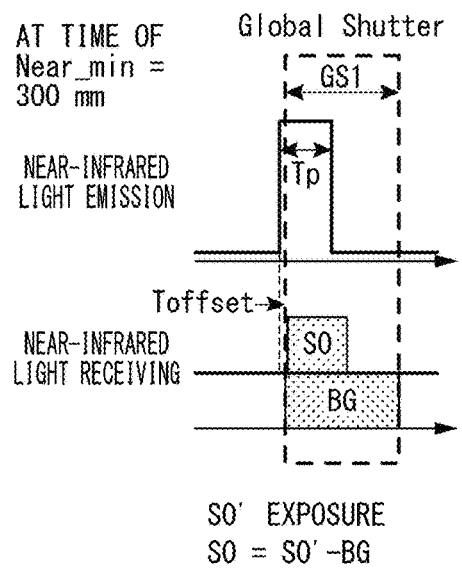
FIG. 8A is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.
Figure 8B:
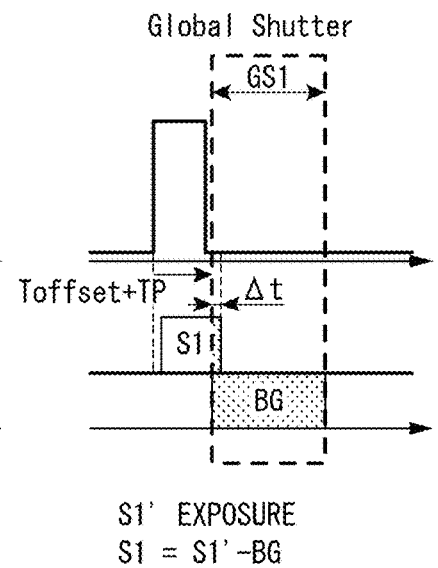
FIG. 8B is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.
Figure 8C:
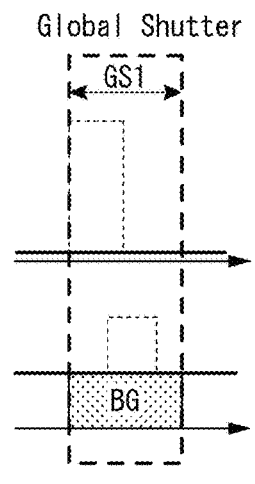
FIG. 8C is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.
Figure 8D:
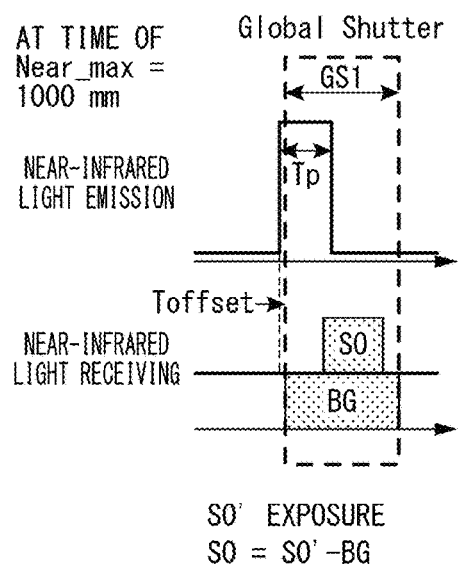
FIG. 8D is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.

In the example illustrated in FIG. 8, the second imaging element control unit 13C starts an exposure period GS1 corresponding to the first exposure timing (S0' exposure timing) of the second imaging element 12E2 at a timing when an offset time Toffset (=2×(Near_min−Near_min× 0.01)/C) based on the short-distance minimum value Near_min elapses from the start timing of the exposure period Tp of the light source unit 11 as illustrated in FIGS. 8A and 8D.

In the example illustrated in FIG. 8, the offset time Toffset is set such that the exposure period GS1 corresponding to the first exposure timing (S0' exposure timing) of the second imaging element 12E2 is started at a timing that is earlier than the timing at which the reflected light of the infrared light emitted by the light source unit 11 and reflected by the subject S reaches the three-dimensional video imaging device 1 by 1% in the case where the distance between the three-dimensional video imaging device 1 and the subject S is the short-distance minimum value Near_min.

Figure 8E:
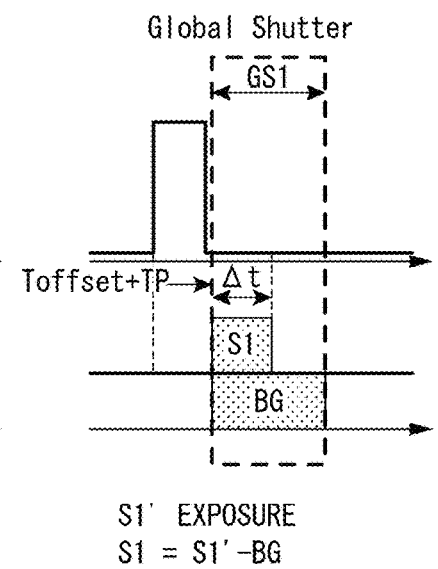
FIG. 8E is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.

Also, the second imaging element control unit 13C starts the exposure period GS1 corresponding to the second exposure timing (S1' exposure timing) of the second imaging element 12E2 at a timing when the offset time Toffset (=2×(Near_min−Near_min×0.01)/C) based on the short-distance minimum value Near_min elapses from an end timing of the light emission period Tp of the light source unit 11 as illustrated in FIGS. 8B and 8E.

Figure 8F:
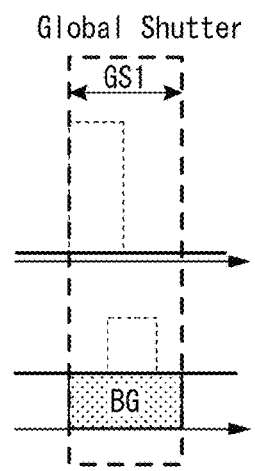
FIG. 8F is a diagram illustrating comparison of examples of a first exposure timing, a second exposure timing, and a third exposure timing of the second imaging element 12E2 in a case where a distance between the three-dimensional video imaging device 1 and the subject S is a short-distance minimum value Near_min and the first exposure timing, the second exposure timing, and the third exposure timing of the second imaging element 12E2 in a case where the distance between the three-dimensional video imaging device 1 and the subject S is a short-distance maximum value Near_max.

Furthermore, the second imaging element control unit 13C starts the exposure period GS1 corresponding to the third exposure timing (BG exposure timing) of the second imaging element 12E2 at a timing at which the second imaging element 12E2 does not receive the reflected light of the infrared light emitted by the light source unit 11 and reflected by the subject S as illustrated in FIGS. 8C and 8F.

In the example illustrated in FIG. 8, the length of the exposure period GS1 corresponding to the first exposure timing (S0' exposure timing) of the second imaging element 12E2 illustrated in FIGS. 8A and 8D, the length of the exposure period GS1 corresponding to the second exposure timing (S1' exposure timing) of the second imaging element 12E2 illustrated in FIGS. 8B and 8E, and the length of the exposure period GS1 corresponding to the third exposure timing (BG exposure timing) of the second imaging element 12E2 illustrated in FIGS. 8C and 8F are set to the same length.

The exposure period GS1 of the first exposure timing (S0' exposure timing), the second exposure timing (S1' exposure timing), and the third exposure timing (BG exposure timing) of the second imaging element 12E2 is obtained by using Expression 2 below.

$$GS1 = Tp + (\text{Near\_max} - \text{Near\_min} + 2 \times \text{Near\_min} \times 0.01)/C \quad \text{Expression 2}$$

In Expression 2,
Near_min: short-distance minimum value
Near_max: short-distance maximum value
C: speed of light
Tp: light emission period The aforementioned offset value Zoffset corresponding to half (one-way) the distance by which the infrared light advances during the aforementioned offset time Toffset is represented by using Expression 2A below.

$$Zoffset = Toffset/2 \times C \quad \text{Expression 2A}$$

The distance ZL1 between the three-dimensional video imaging device 1 and the subject S based on the second imaging element E2 is obtained by using Expression 3 below.

$$ZL1 = C \times (\Delta t + Toffset)/2 = C \cdot Tp/2 \times (S1/S0) + Zoffset \quad \text{Expression 3}$$

In Expression 3,
Δt: time of flight (TOF)
C: speed of light
Tp: light emission period
S0: level of reflection of infrared light emission at S0' exposure timing of second imaging element 12E2
S1: level of reflection of infrared light emission at S1' exposure timing of second imaging element 12E2

In the example illustrated in FIG. 1, the second distance data calculation unit 13G calculates second distance data Z2 indicating the distance between the three-dimensional video imaging device 1 and the subject S on the basis of the electric charge ("S0'" illustrated in FIG. 6A) accumulated in the first part 12E31 of the third imaging element 12E3, the electric charge ("S1'" illustrated in FIG. 6A) accumulated in the second part 12E32 of the third imaging element 12E3, and the electric charge ("BG" illustrated in FIG. 6A) accumulated in the third part 12E33 of the third imaging element 12E3. Specifically, inside the third imaging element 12E3, an S0' signal indicating the electric charge accumulated in the first part 12E31, an S1' signal indicating the electric charge accumulated in the second part 12E32, and a BG signal indicating the electric charge accumulated in the third part 12E33 are subjected to A/D conversion into digital signals, the digital signals are further converted into serial signals, and the serial signals are transmitted to the second distance data calculation unit 13G through subLVDS.

The second distance data calculation unit 13G includes an interface unit 13G1, a horizontal inverting unit 13G2, a horizontal inverting unit 13G3, a horizontal inverting unit 13G4, a timing adjustment unit 13G5, a timing adjustment unit 13G6, a subtraction unit 13G7, a subtraction unit 13G8, a computation unit 13G9, and an addition unit 13GX.

The interface unit 13G1 performs processing of returning the serial signals sent from the third imaging element 12E3 to 12-bit parallel signals (the S0' signal, the S1' signal, and the BG signal).

As described above, since the image captured by the third imaging element 12E3 is an image that has been only horizontally inverted, the horizontal inverting unit 13G2 performs processing of horizontally inverting the S0' signal indicating the electric charge accumulated in the first part 12E31 of the third imaging element 12E3 by using a line memory.

The horizontal inverting unit 13G3 performs processing of horizontally inverting the S1' signal indicating the electric charge accumulated in the second part 12E32 of the third imaging element 12E3. The horizontal inverting unit 13G4 performs processing of horizontally inverting the BG signal indicating the electric charge accumulated in the third part 12E33 of the third imaging element 12E3.

The delay circuits 13F2, 13F3, and 13F4 perform processing of causing the signals to be delayed as described above in accordance with the time required by the horizontal inverting units 13G2, 13G3, and 13G4 to perform the horizontal inverting processing.

The timing adjustment unit 13G5 adjusts the timing of the processing of the S0' signal such that the timing of the processing of the S0' signal in units of pixels is the same timing as the timing of the processing of the BG signal. The timing adjustment unit 13G6 adjusts the timing of the processing of the S1' signal such that the timing of the processing of the S1' processing in units of pixels is the same timing as the timing of the processing of the BG signal.

The subtraction unit 13G7 generates an S0t2 signal by performing computation of "S0'−BG" on the basis of the S0' signal and the BG signal. In other words, the subtraction unit 13G7 executes processing of subtracting the electric charge "BG" of the infrared light of the background accumulated in the first part 12E31 in the exposure period of the third imaging element 12E3 from the entire electric charge "S0'" accumulated in the first part 12E31 in the exposure period (the period indicated as "GS2" in FIGS. 9A and 9D) of the third imaging element 12E3.

The subtraction unit 13G8 generates an S1$t$2 signal by performing computation of "S1'−BG" on the basis of the S1' signal and the BG signal. In other words, the subtraction unit 13G8 executes processing of subtracting the electric charge "BG" of the infrared light of the background accumulated in the second part 12E32 in the exposure period of the third imaging element 12E3 from the entire electric charge "S1'" accumulated in the second part 12E32 in the exposure period (the period indicated as "GS2" in FIGS. 9B and 9E) of the third imaging element 12E3.

The computation unit 13G9 performs computation (S1$t$2/S0$t$2) of dividing the S1$t$2 signal generated by the subtraction unit 13G8 by the S0$t$2 signal generated by the subtraction unit 13G7.

The addition unit 13GX performs computation of adding an offset value Zoffset2 set by the control unit 13H to the result of the computation (S1$t$2/S0$t$2) obtained by the computation unit 13G9 and calculates the second distance data Z2 (=S1$t$2/S0$t$2+Zoffset2) indicating the distance between the three-dimensional video imaging device 1 and the subject S based on the third imaging element 12E3. The offset value Zoffset2 will be described later.

In the example illustrated in FIG. 1, the second distance data calculation unit 13G performs the aforementioned processing at a frame rate of 30 Fps in synchronization with the processing of the RGB camera process processing unit 13E and the first distance data calculation unit 13F. In another example (an example in which the processing performed by the RGB camera process processing unit 13E and the first distance data calculation unit 13F is performed at a frame rate that is different from 30 Fps), the second distance data calculation unit 13G may perform the aforementioned processing at a frame rate that is different from 30 Fps in synchronization with the processing performed by the RGB camera process processing unit 13E and the first distance data calculation unit 13F.

FIG. 9 is a diagram illustrating comparison of examples of a first exposure timing, a second exposure timing, and a third exposure timing of the third imaging element 12E3 in a case where the distance between the three-dimensional video imaging device 1 and the subject S is the long-distance minimum value Far_min and a first exposure timing, a second exposure timing, and a third exposure timing of the third imaging element 12E3 in a case where the distance between the three-dimensional video imaging device 1 and the subject S is the long-distance maximum value Far_max.

Figure 9A:
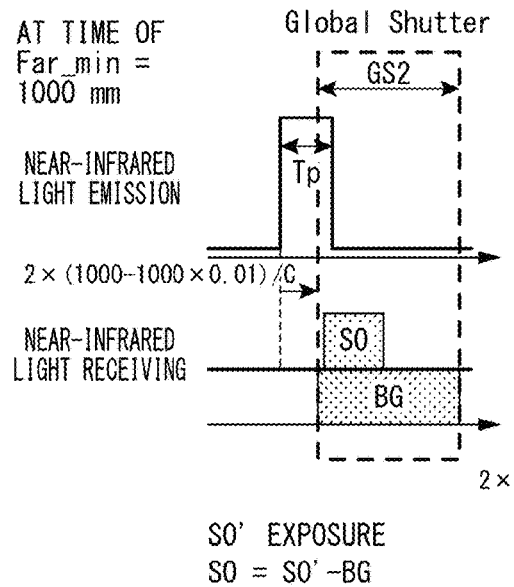
FIG. 9A is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.
Figure 9B:
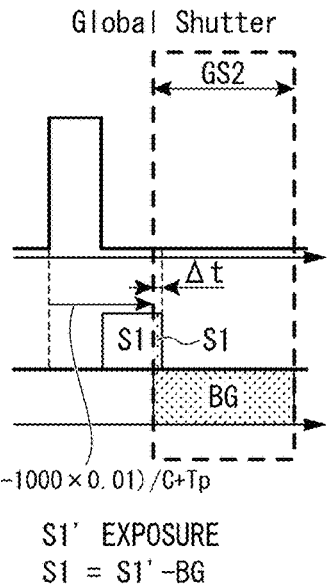
FIG. 9B is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.
Figure 9C:
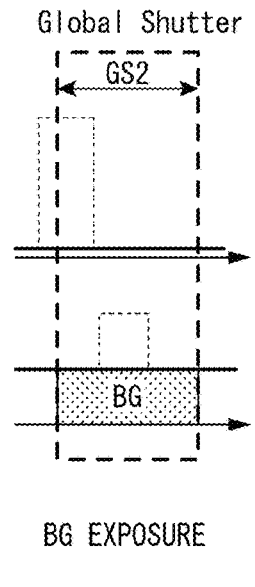
FIG. 9C is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.
Figure 9D:
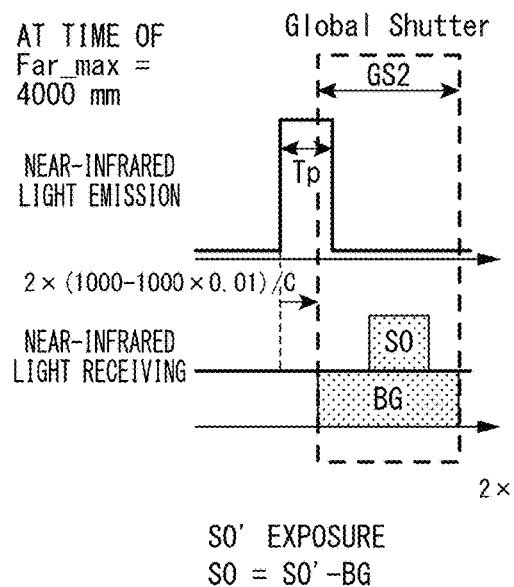
FIG. 9D is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.

In the example illustrated in FIG. 9, the third imaging element control unit 13D starts an exposure period GS2 that corresponds to the first exposure timing (S0' exposure timing) of the third imaging element 12E3 and is set within the same frame as that of the exposure period GS1 (see FIGS. 8A and 8D) corresponding to the first exposure timing (S0' exposure timing) of the second imaging element 12E2 at a timing when an offset time Toffset2 (=2×(Far_min−Far_min×0.01)/C) based on the long-distance minimum value Far_min elapses from the start timing of the light emission period Tp of the light source unit 11 as illustrated in FIGS. 9A and 9D.

In the example illustrated in FIG. 9, the offset time Toffset2 is set such that the exposure period GS2 corresponding to the first exposure timing (S0' exposure timing) of the third imaging element 12E3 is started at a timing that is earlier than the timing at which the reflected light of the infrared light emitted by the light source unit 11 and reflected by the subject S reaches the three-dimensional video imaging device 1 by 1% in the case where the distance between the three-dimensional video imaging device 1 and the subject S is the long-distance minimum value Far_min.

Figure 9E:
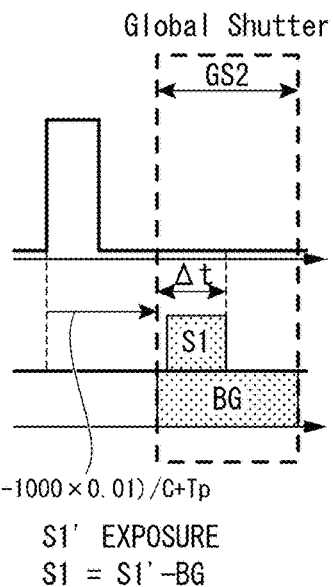
FIG. 9E is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.

Also, the third imaging element control unit 13D starts the exposure period GS2 that corresponds to the second exposure timing (S1' exposure timing) of the third imaging element 12E3 and is set within the same frame as that of the exposure period GS1 (see FIGS. 8B and 8E) corresponding to the second exposure timing (S1' exposure timing) of the second imaging element 12E2 at a timing when the offset time Toffset2 (=2×(Far_min−Far_min×0.01)/C) based on the long-distance minimum value Far_min elapses from the end timing of the light emission period Tp of the light source unit 11 as illustrated in FIGS. 9B and 9E.

Figure 9F:
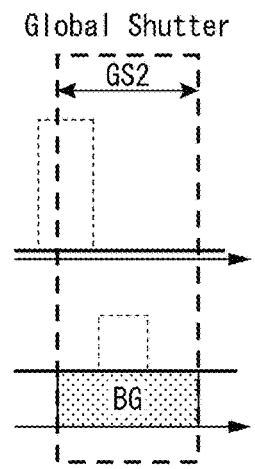
FIG. 9F is a diagram illustrating comparison of examples of a first exposure timing, a second exposure timing, and a third exposure timing of a third imaging element 12E3 in a case where the distance between the three-dimensional video imaging device 1 and the subject S is a long-distance minimum value Far_min and the first exposure timing, the second exposure timing, and the third exposure timing of the third imaging element 12E3 in a case where the distance between the three-dimensional video imaging device 1 and the subject S is a long-distance maximum value Far_max.

Furthermore, the third imaging element control unit 13D starts the exposure period GS2 corresponding to the third exposure timing (BG exposure timing) of the third imaging element 12E3 at a timing at which the third imaging element 12E3 does not receive the reflected light of the infrared light emitted by the light source unit 11 and reflected by the subject S as illustrated in FIGS. 9C and 9F.

In the example illustrated in FIG. 9, the length of the exposure period GS2 corresponding to the first exposure timing (S0' exposure timing) of the third imaging element 12E3 illustrated in FIGS. 9A and 9D, the length of the exposure period GS2 corresponding to the second exposure timing (S1' exposure timing) of the third imaging element 12E3 illustrated in FIGS. 9B and 9E, and the length of the exposure period GS2 corresponding to the third exposure timing (BG exposure timing) of the third imaging element 12E3 illustrated in FIGS. 9C and 9F are set to the same length.

The exposure period GS2 of the first exposure timing (S0' exposure timing), the second exposure timing (S1' exposure timing), and the third exposure timing (BG exposure timing) of the third imaging element 12E3 is obtained by using Expression 4 below.

$$GS2 = Tp + (\text{Far\_max} - \text{Far\_min} + 2 \times \text{Far\_min} \times 0.01)/C \quad \text{Expression 4}$$

In Expression 4,

Far_min: long-distance minimum value

Far_max: long-distance maximum value

C: speed of light

Tp: light emission period

The aforementioned offset value Zoffset2 corresponding to half (one-way) the distance by which the infrared light advances during the aforementioned offset time Toffset2 is represented by using Expression 4A below.

$$Zoffset2 = Toffset2/2 \times C \quad \text{Expression 4A}$$

A distance ZL2 between the three-dimensional video imaging device 1 and the subject S based on the third imaging element 12E3 is obtained by using Expression 5 below.

$$ZL2 = C \times (\Delta t + Toffset2)/2 = C \cdot Tp/2 \times (S1/S0) + Zoffset2 \quad \text{Expression 5}$$

In Expression 5,

Δt: time of flight (TOF)

C: speed of light

Tp: light emission period

S0: level of reflection of infrared light emission at S0' exposure timing of third imaging element 12E3

S1: level of reflection of infrared light emission at S1' exposure timing of third imaging element 12E3

In the example illustrated in FIG. 1, the light emission period Tp [nsec] of the light source unit 11 is set using a Tp_period [mm] corresponding to the light emission period, which is a longer one of the short range Near_min to Near_max (that is, the range obtained by subtracting the short-distance minimum value Near_min from the short-distance maximum value Near_max) and the long range Far_min to Far_max (that is, the range obtained by subtracting the long-distance minimum value Far_min from the long-distance maximum value Far_max).

In other words, the length Tp_period corresponding to the light emission period is equal to the short range Near_min to Near_max in a case where the short range Near_min to Near_max is greater (longer) than the long range Far_min to Far_max.

On the other hand, the length Tp_period corresponding to the light emission period is equal to the long range Far_min to Far_max in a case where the long range Far_min to Far_max is greater (longer) than the short range Near_min to Near_max.

The light emission period Tp [nsec] of the light source unit 11 is set using Expression 6 below.

$$Tp = \text{Tp\_period}/C + h \qquad \text{Expression 6}$$

In Expression 6, $$C: \text{speed of light} \left(3 \times 10^{11} [\text{mm/s}]\right)$$

h: amount corresponding to pulse inclination correction (it is assumed to be 2 [nsec] here)

The pulse indicating the light emission period Tp of the light source unit 11 in FIG. 9A and the like does not vertically rise in reality and rises with an angle with respect to the vertical axis in FIG. 9A and the like, and it is thus necessary to perform correction using the amount h of pulse inclination correction.

Since the short-distance minimum value Near_min is set to 300 [mm], the short-distance maximum value Near_max is set to 1000 [mm], the short range Near_min to Near_max is set to 700 [mm] (=1000 [mm]−300 [mm]), the long-distance minimum value Far_min is set to 1000 [mm], the long-distance maximum value Far_max is set to 4000 [mm], and the long range Far_min to Far_max is set to 3000 [mm] (=4000 [mm]−1000 [mm]) in the aforementioned example illustrated in FIGS. 8 and 9, the light emission period Tp of the light source unit 11 is 12 [nsec], the exposure period GS1 corresponding to the first exposure timing (S0' exposure timing), the second exposure timing (S1' exposure timing), and the third exposure timing (BG exposure timing) of the second imaging element 12E2 is 14.35 [nsec], and the exposure period GS2 corresponding to the first exposure timing (S0' exposure timing), the second exposure timing (S1' exposure timing), and the third exposure timing (BG exposure timing) of the third imaging element 12E3 is 22.07 [nsec].

In this manner, the light emission period Tp [nsec] of the light source unit 11, the exposure period GS1 [nsec] of the second imaging element 12E2, and the exposure period GS2 [nsec] of the third imaging element 12E3 are significantly short.

Therefore, the exposure at the first exposure timing (S0' exposure timing) of the second imaging element 12E2 is typically not performed only once, and the light emission of the light source unit 11 and the exposure at the first exposure timing (S0' exposure timing) of the second imaging element 12E2 are repeatedly performed a plurality of times such that a relationship between the light emission period Tp of the light source unit 11 and the exposure period GS1 corresponding to the first exposure timing (S0' exposure timing) of the second imaging element 12E2 (see FIGS. 8A and 8D) is the same every time, and the electric charge is accumulated in the first part 12E21 of the second imaging element 12E2.

Similarly, the light emission of the light source unit 11 and the exposure at the second exposure timing (S1' exposure timing) of the second imaging element 12E2 are repeatedly performed a plurality of times such that a relationship between the light emission period Tp of the light source unit 11 and the exposure period GS1 corresponding to the second exposure timing (S1' exposure timing) of the second imaging element 12E2 (see FIGS. 8B and 8E) is the same every time, and the electric charge is accumulated in the second part 12E22 of the second imaging element 12E2.

Also, the exposure at the third exposure timing (BG exposure timing) of the second imaging element 12E2 is repeatedly performed a plurality of times such that intervals of the exposure period GS1 (see FIGS. 8C and 8F) corresponding to the third exposure timing (BG exposure timing) of the second imaging element 12E2 are the same every time, and the electric charge is accumulated in the third part 12E23 of the second imaging element 12E2.

Furthermore, the exposure at the first exposure timing (S0' exposure timing) of the third imaging element 12E3 is repeatedly performed a plurality of times such that a relationship between the light emission period Tp of the light source unit 11 and the exposure period GS2 corresponding to the first exposure timing (S0' exposure timing) of the third imaging element 12E3 (see FIGS. 9A and 9D) is the same every time, and the electric charge is accumulated in the first part 12E31 of the third imaging element 12E3.

Also, the exposure at the second exposure timing (S1' exposure timing) of the third imaging element 12E3 is repeatedly performed a plurality of times such that a relationship between the light emission period Tp of the light source unit 11 and the exposure period GS2 corresponding to the second exposure timing (S1' exposure timing) of the third imaging element 12E3 (see FIGS. 9B and 9E) is the same every time, and the electric charge is accumulated in the second part 12E32 of the third imaging element 12E3.

Moreover, the exposure at the third exposure timing (BG exposure timing) of the third imaging element 12E3 is repeatedly performed a plurality of times such that intervals of the exposure period GS2 (see FIGS. 9C and 9F) corresponding to the third exposure timing (BG exposure timing) of the third imaging element 12E3 are the same every time, and the electric charge is accumulated in the third part 12E33 of the third imaging element 12E3.

The number of repetitions of the repeated exposure is called a pulse count number, and the exposure is repeated several hundreds of times to several tens of thousand times in accordance with sensitivity of the second imaging element 12E2 and the third imaging element 12E3. Here, the pulse count number is represented as N.

In the example illustrated in FIG. 1, light emission of the light source unit 11 and the exposure of the second imaging element 12E2 and the third imaging element 12E3 corresponding to the first exposure timing (S0' exposure timing) of the second imaging element 12E2 and the first exposure timing (S0' exposure timing) of the third imaging element 12E3 are first repeated a pulse count number N times, the electric charge is accumulated in the first part 12E21 of the second imaging element 12E2, and the electric charge is accumulated in the first part 12E31 of the third imaging element 12E3.

Then, light emission of the light source unit 11 and the exposure of the second imaging element 12E2 and the third imaging element 12E3 corresponding to the second exposure timing (S1' exposure timing) of the second imaging element 12E2 and the second exposure timing (S1' exposure timing) of the third imaging element 12E3 re repeated the pulse count number N times, the electric charge is accumulated in the second part 12E22 of the second imaging element 12E2, and the electric charge is accumulated in the second part 12E32 of the third imaging element 12E3.

Then, the exposure of the second imaging element 12E2 and the third imaging element 12E3 corresponding to the third exposure timing (BG exposure timing) of the second imaging element 12E2 and the third exposure timing (BG exposure timing) of the third imaging element 12E3 is repeated the pulse count number N times, the electric charge is accumulated in the third part 12E23 of the second imaging element 12E2, and the electric charge is accumulated in the third part 12E33 of the third imaging element 12E3.

In principle, the electric charge accumulated in the first part 12E21 of the second imaging element 12E2 and the first part 12E31 of the third imaging element 12E3 reaches the saturation amount first. Therefore, the pulse count number N is set (adjusted) on the basis of the number of repetitions of the light emission of the light source unit 11 in a case where the electric charge accumulated in the first part 12E21 of the second imaging element 12E2 and the first part 12E31 of the third imaging element 12E3 is saturated.

Figure 10:
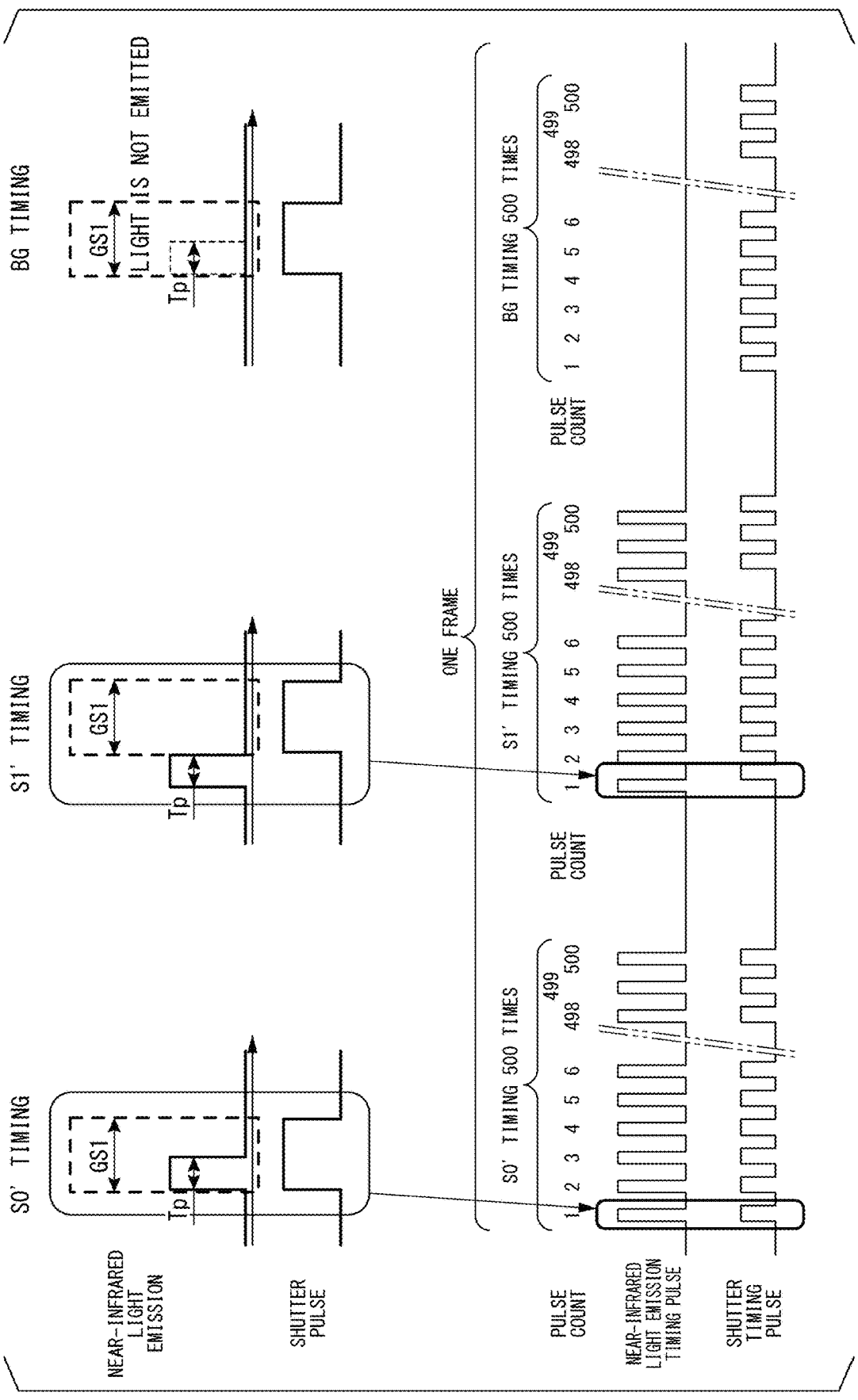
FIG. 10 is a diagram illustrating an example of an order of light emission of the light source unit 11 and exposure of the second imaging element 12E2 and the third imaging element 12E3 in a case where a pulse count number N is set to 500.

FIG. 10 is a diagram illustrating an example of an order of the light emission of the light source unit 11 and the exposure of the second imaging element 12E2 and the third imaging element 12E3 in a case where the pulse count number N is set to 500.

In the example illustrated in FIG. 10, the light emission of the light source unit 11 and the exposure of the second imaging element 12E2 and the third imaging element 12E3 corresponding to the first exposure timing (S0' exposure timing) of the second imaging element 12E2 and the first exposure timing (S0' exposure timing) of the third imaging element 12E3 are first repeated the pulse count number N (500) times. Then, the light emission of the light source unit 11 and the exposure of the second imaging element 12E2 and the third imaging element 12E3 corresponding to the second exposure timing (S1' exposure timing) of the second imaging element 12E2 and the second exposure timing (S1' exposure timing) of the third imaging element 12E3 are repeated the pulse count number N (500) times. Then, the exposure of the second imaging element 12E2 and the third imaging element 12E3 corresponding to the third exposure timing (BG exposure timing) of the second imaging element 12E2 and the third exposure timing (BG exposure timing) of the third imaging element 12E3 is repeated the pulse count number N (500) times.

Although the light source unit light emission control pulse setting unit 13A2 of the emission control unit 13A in the processing unit 13 generates a pulse to cause the light source unit 11 (infrared laser diode array) to emit light in the example illustrated in FIG. 1, the pulse to cause the light source unit 11 (infrared laser diode array) to emit light may be generated inside the light source unit 11 in another example.

Although the first imaging element drive control pulse setting unit 13B2 of the first imaging element control unit 13B in the processing unit 13 generates a pulse to drive the first imaging element 12E1 in the example illustrated in FIG. 1, the pulse to drive the first imaging element 12E1 may be generated inside the first imaging element 12E1 in another example.

Although the second imaging element drive control pulse setting unit 13C2 of the second imaging element control unit 13C in the processing unit 13 generates a pulse to drive the second imaging element 12E2 in the example illustrated in FIG. 1, the pulse to drive the second imaging element 12E2 may be generated inside the second imaging element 12E2 in another example.

In the example illustrated in FIG. 1, the measurement range determination unit 13I determines whether or not the distance between the three-dimensional video imaging device 1 and the subject S measured by the three-dimensional video imaging device 1 is included in the short range Near_min to Near_max, whether or not the distance between the three-dimensional video imaging device 1 and the subject S measured by the three-dimensional video imaging device 1 is included in the long range Far_min to Far_max, and the like on the basis of a signal indicating the electric charge accumulated in the first part 12E21 of the second imaging element 12E2 (a signal corresponding to S0' signal output from the interface unit 13F1), a signal indicating the electric charge accumulated in the second part 12E22 of the second imaging element 12E2 (a signal corresponding to the S1' signal output from the interface unit 13F1), a signal indicating the electric charge accumulated in the third part 12E23 of the second imaging element 12E2 (a signal corresponding to the BG signal output from the interface unit 13F1), a signal indicating the electric charge accumulated in the first part 12E31 of the third imaging element 12E3 (a signal corresponding to the S0' signal output from the interface unit 13G1), a signal indicating the electric charge accumulated in the second part 12E32 of the third imaging element 12E3 (a signal corresponding to the S1' signal output from the interface unit 13G1), a signal indicating the electric charge accumulated in the third part 12E33 of the third imaging element 12E3 (a signal corresponding to the BG signal output from the interface unit 13G1), and a preset determination rule illustrated in Table 1.

The distance data output switching unit 13J switches outputs of distance data, and for example, outputs the first distance data Z1 (=S1$t$1/S0$t$1+Zoffset) calculated by the first distance data calculation unit 13F and outputs the second distance data Z2 (=S1$t$2/S0$t$2+Zoffset2) calculated by the second distance data calculation unit 13G, in accordance with the determination result of the measurement range determination unit 13I.

Table 1 illustrates an example of the determination rule used by the measurement range determination unit 13I of the processing unit 13 in the three-dimensional video imaging device 1 according to the first embodiment.

TABLE 1

| Measurement range | Details | AREA[2:0] |
|---|---|---|
| 0 to Near_min (mm) | A distance that is shorter than the short-distance measurement range | 0 |
| Near_min to Near_max (mm) | A short-distance measurement range | 1 |
| | Not used | 2 |
| Far_min to Far_max (mm) | A long-distance measurement range | 3 |
| Far_max (mm) or more | A distance that is further than the long-distance measurement range | 4 |

In the example illustrated in Table 1, the measurement range determination unit 13I outputs a 3-bit signal (specifically a signal of AREA [2:0]=1) of AREA [2:0] as a determination result, and the distance data output switching unit 13J outputs the first distance data Z1 (=S1$t$1/S0$t$1+Zoffset) (>0) calculated by the first distance data calculation unit 13F as distance data S1wide/S0wide, in a case where the measurement range determination unit 13I determines that the distance between the three-dimensional video imaging device 1 and the subject S measured by the three-dimensional video imaging device 1 is included in the short range Near_min to Near_max.

The measurement range determination unit 13I outputs a signal of AREA [2:0]=3 as a determination result, and the distance data output switching unit 13J outputs the second distance data Z2 (=S1$t$2/S0$t$2+Zoffset2) (>Z1) calculated by the second distance data calculation unit 13G as the distance data S1wide/S0wide, in a case where the measurement range determination unit 13I determines that the distance between the three-dimensional video imaging device 1 and the subject S measured by the three-dimensional video imaging device 1 is included in the long range Far_min to Far_max.

The measurement range determination unit 13I outputs a signal of AREA [2:0]=0 indicating that measurement is impossible as a determination result, and the distance data output switching unit 13J outputs zero (minimum value) that is smaller than the first distance data Z1 as the distance data S1wide/S0wide, in a case where the distance between the three-dimensional video imaging device 1 and the subject S is less than the short-distance minimum value Near_min.

The measurement range determination unit 13I outputs a signal of AREA [2:0]=4 indicating that measurement is impossible as a determination result, and the distance data output switching unit 13J outputs a predetermined maximum value that is greater than the second distance data Z2 as the distance data S1wide/S0wide, in a case where the distance between the three-dimensional video imaging device 1 and the subject S is equal to or greater than the long-distance maximum value Far_max. In a case of an integer of 16 bits with no symbols, for example, the distance data output switching unit 13J outputs 65535 as the predetermined maximum value that is greater than the second distance data Z2.

In other words, the distance data output switching unit 13J outputs any of the first distance data Z1, the second distance data Z2, zero (minimum value), and the maximum value as the distance data S1wide/S0wide in the example illustrated in Table 1.

Figure 11A:
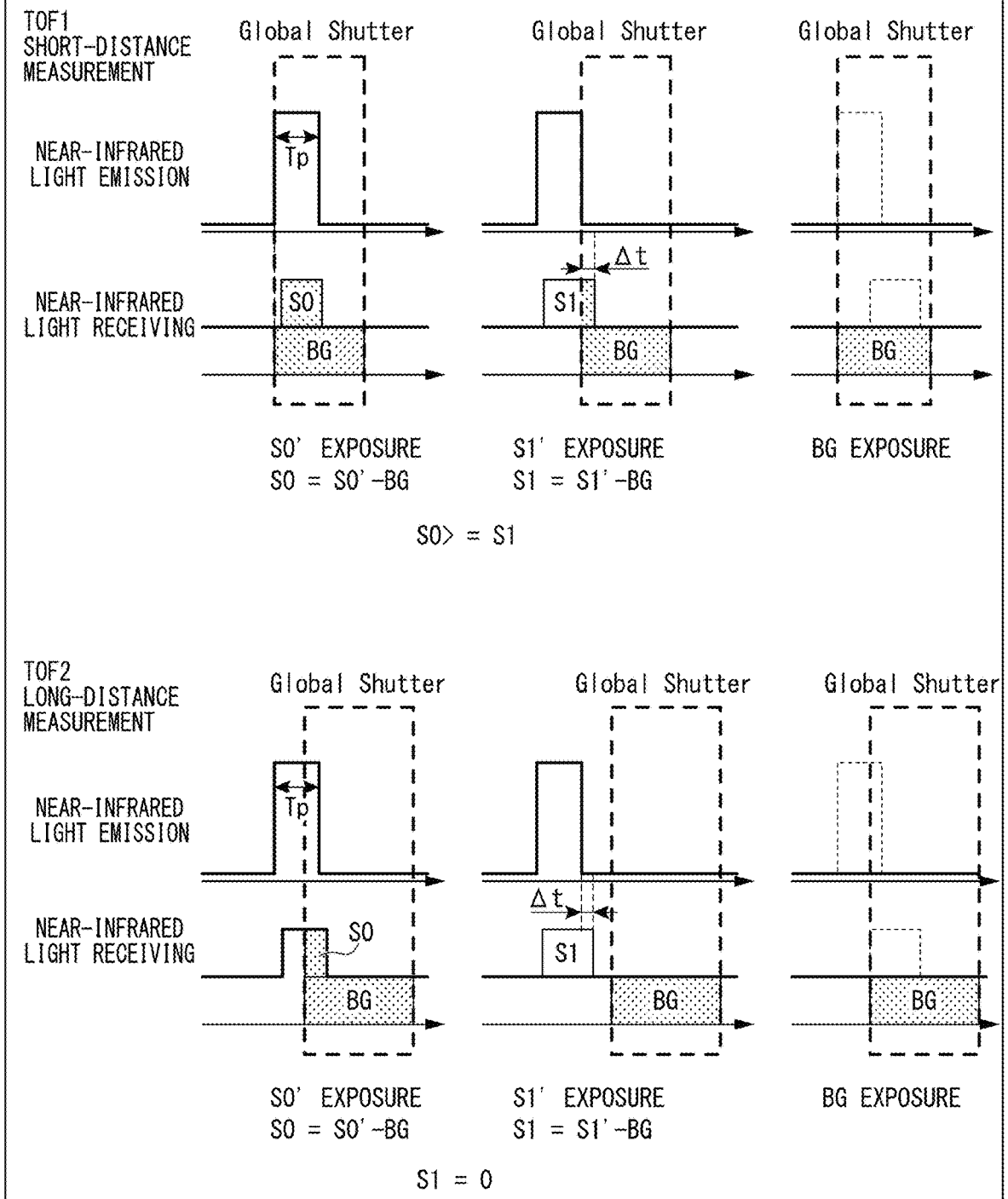
FIG. 11A is a diagram showing grounds of a determination rule illustrated in Table 1.
Figure 11B:
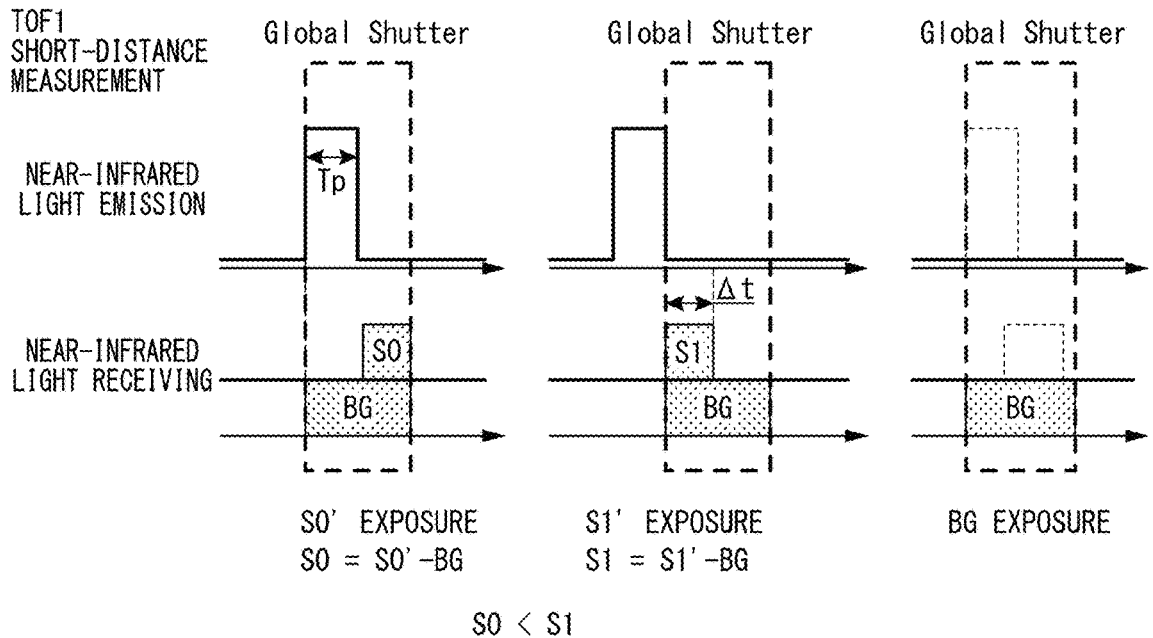
FIG. 11B is a diagram showing grounds of the determination rule illustrated in Table 1.
Figure 11B:
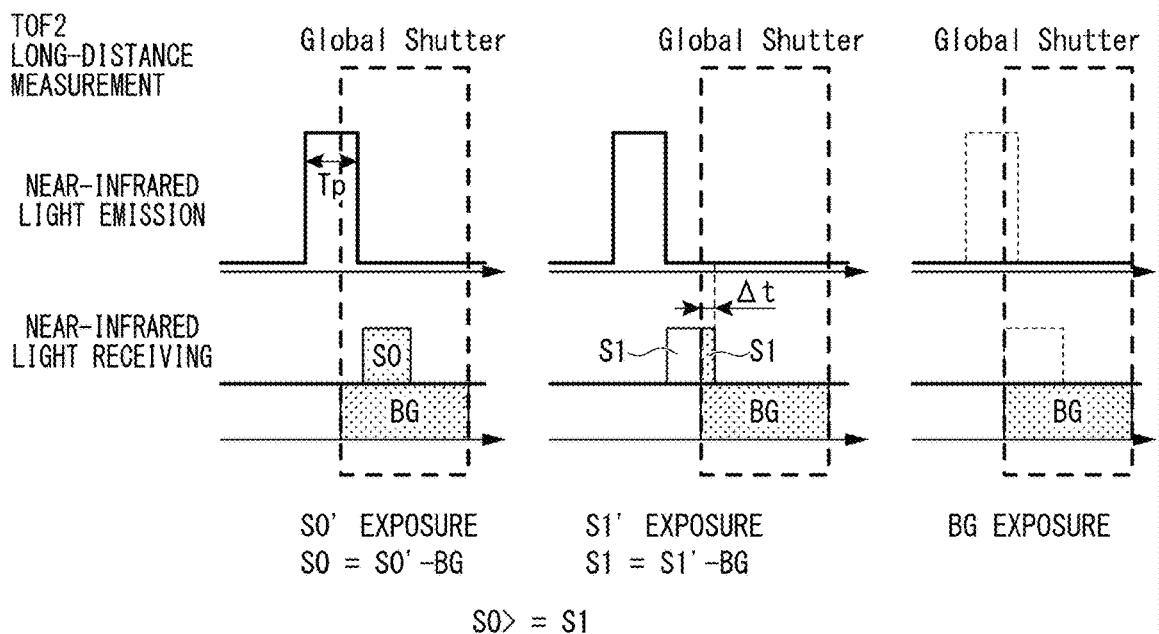
Figure 11C:
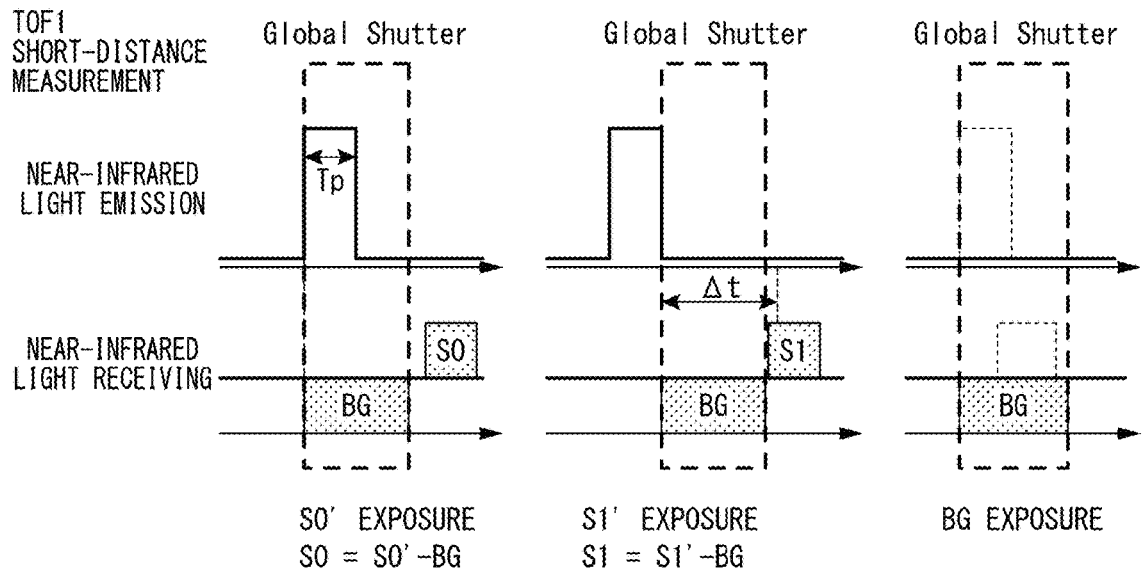
FIG. 11C is a diagram showing grounds of the determination rule illustrated in Table 1.
Figure 11C:
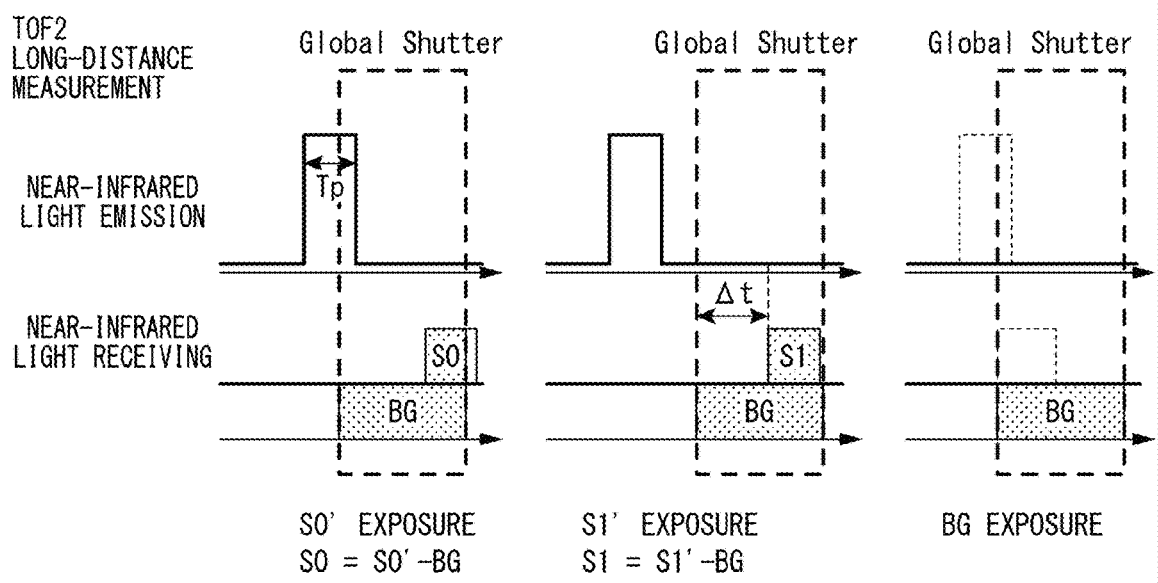

FIGS. 11A to 11C are diagrams showing grounds of the determination rule illustrated in Table 1.

Although not illustrated in FIGS. 11A to 11C, in the case where the distance between the three-dimensional video imaging device 1 and the subject S is less than the short-distance minimum value Near_min, the electric charge S0 (=S0'−BG) indicating a difference between the electric charge S0' accumulated in the first part 12E21 of the second imaging element 12E2 at the first exposure timing (S0' exposure timing) of the second imaging element 12E2 and the electric charge BG accumulated in the third part 12E23 of the second imaging element 12E2 at the third exposure timing (BG exposure timing) of the second imaging element 12E2 does not become zero, and the electric charge S1 (=S1'−BG) indicating a difference between the electric charge S1' accumulated in the second part 12E22 of the second imaging element 12E2 at the second exposure timing (S1' exposure timing) of the second imaging element 12E2 and the electric charge BG accumulated in the third part 12E23 of the second imaging element 12E2 at the third exposure timing (BG exposure timing) of the second imaging element 12E2 becomes zero.

Therefore, in the example illustrated in Table 1, the measurement range determination unit 13I can determine whether or not the distance between the three-dimensional video imaging device 1 and the subject S is less than the short-distance minimum value Near_min (whether or not this corresponds to AREA [2:0]=0) on the basis of the electric charge S0 (=S0'−BG) and the electric charge S1 (=S1'−BG) of the second imaging element 12E2.

In the second example (that is, the example in which the second imaging element 12E2 does not include the third part 12E23) of the three-dimensional video imaging device 1 according to the aforementioned first embodiment, the measurement range determination unit 13I determines whether or not the distance between the three-dimensional video imaging device 1 and the subject S is less than the short-distance minimum value Near_min (whether or not this corresponds to AREA [2:0]=0) on the basis of the electric charge S0' and the electric charge S1' of the second imaging element 12E2.

As illustrated in FIG. 11A, in the case where the distance between the three-dimensional video imaging device 1 and the subject S measured by the three-dimensional video imaging device 1 is included in the short range Near_min to Near_max, the electric charge S0 (=S0'−BG) indicating a difference between the electric charge S0' accumulated in the first part 12E31 of the third imaging element 12E3 at the first exposure timing (S0' exposure timing) of the third imaging element 12E3 and the electric charge BG accumulated in the third part 12E33 of the third imaging element 12E3 at the third exposure timing (BG exposure timing) of the third imaging element 12E3 does not become zero, and the electric charge S1 (=S1'−BG) indicating a difference between the electric charge S1' accumulated in the second part 12E32 of the third imaging element 12E3 at the second exposure timing (S1' exposure timing) of the third imaging element 12E3 and the electric charge BG accumulated in the third part 12E33 of the third imaging element 12E3 at the third exposure timing (BG exposure timing) of the third imaging element 12E3 becomes zero.

Furthermore, as illustrated in FIG. 11A, in a case where the distance between the three-dimensional video imaging device 1 and the subject S measured by the three-dimensional video imaging device 1 is included in the short range Near_min to Near_max, the electric charge S0 (=S0'−BG) indicating the difference between the electric charge S0' accumulated in the first part 12E21 of the second imaging element 12E2 at the first exposure timing (S0' exposure timing) of the second imaging element 12E2 and the electric charge BG accumulated in the third part 12E23 of the second imaging element 12E2 at the third exposure timing (BG exposure timing) of the second imaging element 12E2 is equal to or greater than the electric charge S1 (=S1'−BG) indicating the difference between the electric charge S1' accumulated in the second part 12E22 of the second imaging element 12E2 at the second exposure timing (S1' exposure timing) of the second imaging element 12E2 and the electric charge BG accumulated in the third part 12E23 of the second imaging element 12E2 at the third exposure timing (BG exposure timing) of the second imaging element 12E2 (S0≥S1).

Furthermore, in a case where the distance between the three-dimensional video imaging device 1 and the subject S measured by the three-dimensional video imaging device 1 is included in the short range Near_min to Near_max, the distance Z between the subject S and the three-dimensional video imaging device 1 obtained by applying data (electric charges S0 and S1) obtained by the second imaging element 12E2 to Expression 1 described above is equal to or less than the long-distance minimum value Far_min.

The measurement range determination unit 13I can determine whether or not the distance between the three-dimensional video imaging device 1 and the subject S is included in the short range Near_min to Near_max (whether or not this corresponds to AREA [2:0]=1) by using these characteristics.

In the second example (that is, the example in which the second imaging element 12E2 does not include the third part 12E23) of the three-dimensional video imaging device 1 according to the aforementioned first embodiment, the measurement range determination unit 13I determines whether or not the distance between the three-dimensional video imaging device 1 and the subject S is included in the short range Near_min to Near_max (whether or not this corresponds to AREA [2:0]=1) by applying data (electric charges S0' and S1') obtained by the second imaging element 12E2 to Expression 1 described above.

As illustrated in FIG. 11B, in a case where the distance between the three-dimensional video imaging device 1 and the subject S measured by the three-dimensional video imaging device 1 is included in the long range Far_min to Far_max, the electric charge S0 (S0'−BG) indicating the difference between the electric charge S0' accumulated in the first part 12E21 of the second imaging element 12E2 at the first exposure timing (S0' exposure timing) of the second imaging element 12E2 and the electric charge BG accumulated in the third part 12E23 of the second imaging element 12E2 at the third exposure timing (BG exposure timing) of the second imaging element 12E2 does not become zero, and the electric charge S1 (=S1'−BG) indicating the electric charge S' accumulated in the second part 12E22 of the second imaging element 12E2 at the second exposure timing (S1' exposure timing) of the second imaging element 12E2 and the electric charge BG accumulated in the third part 12E23 of the second imaging element 12E2 at the third exposure timing (BG exposure timing) of the second imaging element 12E2 does not become zero.

Furthermore, as illustrated in FIG. 11B, in a case where the distance between the three-dimensional video imaging device 1 and the subject S measured by the three-dimensional video imaging device 1 is included in the long range Far_min to Far_max, the electric charge S0 (=S0'−BG) indicating the difference between the electric charge S0' accumulated in the first part 12E31 of the third imaging element 12E3 at the first exposure timing (S0' exposure timing) of the third imaging element 12E3 and the electric charge BG accumulated in the third part 12E33 of the third imaging element 12E3 at the third exposure timing (BG exposure timing) of the third imaging element 12E3 is equal to or greater than the electric charge S1 (=S1'−BG) indicating that the difference between the electric charge S1' accumulated in the second part 12E32 of the third imaging element 12E3 at the second exposure timing (S1' exposure timing) of the third imaging element 12E3 and the electric charge BG accumulated in the third part 12E33 of the third imaging element 12E3 at the third exposure timing (BG exposure timing) of the third imaging element 12E3 (S0≥S1).

Moreover, in a case where the distance between the three-dimensional video imaging device 1 and the subject S measured by the three-dimensional video imaging device 1 is included in the long range Far_min to Far_max, the distance Z between the subject S and the three-dimensional video imaging device 1 obtained by applying data (electric charges S0 and S1) obtained by the third imaging element 12E3 to Expression 5 described above is greater than the long-distance minimum value Far_min.

The measurement range determination unit 13I can determine whether or not the distance between the three-dimensional video imaging device 1 and the subject S is included in the long range Far_min to Far_max (whether or not this corresponds to AREA [2:0]=3) by using these characteristics.

In the second example (that is, the example in which the third imaging element 12E3 does not include the third part 12E33) of the three-dimensional video imaging device 1 according to the aforementioned first embodiment, the measurement range determination unit 13I determines whether or not the distance between the three-dimensional video imaging device 1 and the subject S is included in the long range Far_min to Far_max (whether or not this corresponds to AREA [2:0]=3) by applying data (electric charges S0' and S1') obtained by the third imaging element 12E3 to Expression 5 described above.

As illustrated in FIG. 11C, in a case where the distance between the three-dimensional video imaging device 1 and the subject S measured by the three-dimensional video imaging device 1 is equal to or greater than the long-distance maximum value Far_max, the electric charge S0 (=S0'−BG) indicating the difference between the electric charge S0' accumulated in the first part 12E31 of the third imaging element 12E3 at the first exposure timing (S0' exposure timing) of the third imaging element 12E3 and the electric charge BG accumulated in the third part 12E33 of the third imaging element 12E3 at the third exposure timing (BG exposure timing) of the third imaging element 12E3 is smaller than the electric charge S1 (=S1'−BG) indicating the difference between the electric charge S1' accumulated in the second part 12E32 of the third imaging element 12E3 at the second exposure timing (S1' exposure timing) of the third imaging element 12E3 and the electric charge BG accumulated in the third part 12E33 of the third imaging element 12E3 at the third exposure timing (BG exposure timing) of the third imaging element 12E3 (S1>S0).

The measurement range determination unit 13I can determine whether or not the distance between the three-dimensional video imaging device 1 and the subject S is equal to or greater than the long-distance maximum value Far_max (whether or not this corresponds to AREA [2:0]=4) by using these characteristics.

In the second example (that is, the example in which the third imaging element 12E3 does not include the third part 12E33) of the three-dimensional video imaging device 1 according to the aforementioned first embodiment, the measurement range determination unit 13I determines whether or not the distance between the three-dimensional video imaging device 1 and the subject S is equal to or greater than the long-distance maximum value Far_max (whether or not this corresponds to AREA [2:0]=4) by using the characteristics that the electric charge S1'>the electric charge S0' is satisfied in the case where the distance between the three-dimensional video imaging device 1 and the subject S measured by the three-dimensional video imaging device 1 is equal to or greater than the long-distance maximum value Far_max.

In other words, in the example illustrated in FIG. 1, the measurement range determination unit 13I outputs the signal of AREA [2:0]=0 as a determination result in a case where it is determined that the distance between the three-dimensional video imaging device 1 and the subject S is less than the short-distance minimum value Near_min, outputs a signal of AREA [2:0]=1 as a determination result in a case where it is determined that the distance between the three-dimensional video imaging device 1 and the subject S is included in the short range Near_min to Near_max, outputs a signal of AREA [2:0]=3 as a determination result in a case where it is determined that the distance between the three-dimensional video imaging device 1 and the subject S is included in the long range Far_min to Far_max, outputs a signal of AREA [2:0]=4 as a determination result in a case where the distance between the three-dimensional video imaging device 1 and the subject S is equal to or greater than the long-distance maximum value Far_max, and outputs a signal of AREA [2:0]=0 as a determination result in a case which does not correspond to any of the above cases.

Noise included in the signals output from the second imaging element 12E2 and the third imaging element 12E3 may be large. In view of the point, the measurement range determination unit 13I may perform processing, which will be described later, in another example of the three-dimensional video imaging device 1 according to the first embodiment.

In this example, an adjustable threshold value Zth is set.

Furthermore, the measurement range determination unit 13I outputs a determination result of AREA [2:0]=0 when the level S0 (=S0'−BG) of reflection of the infrared light emission at the S0' exposure timing of the second imaging element 12E2 is greater than the threshold value Zth, and the level S1 (=S1'−BG) of reflection of the infrared light emission at the S1' exposure timing of the second imaging element 12E2 is equal to or less than the threshold value Zth.

In addition, the measurement range determination unit 13I outputs a determination result of AREA [2:0]=1 when the level S0 of reflection of the infrared light emission at the S0' exposure timing of the third imaging element 12E3 is greater than the threshold value Zth, the level S1 of reflection of the infrared light emission at the S1' exposure timing of the third imaging element 12E3 is equal to or less than the threshold value Zth, the level S0 of reflection of the infrared light emission at the S0' exposure timing of the second imaging element 12E2 is equal to or greater than the level S1 of reflection of the infrared light emission at the S' exposure timing of the second imaging element 12E2 (S0≥S1), and the distance Z between the subject S and the three-dimensional video imaging device 1 obtained by applying the level S0 of reflection of the infrared light emission at the S0' exposure timing of the second imaging element 12E2 and the level S1 of reflection of the infrared light emission at the S1' exposure timing to Expression 1 described above is equal to or less than the long-distance minimum value Far_min.

The measurement range determination unit 13I outputs a determination result of AREA [2:0]=3 when the level S0 of reflection of the infrared light emission at the S0' exposure timing of the third imaging element 12E3 and the level S1 of reflection of the infrared light emission at the S1' exposure timing are greater than the threshold value Zth, the level S0 of reflection of the infrared light emission at the S0' exposure timing of the third imaging element 12E3 is equal to or greater than the level S1 of reflection of the infrared light emission at the S1' exposure timing of the third imaging element 12E3 (S0≥S1), and the distance Z between the subject S and the three-dimensional video imaging device 1 obtained by applying the level S0 of reflection of the infrared light emission at the S0' exposure timing of the third imaging element 12E3 and the level S1 of reflection of the infrared light emission at the S1' exposure timing to Expression 5 described above is greater than the long-distance minimum value Far_min.

The measurement range determination unit 13I outputs a determination result of AREA [2:0]=4 when the level S0 of reflection of the infrared light emission at the S0' exposure timing of the third imaging element 12E3 is smaller than the level S1 of reflection of the infrared light emission at the S1' exposure timing of the third imaging element 12E3 (S1>S0).

The measurement range determination unit 13I outputs a determination result of AREA [2:0]=0 in a case that does not correspond any of the above cases.

In the example illustrated in FIG. 1, the distance data S1wide/S0wide output by the distance data output switching unit 13J is stored once in a second buffer memory 13K2 of the storage unit 13K.

Also, in the example illustrated in FIG. 1, the IR data output switching unit 13L performs switching between an output of IR data indicating an IR image captured by the second imaging element 12E2 and an output of IR data indicating an IR image captured by the third imaging element 12E3 in accordance with a result of the determination performed by the measurement range determination unit 13I.

The IR data processing unit 13M performs processing on the IR data input from the IR data output switching unit 13L. The IR data processing unit 13M includes a black level unit 13M1 and a gamma unit 13M2. The black level unit 13M1 performs black level correction of the IR image indicated by the IR data input from the IR data output switching unit 13L. The gamma unit 13M2 performs gamma correction of the IR image indicated by the IR data input from the IR data output switching unit 13L. The IR data on which processing has been performed by the IR data processing unit 13M is stored in a third buffer memory 13K3 of the storage unit 13K.

The output mixing unit 13N mixes an output of the data (YUV 4:2:2 data) from the first buffer memory 13K1 of the storage unit 13K, an output of the distance data S1wide/S0wide from the second buffer memory 13K2 of the storage unit 13K, and an output of the IR data from the third buffer memory 13K3 of the storage unit 13K. The output interface unit 13P can output the data mixed by the output mixing unit 13N to a device (not illustrated) outside the three-dimensional video imaging device 1.

In other words, in the example illustrated in FIG. 1, the IR data output switching unit 13L can select the S0t1 signal obtained from the second imaging element 12E2 and the S0t2 signal obtained from the third imaging element 12E3 in accordance with an AREA [2:0] signal and an IRsel[1:0] signal output from the control unit 13H. Also, the S0t1 signal is an infrared light video signal of the second imaging element 12E2, and the S0t2 signal is an infrared light video signal of the third imaging element 12E3. Therefore, a user of the three-dimensional video imaging device 1 can view how the IR image of the infrared light emitted from the light source unit 11 is actually acquired by the second imaging element 12E2 and the third imaging element 12E3 when the distance data (any one of the aforementioned first distance data Z1, the second distance data Z2, zero (minimum value), and the maximum value) indicating the distance between the three-dimensional video imaging device 1 and the subject S is acquired from the three-dimensional video imaging device 1.

The IRsel[1:0] signal can be set in the control unit 13H by the user of the three-dimensional video imaging device 1, for example, and breakdown of the IRsel[1:0] signal is as follows, for example.

When IRsel[1:0]=0, the IR data output switching unit 13L provides output as follows in accordance with the AREA [2:0] signal.

When AREA [2:0]=0, the S0t1 signal is output.
When AREA [2:0]=1, the S0t1 signal is output.
When AREA [2:0]=3, the S0t2 signal is output.
When AREA [2:0]=4, the S0t2 signal is output.
When IRsel[1:0]=1, the IR data output switching unit 13L constantly outputs the S0t1 signal.
When IRsel[1:0]=2, the IR data output switching unit 13L constantly outputs the S0t2 signal.

In the example illustrated in FIG. 1, the output signal from the IR data output switching unit 13L is handled as a monochrome IR video signal, the black level unit 13M1 of the IR data processing unit 13M performs black level adjustment, the gamma unit 13M2 of the IR data processing unit 13M applies video gamma, and the third buffer memory 13K3 of the storage unit 13K temporarily stores the signal.

Figure 12:
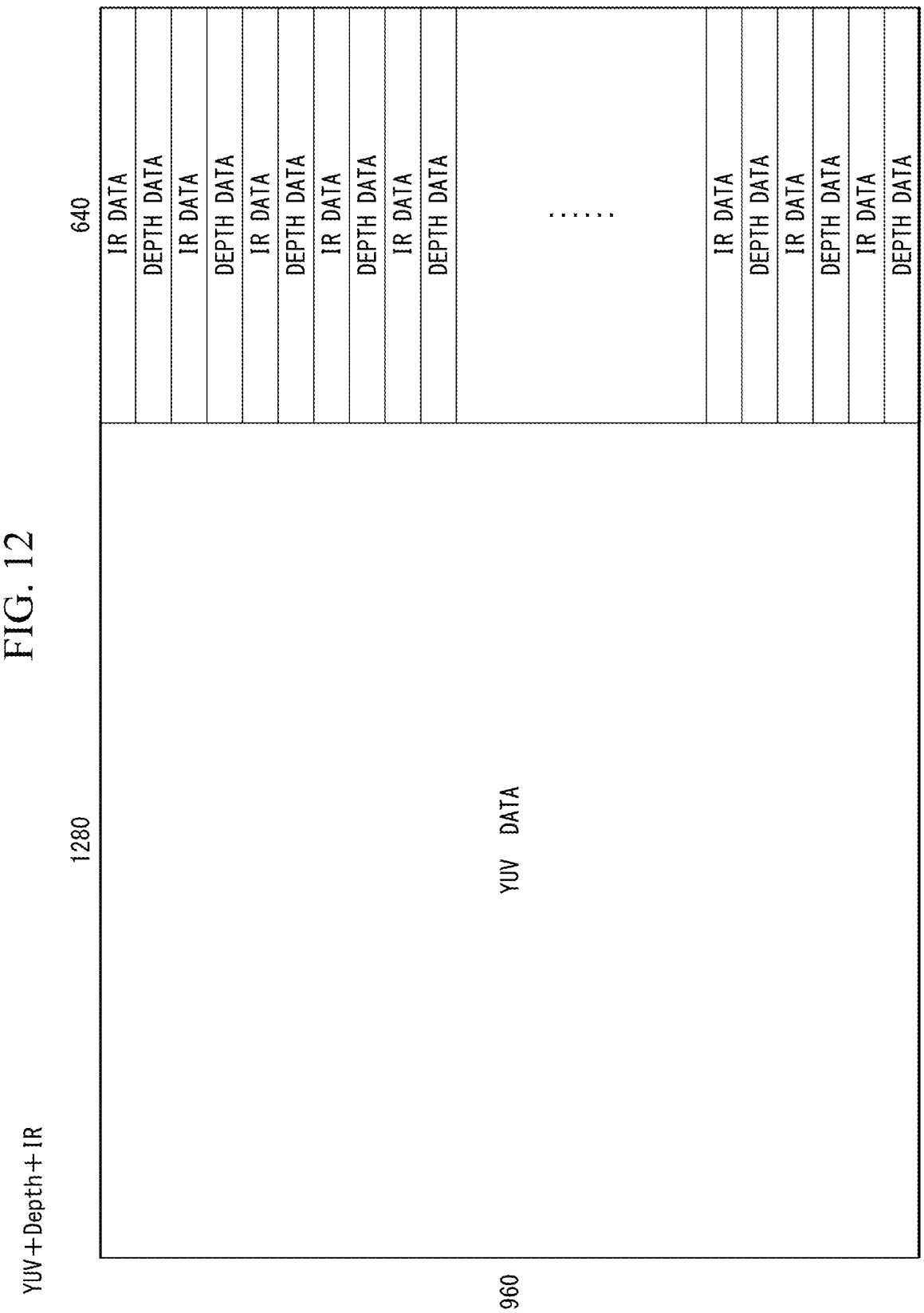
FIG. 12 is a diagram illustrating an example of an order of signal switching performed by an output mixing unit 13N.

FIG. 12 is a diagram illustrating an example of an order of switching of signals by the output mixing unit 13N.

The signals temporarily retained in the first buffer memory 13K1 (YUV 4:2:2 buffer memory), the second buffer memory 13K2 (DepthDATA buffer memory), and the third buffer memory 13K3 (IR_DATA buffer memory) of the storage unit 13K are output via the output interface unit 13P (USB 3.0 I/F) in the later stage through successive scanning for each frame while being switched in the order illustrated in FIG. 12, for example, by the output mixing unit 13N (OUTPUTMIX block). Data may be successively read for each frame via a personal computer, for example, image display and point group processing may be performed, and the data may be applied to 3D display or the like, in the output of the data from the output interface unit 13P (USB 3.0 I/F).

In other words, in the example illustrated in FIG. 1, the RGB camera process processing unit 13E generates an RGB video from the signals output by the first imaging element 12E1, and the second imaging element 12E2 and the third imaging element 12E3 have a function as infrared imaging elements.

Also, in the example illustrated in FIG. 1, the IR data output switching unit 13L outputs a short-range infrared image captured by the second imaging element 12E2 in a case where the measurement range determination unit 13I determines that the distance between the three-dimensional video imaging device 1 and the subject S measured by the three-dimensional video imaging device 1 is included in the short range Near_min to Near_max and outputs a long-range infrared image captured by the third imaging element 12E3 in a case where the measurement range determination unit 13I determines that the distance between the three-dimensional video imaging device 1 and the subject S measured by the three-dimensional video imaging device 1 is included in the long range Far_min to Far_max.

The output mixing unit 13N outputs any of at least the first distance data Z1 (=S1t1/S0t1+Zoffset) and the second distance data Z2 (=S1t2/S0t2+Zoffset2) output from the distance data output switching unit 13J, the RGB video generated by the RGB camera process processing unit 13E, and the IR video generated from the short-range infrared image or the long-range infrared image output from the IR data output switching unit 13L in a synchronized manner.

As described above, the three-dimensional video imaging device 1 according to the first embodiment can obtain the RGB video on the same optical axis of one lens 12A and the distance data (hereinafter, the distance data output from the distance data output switching unit 13J will be simply referred to as "distance data") output from the distance data output switching unit 13J, can obtain both the RGB video data and the distance data in a state where there is no deviation therebetween since there is no need to correct a difference in optical axes due to parallax, there is no need to perform correction processing of matching the positions of the two images in image correction processing after the image capturing, and it is possible to easily apply the three-dimensional video imaging device 1 according to the first embodiment to a system that obtains three-dimensional information from a video with motion and LIVE imaging.

Also, the three-dimensional video imaging device 1 according to the first embodiment can obtain the short-range and long-range distance data at the same time by using the two TOF sensors (the second imaging element 12E2 and the third imaging element 12E3), there are no frame mixing of the frame rate and image blur with respect to motion, and it is possible to obtain distance information in a wider range with no feeling of discomfort in the video.

Second Embodiment

Hereinafter, a second embodiment of a three-dimensional video imaging device according to the present invention will be described.

A three-dimensional video imaging device 1 according to the second embodiment is configured similarly to the three-dimensional video imaging device 1 according to the aforementioned first embodiment other than the points, which will be described later. Therefore, according to the three-dimensional video imaging device 1 in the second embodiment, it is possible to achieve effects similar to those of the three-dimensional video imaging device 1 according to the aforementioned first embodiment other than the points that will be described below.

In the three-dimensional video imaging device 1 according to the aforementioned first embodiment, there are no limits in transmittance and reflectance of the half mirror 12D. In other words, in the three-dimensional video imaging device 1 according to the first embodiment, a half mirror with an arbitrary transmittance and reflectance can be used as a half mirror 12D.

On the other hand, in the three-dimensional video imaging device 1 according to the second embodiment, limits of transmittance and reflectance of the half mirror 12D are provided for reasons, which will be described later.

As in the three-dimensional video imaging device 1 according to the aforementioned first embodiment, an electric charge is accumulated in a second imaging element 12E2 and a third imaging element 12E3 by repeating light emission of a light source unit 11 (infrared laser diode array) and exposure of the second imaging element 12E2 and the third imaging element 12E3 the number of pulse counts in accordance with sensitivity of the second imaging element 12E2 and the third imaging element 12E3 when the light source unit 11 emits infrared light. It is typically possible to fully use the bit width of A/D of the second imaging element 12E2 and the third imaging element 12E3 and to expect an improvement in S/N ratio by using the electric charge up to saturation of the amount of accumulation to the very limit. However, since the one light source unit 11 (infrared laser diode array) emits infrared light for both a short range and a long range and the second imaging element 12E2 and the third imaging element 12E3 capture the reflected light of the infrared light as in the aforementioned example, a signal obtained from the infrared light captured by the third imaging element 12E3 for the long range is darker (weaker) than a signal obtained by the second imaging element 12E2 for the short range although it depends on setting of the exposure periods. This is because light attenuates in inverse proportion to a square of a distance, and the subject S at a further place looks darker in a typical case.

For example, in a case where the three-dimensional video imaging device 1 is applied to a short range Near_min to Near_max and a long range Far_min to Far_max, a light emission period Tp of the light source unit 11 is set on the basis of one of the short range Near_min to Near_max and the long range Far_min to Far_max with a wider range.

In other words, in a case where a difference (Near_max-Near_min) between the short-distance maximum value Near_max and the short-distance minimum value Near_min is greater than a difference (Far_max-Far_min) between the long-distance maximum value Far_max and the long-distance minimum value Far_min, the length Tp_period (=Near_max-Near_min) corresponding to the light emission period becomes equal to the short range Near_min to Near_max.

On the other hand, in a case where the difference (Near_max-Near_min) between the short-distance maximum value Near_max and the short-distance minimum value Near_min is smaller than the difference (Far_max-Far_min) between the long-distance maximum value Far_max and the long-distance minimum value Far_min, the length Tp_period (=Far_max-Far_min) corresponding to the light emission period becomes equal to the long range Far_min to Far_max.

The light emission period Tp [nsec] of the light source unit 11 is represented by Expression 6 (Tp=Tp_period/C+h) described above.

An exposure period GS1 of the second imaging element 12E2 is represented by Expression 2 (GS1=Tp+(Near_max−Near_min+2× Near_min×0.01)/C) described above.

An exposure period GS2 of the third imaging element 12E3 is represented by Expression 4 (GS2=Tp+(Far_max−Far_min+2×Far_min×0.01)/C) described above.

As described above, in a case where the short-distance minimum value Near_min is 300 [mm], the short-distance maximum value Near_max is 1000 [mm], the short range Near_min to Near_max is 700 [mm] (=1000 [mm]−300 [mm]), the long-distance minimum value Far_min is 1000 [mm], the long-distance maximum value Far_max is 4000 [mm], and the long range Far_min to Far_max is 3000 [mm] (=4000 [mm]−1000 [mm]), the light emission period Tp of the light source unit 11 is 12 [nsec], the exposure period GS1 of the second imaging element 12E2 is 14.35 [nsec], and the exposure period GS2 of the third imaging element 12E3 is 22.07 [nsec].

A condition for the electric charge of the second imaging element 12E2 to be saturated to the maximum extent is a first exposure timing (S0' exposure timing) of the second imaging element 12E2 in a case where the distance between the three-dimensional video imaging device 1 and the subject S coincides with the short-distance minimum value Near_min.

It is considered that the electric charge of the used second imaging element 12E2 is saturated when the pulse count at that time is defined as N.

A condition for the electric charge of the third imaging element 12E3 to be accumulated to the maximum extend with the same pulse count N is a case where the distance between the three-dimensional video imaging device 1 and the subject S coincide with the long-distance minimum value Far_min.

Although the exposure period GS2 (22.07 [nsec]) of the third imaging element 12E3 is longer than the exposure period GS1 (14.35 [nsec]) of the second imaging element 12E2, attenuation in accordance with the distance of the reflected light of the infrared light is greater in the third imaging element 12E3 at a ratio of $(Near\_min \times 2)^2/(Far\_min \times 2)^2$.

In total in consideration of the exposure period as well, attenuation of the third imaging element 12E3 is greater than that of the second imaging element 12E2 by $GS2/GS1 \times (Near\_min \times 2)^2/(Far\_min \times 2)^2$ times.

Specifically, the exposure period GS2 of the third imaging element 12E3 is represented by Expression 4 (GS2=Tp+(Far_max−Far_min+2×Far_min×0.01)/C) described above.

As described above, in a case where the short-distance minimum value Near_min is 300 [mm], the short-distance maximum value Near_max is 1000 [mm], the short range Near_min to Near_max is 700 [mm] (=1000 [mm]−300 [mm]), the long-distance minimum value Far_min is 1000 [mm], the long-distance maximum value Far_max is 4000 [mm], the long range Far_min to Far_max is 3000 [mm] (=4000 [mm]−1000 [mm]), and the pulse count N=500 [mm], the attenuation of the third imaging element 12E3 and the attenuation of the second imaging element 12E2 is made $GS2/GS1 \times (300 \times 2)^2/(1000 \times 2)^2 = 0.14$ times, and the ratio is about 7:1=0.875:0.125.

Figure 13:
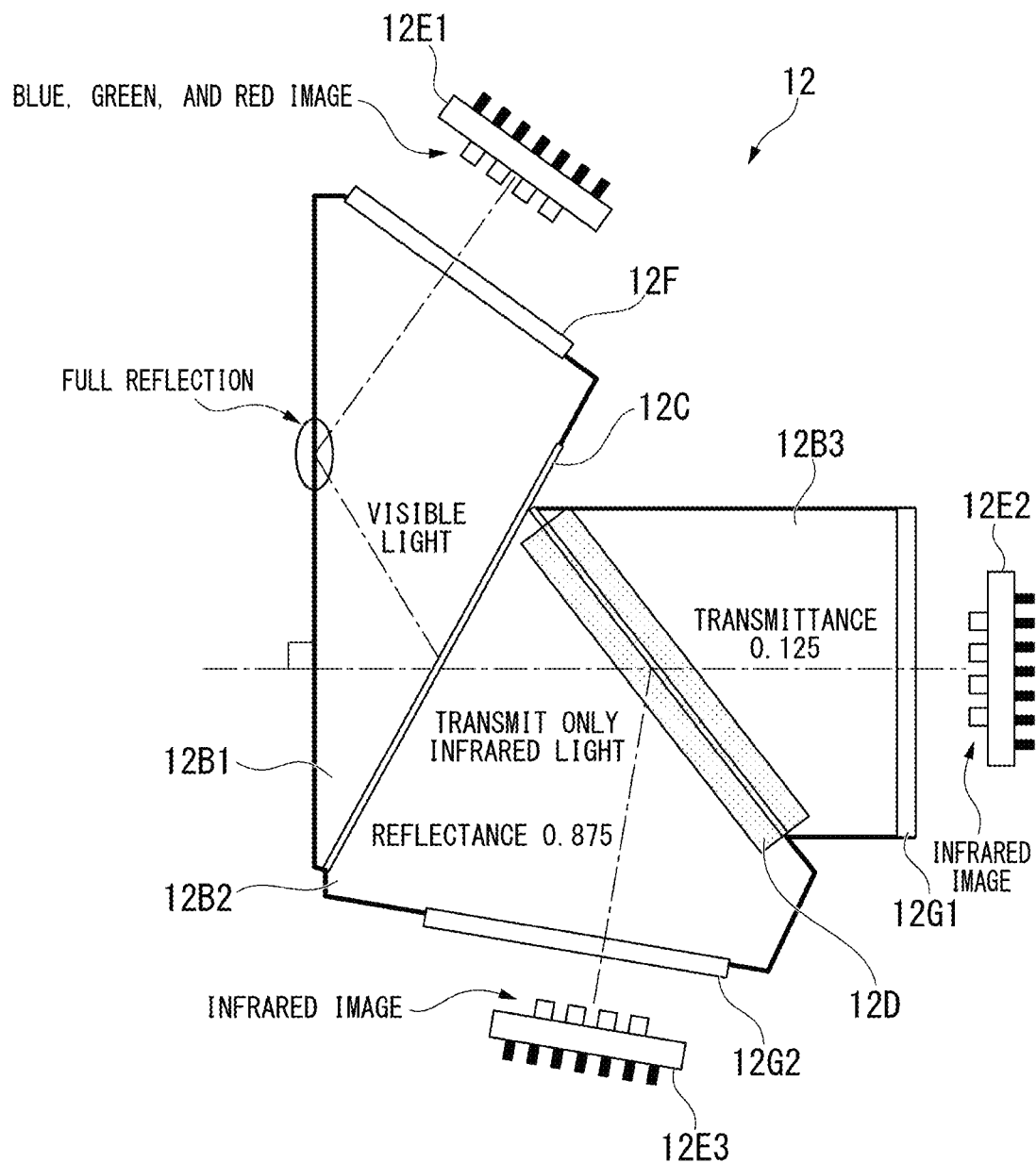
FIG. 13 is a diagram illustrating a part of a three-chip imaging element unit 12 in a first example of a three-dimensional video imaging device 1 according to a second embodiment in an enlarged manner.

In view of this point, a three-chip imaging element unit 12 is configured as illustrated in FIG. 13 in a first example of the three-dimensional video imaging device 1 according to the second embodiment.

FIG. 13 is a diagram illustrating a part of the three-chip imaging element unit 12 in the first example of the three-dimensional video imaging device 1 according to the second embodiment in an enlarged manner.

In the example illustrated in FIG. 13, the second imaging element 12E2 receives infrared light transmitted by the half mirror 12D similarly to the example illustrated in FIG. 3.

In the example illustrated in FIG. 3, there are no limits in transmittance and reflectance of the half mirror 12D. In other words, the transmittance of the half mirror 12D is, for example, 50% in the example illustrated in FIG. 3.

On the other hand, in the example illustrated in FIG. 13 (the first example of the three-dimensional video imaging device 1 according to the second embodiment), the transmittance of the half mirror 12D is smaller than 50% and is specifically 12.5%.

As described above, if the same amount of infrared light is incident on each of the second imaging element 12E2 and the third imaging element 12E3, the third imaging element 12E3, the measurement target of which is a long range, becomes dark and is unlikely to be saturated as described above. Therefore, the S/N ratio of the third imaging element 12E3 is typically degraded, and distance measurement accuracy thereof is also degraded. If short-distance measurement and long-distance measurement are switching in a picture of one frame as in an example in which the transmittance of the half mirror 12D is 50% in this state, point group data is created from outputs of the three-dimensional video imaging device 1, for example, an RGB image is synthesized, and a 3D image is displayed, a difference in S/N ratio and a difference in distance measurement accuracy appear, which leads to a feeling of discomfort.

Thus, in order to solve the above problem, the infrared light that is incident on the three-chip imaging element unit 12 is not dispersed at a proportion of 1:1 by the half mirror 12D such as the transmittance of 50% of the half mirror 12D, and is dispersed at a proportion of 7:1, for example, in the example illustrated in FIG. 13. In other words, infrared light transmitted by the half mirror 12D at the transmittance of 12.5% is caused to be incident on the second imaging element 12E2 for the short-distance measurement range, and the infrared light is reflected by the half mirror 12D at the reflectance of 87.5% and is caused to be incident on the third imaging element 12E3. In this manner, it is possible to correct the difference between the exposure of the second imaging element 12E2 and the third imaging element 12E3 due to the distances and the exposure periods by the optical system in advance.

In the example illustrated in FIG. 13, since the infrared light transmitted by the half mirror 12D at the transmittance of 12.5% is incident on the second imaging element 12E2, it is possible to effectively use the second imaging element 12E2 for the short distance and the third imaging element 12E3 for the long distance to the limits of saturation by setting the pulse count N to 4000 which is 8 times (=100%/12.5%) of 500, for example, and it is possible to raise the S/N ratios of the second imaging element 12E2 and the third imaging element 12E3. Even in a case where the short distance and the long distance are displayed in a switched manner on one screen as in the aforementioned example, it is possible to suppress a feeling of discomfort due to a difference in S/N ratios of the second imaging element 12E2 and the third imaging element 12E3.

In a second example of the three-dimensional video imaging device 1 according to the second embodiment, the third imaging element 12E3 for the long range receives the infrared light transmitted by the half mirror 12D unlike the first example of the three-dimensional video imaging device 1 according to the second embodiment illustrated in FIG. 13. Furthermore, the transmittance of the half mirror 12D is set to a value (87.5%, for example) that is greater than 50%.

Third Embodiment

Hereinafter, a third embodiment of a three-dimensional video imaging device according to the present invention will be described.

A three-dimensional video imaging device 1 according to the third embodiment is configured similarly to the three-dimensional video imaging device 1 according to the aforementioned first embodiment other than the points, which will be described later. Therefore, according to the three-dimensional video imaging device 1 in the third embodiment, it is possible to achieve effects similar to those of the three-dimensional video imaging device 1 according to the aforementioned first embodiment other than the points, which will be described later.

As described above, in the three-dimensional video imaging device 1 according to the first embodiment, a common pulse count number N is used for the exposure period GS1 of the second imaging element 12E2 for the short distance and the exposure period GS2 for the third imaging element 12E3 for the long distance.

On the other hand, in the three-dimensional video imaging device 1 according to the third embodiment, it is possible to achieve effects similar to those of the three-dimensional video imaging device 1 according to the second embodiment by setting a larger pulse count number of an exposure period GS2 of a third imaging element 12E3 for a long distance than a pulse count number of an exposure period GS1 of a second imaging element 12E2 for a short distance.

Figure 14:
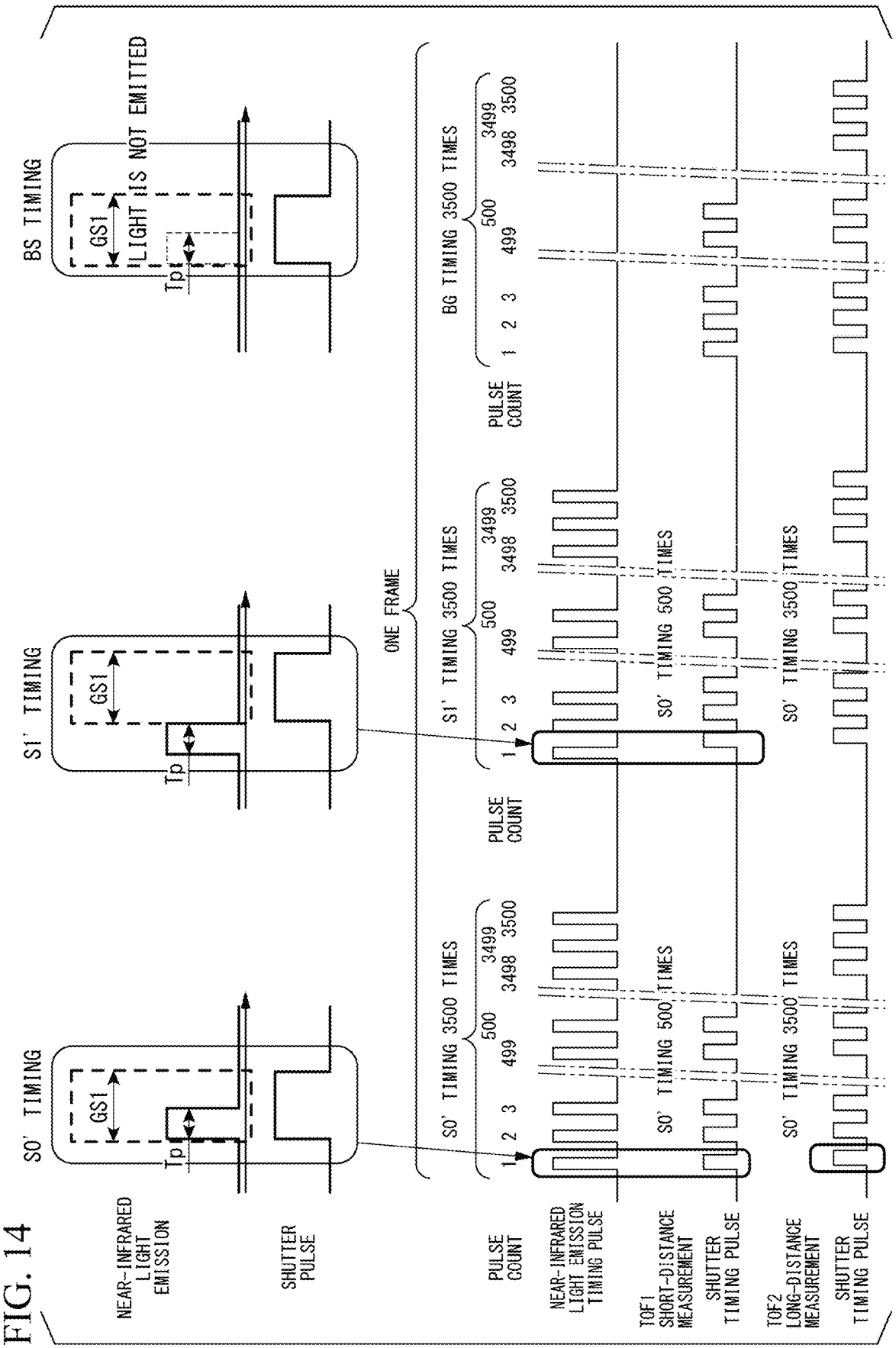
FIG. 14 is a diagram showing a pulse count in a first example of a three-dimensional video imaging device 1 according to a third embodiment.

FIG. 14 is a diagram showing a pulse count in a first example of the three-dimensional video imaging device 1 according to the third embodiment.

In the example illustrated in FIG. 14, a ratio between a pulse count number (500 times) of the exposure period GS1 of the second imaging element 12E2 for the short distance and the pulse count number (3500 times) of the exposure period GS2 of the third imaging element 12E3 for the long distance is set to 1:7.

Specifically, at a first exposure timing (S0' exposure timing) of the second imaging element 12E2 and the third imaging element 12E3, a light source unit 11 performs light emission 3500 times. Also, exposure of 3500 times at the first exposure timing (S0' exposure timing) of the third imaging element 12E3 is performed in synchronization with light emission performed 3500 times by the light source unit 11. Furthermore, exposure of 500 times at the first exposure timing (S0' exposure timing) of the second imaging element 12E2 is performed in synchronization with exposure of the first 500 times out of the exposure of 3500 times at the first exposure timing (S0' exposure timing) of the third imaging element 12E3.

Moreover, the light source unit 11 performs light emission 3500 times at a second exposure timing (S1' exposure timing) of the second imaging element 12E2 and the third imaging element 12E3. Also, exposure of 3500 times at the second exposure timing (S1' exposure timing) of the third imaging element 12E3 is performed in synchronization with the light emission performed 3500 times by the light source unit 11. Furthermore, exposure of 500 times at the second exposure timing (S1' exposure timing) of the second imaging element 12E2 is performed in synchronization with exposure of the first 500 times out of exposure of 3500 times at the second exposure timing (S1' exposure timing) of the third imaging element 12E3.

Moreover, exposure of 3500 times at the third exposure timing (BG exposure timing) of the third imaging element 12E3 is performed at a third exposure timing (BG) exposure timing) of the second imaging element 12E2 and the third imaging element 12E3. Furthermore, exposure of 500 times at the third exposure timing (BG exposure timing) of the second imaging element 12E2 is performed in synchronization with exposure of the first 500 times out of exposure of 3500 times at the third exposure timing (BG exposure timing) of the third imaging element 12E3.

In an example illustrated in FIG. 14 (a first example of the three-dimensional video imaging device 1 according to the third embodiment), the pulse count of the exposure of 500 times of the second imaging element 12E2 ends first, and exposure of the second imaging element 12E2 is not performed at all when the 501st to 3500th exposure of the third imaging element 12E3 is performed, image blur of the second imaging element 12E2 for the short distance and image blur of the third imaging element 12E3 for the long distance thus differ for a subject with motion, and there is a concern that a feeling of discomfort may occur at a connected part between the short distance and the long distance or as a 3D picture as a whole.

Thus, a countermeasure, which will be described later, is taken in a second example of the three-dimensional video imaging device 1 according to the third embodiment.

Figure 15:
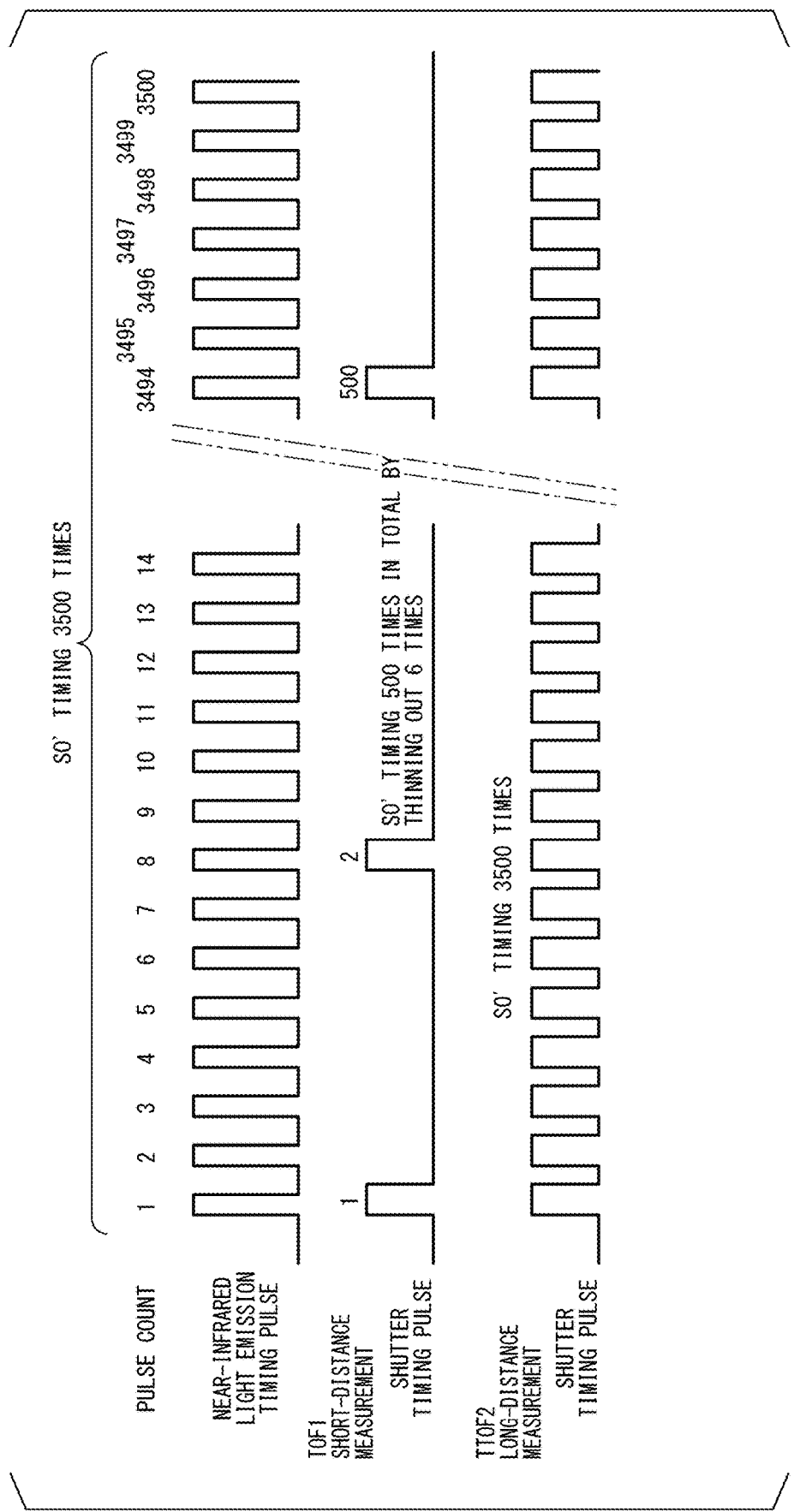
FIG. 15 is a diagram showing a pulse count in a second example of the three-dimensional video imaging device 1 according to the third embodiment.

FIG. 15 is a diagram showing a pulse count in the second example of the three-dimensional video imaging device 1 according to the third embodiment.

In the example illustrated in FIG. 15, the pulse count number (500 times) of the exposure period GS1 of the second imaging element 12E2 for the short distance is set by substantially uniformly thinning out the pulse count number (3500 times) of the exposure period GS2 of the third imaging element 12E3 for the long distance.

Specifically, the light source unit 11 performs light emission 3500 times at the first exposure timing (S0' exposure timing) of the second imaging element 12E2 and the third imaging element 12E3. Also, the exposure of 3500 times at the first exposure timing (S0' exposure timing) of the third imaging element 12E3 is performed in synchronization with the light emission performed 3500 times by the light source unit 11. Furthermore, the first exposure at the first exposure timing (S0' exposure timing) of the second imaging element 12E2 is performed in synchronization with the first exposure at the first exposure timing (S0' exposure timing) of the third imaging element 12E3, the second exposure at the first exposure timing (S0' exposure timing) of the second imaging element 12E2 is then performed in synchronization with the eighth exposure at the first exposure timing (S0' exposure timing) of the third imaging element 12E3, the third exposure at the first exposure timing (S0' exposure timing) of the second imaging element 12E2 is then performed in synchronization with the fifteenth exposure at the first exposure timing (S0' exposure timing) of the third imaging element 12E3, and similarly, the n-th exposure at the first exposure timing (S0' exposure timing) of the second imaging element 12E2 is performed in synchronization with the (7×(n−1)+1)-th exposure at the first exposure timing (S0' exposure timing) of the third imaging element 12E3 (n=4 to 500).

Although not illustrated in FIG. 15, the light source unit 11 performs light emission 3500 times at the second exposure timing (S1' exposure timing) of the second imaging element 12E2 and the third imaging element 12E3. Also, exposure of 3500 times at the second exposure timing (S1' exposure timing) of the third imaging element 12E3 is performed in synchronization with the light emission performed 3500 times by the light source unit 11. Furthermore, the first exposure at the second exposure timing (S1' exposure timing) of the second imaging element 12E2 is performed in synchronization with the first exposure at the second exposure timing (S1' exposure timing) of the third imaging element 12E3, the second exposure at the second exposure timing (S1' exposure timing) of the second imaging element 12E2 is then performed in synchronization with the eighth exposure at the second exposure timing (S1' exposure timing) of the third imaging element 12E3, the third exposure at the second exposure timing (S1' exposure timing) of the second imaging element 12E2 is then performed in synchronization with the fifteenth exposure at the second exposure timing (S1' exposure timing) of the third imaging element 12E3, and similarly, the n-th exposure at the second exposure timing (S1' exposure timing) of the second imaging element 12E2 is performed in synchronization with the (7×(n−1)+1)-th exposure at the second exposure timing (S1' exposure timing) of the third imaging element 12E3 (n=4 to 500).

Furthermore, although not illustrated in FIG. 15, exposure of 3500 times at the third exposure timing (BG exposure timing) of the third imaging element 12E3 is performed at the third exposure timing (BG exposure timing) of the second imaging element 12E2 and the third imaging element 12E3. Moreover, the first exposure at the third exposure timing (BG exposure timing) of the second imaging element 12E2 is performed in synchronization with the first exposure at the third exposure timing (BG exposure timing) of the third imaging element 12E3, the second exposure at the third exposure timing (BG exposure timing) of the second imaging element 12E2 is then performed in synchronization with the eighth exposure at the third exposure timing (BG exposure timing) of the third imaging element 12E3, the third exposure at the third exposure timing (BG exposure timing) of the second imaging element 12E2 is then performed in synchronization with the fifteenth exposure at the third exposure timing (BG exposure timing) of the third imaging element 12E3, and similarly, the n-th exposure at the third exposure timing (BG exposure timing) of the second imaging element 12E2 is performed in synchronization with the (7×(n−1)+1)-th exposure at the third exposure timing (BG exposure timing) of the third imaging element 12E3 (n=4 to 500).

In the example illustrated in FIG. 15, since the pulse count of the exposure of the second imaging element 12E2 for the short distance is caused once per seven pulse counts of the exposure of the third imaging element 12E3 for the long distance, there is thus no large difference between the start and the end of the pulse count, image blur of the short range and the long range with respect to a moving subject looks the same, and it is possible to suppress a feeling of discomfort caused by a difference in image blur of a 3D picture obtained by synthesizing the distance data and the RGB data obtained from the three-dimensional video imaging device 1.

Although the transmittance and the reflectance of the half mirror 12D are 50% in the example illustrated in FIGS. 14 and 15, there is also an advantage that the optimal amount of saturation can be adjusted by software of a CPU (control unit 13H) when the measurement ranges of the second imaging element 12E2 and the third imaging element 12E3 are changed by an application by setting different pulse counts for the short-distance measurement and the long-distance measurement even in an example in which the transmittance and the reflectance of the half mirror 12D differ.

The processing unit 13 includes hardware resources such as a CPU and a memory and operates in accordance with software stored in the memory.

In a case where at least some of components configuring the three-dimensional video imaging device 1 is realized by software, the components realized by the software may be realized by activating software or a program defining operations related to the components in the three-dimensional video imaging device 1 with a typical configuration. The three-dimensional video imaging device 1 with the typical configuration may include (i) a data processing device including a processor such as a CPU, a ROM, a RAM, a communication interface, and the like, (ii) input devices such as camera and various sensors, (iii) output devices, and (iv) storage devices (including external storage devices) such as a memory, an HDD, and an SSD.

Fourth Embodiment

Hereinafter, a fourth embodiment of a three-dimensional video imaging device according to the present invention will be described.

A three-dimensional video imaging device 1 according to the fourth embodiment is configured similarly to the three-dimensional video imaging device 1 according to the aforementioned first embodiment other than the points, which will be described later. Therefore, according to the three-dimensional video imaging device 1 in the fourth embodiment, it is possible to achieve effects similar to those of the three-dimensional video imaging device 1 according to the aforementioned first embodiment other than the points, which will be described later.

Figure 16:
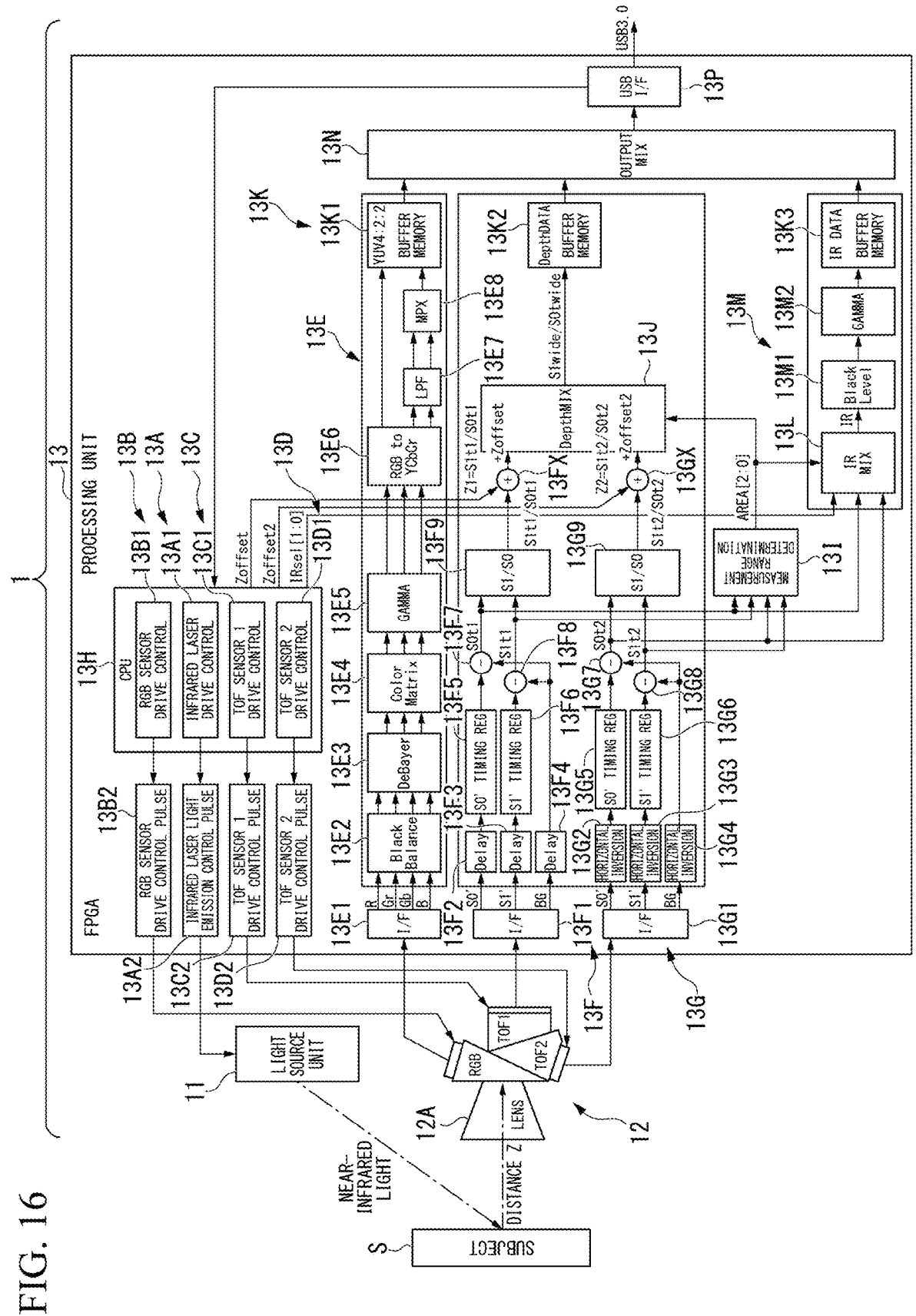
FIG. 16 is a diagram illustrating an example of a three-dimensional video imaging device 1 according to a fourth embodiment.

FIG. 16 is a diagram illustrating an example of the three-dimensional video imaging device 1 according to the fourth embodiment.

In the example illustrated in FIG. 16, the three-dimensional video imaging device 1 includes a light source unit 11 that irradiates a subject S with infrared light, a three-chip imaging element unit 12 on which reflected light of the infrared light emitted by the light source unit 11 and reflected by the subject S and reflected light of visible light from the subject S are incident, and a processing unit 13 that performs control of the light source unit 11 and the three-chip imaging element unit 12 and processing of signals output from the three-chip imaging element unit 12, similarly to the example illustrated in FIG. 1.

In the example illustrated in FIG. 16, the three-chip imaging element unit 12 includes a first prism 12B1 on which the infrared light and the visible light from the subject S are incident, a reflection dichroic film 12C that reflects the visible light and transmits the infrared light out of the infrared light and the visible light that have been incident on the first prism 12B1, a first imaging element 12E1 that receives the visible light reflected by the reflection dichroic film 12C, a second prism 12B2 on which the infrared light transmitted by the reflection dichroic film 12C is incident, a half mirror 12D that reflects a part of the infrared light that has been incident on the second prism 12B2 and transmits the remainder of the infrared light that has been incident on the second prism 12B2, a third prism 12B3 on which the infrared light transmitted by the half mirror 12D is incident, a second imaging element 12E2 that receives the infrared light transmitted by the half mirror 12D, and a third imaging element 12E3 that receives the infrared light reflected by the half mirror 12D, similarly to the example illustrated in FIG. 3.

In the example illustrated in FIG. 16, the second imaging element 12E2 is a short-range TOF sensor used to measure a distance range Near_min to Near_max from a short-distance minimum value Near_min to a short-distance maximum value Near_max similarly to the example illustrated in FIG. 3. Also, the third imaging element 12E3 is a long-range TOF sensor used to measure a distance range Far_min to Far_max that is a distance range further than the distance range Near_min to Near_max from the short-distance minimum value Near_min to the short-distance maximum value Near_max and is from a long-distance minimum value Far_min to a long-distance maximum value Far_max.

In the example illustrated in FIG. 16, a part of the distance range Near_min to Near_max from the short-distance minimum value Near_min to the short-distance maximum value Near_max and a part of the distance range Far_min to Far_max from the long-distance minimum value Far_min to the long-distance maximum value Far_max overlap with each other to configure an overlapping measurement range Far_min to Near_max, unlike the example illustrated in FIG. 1.

A short-distance measurement range Near_min to Far_min is obtained by excluding the overlapping measurement range Far_min to Near_max from the distance range Near_min to Near_max from the short-distance minimum value Near_min to the short-distance maximum value Near_max.

A long-distance measurement range Near_max to Far_max is obtained by excluding the overlapping measurement range Far_min to Near_max from the distance range Far_min to Far_max from the long-distance minimum value Far_min to the long-distance maximum value Far_max.

In the example illustrated in FIG. 16, the second imaging element 12E2 includes a first part 12E21 that accumulates an electric charge at a first exposure timing (S0' exposure timing) of the second imaging element 12E2 which is an exposure timing of the second imaging element 12E2, at least most of the light emission period Tp of the light source unit 11 being included in an exposure period of the second imaging element 12E2, a second part 12E22 that accumulates an electric charge at a second exposure timing (S1' exposure timing) of the second imaging element 12E2 which is an exposure timing of the second imaging element 12E2, the exposure period of the second imaging element 12E2 starting after the light emission period Tp of the light source unit 11 ends, and a third part 12E23 that accumulates an electric charge at a third exposure timing (BG exposure timing) of the second imaging element 12E2 which is an exposure timing of the second imaging element 12E2 at which the second imaging element 12E2 does not receive the reflected light of the infrared light emitted by the light source unit 11 and reflected by the subject S similarly to the example illustrated in FIG. 6.

In the example illustrated in FIG. 16, the third imaging element 12E3 includes a first part 12E31 that accumulates an electric charge at a first exposure timing (S0' exposure timing) of the third imaging element 12E3 which is an exposure timing of the third imaging element 12E3, at least a part of the light emission period Tp of the light source unit 11 being included in the exposure period of the third imaging element 12E3, a second part 12E32 that accumulates an electric charge at a second exposure timing (S1' exposure timing) of the third imaging element 12E3 which is an exposure timing of the third imaging element 12E3, the exposure period of the third imaging element 12E3 starting after the light emission period Tp of the light source unit 11 ends, and a third part 12E33 that accumulates an electric charge at a third exposure timing (BG exposure timing) of the third imaging element 12E3 that is an exposure timing of the third imaging element 12E3, during which the third imaging element 12E3 does not receive the reflected light of the infrared light emitted by the light source unit 11 and reflected by the subject S similarly to the example illustrated in FIG. 6.

Although the second imaging element 12E2 includes the third part 12E23 and the third imaging element 12E3 includes the third part 12E33 in the example illustrated in FIG. 16 (a first example of the three-dimensional video imaging device 1 according to the fourth embodiment), the second imaging element 12E2 may not include the third part 12E23 and the third imaging element 12E3 may not include the third part 12E33 in another example (a second example of the three-dimensional video imaging device 1 according to the fourth embodiment).

In the example illustrated in FIG. 16, the processing unit 13 includes an emission control unit 13A that controls light emission of the light source unit 11, a second imaging element control unit 13C that controls exposure timings (S0' exposure timing, S1' exposure timing, and BG exposure timing) of the second imaging element 12E2, a third imaging element control unit 13D that controls exposure timings (S0' exposure timing, S1' exposure timing, and BG exposure timing) of the third imaging element 12E3, a first distance data calculation unit 13F that calculates first distance data Z1 (=S1t1/S0t1+Zoffset) indicating the distance between the three-dimensional video imaging device 1 and the subject S on the basis of the electric charge accumulated in the first part 12E21 of the second imaging element 12E2, the electric charge accumulated in the second part 12E22 of the second imaging element 12E2, and the electric charge accumulated in the third part 12E23 of the second imaging element 12E2, and a second distance data calculation unit 13G that calculates second distance data Z2 (=S1t2/S0t2+Zoffset2) indicating the distance between the three-dimensional video imaging device 1 and the subject S on the basis of the electric charge accumulated in the first part 12E31 of the third imaging element 12E3, the electric charge accumulated in the second part 12E32 of the third imaging element 12E3, and the electric charge accumulated in the third part 12E33 of the third imaging element 12E3 similarly to the example illustrated in FIG. 1.

In a second example (that is, an example in which the second imaging element 12E2 does not include the third part 12E23) of the three-dimensional video imaging device 1 according to the aforementioned fourth embodiment, the second imaging element control unit 13C controls the exposure timings (S0' exposure timing and S1' exposure timing) of the second imaging element 12E2.

Also, in the second example (that is, the example in which the third imaging element 12E3 does not include the third part 12E33) of the three-dimensional video imaging device 1 according to the aforementioned fourth embodiment, the third imaging element control unit 13D controls the exposure timings (S0' exposure timing and S1' exposure timing) of the third imaging element 12E3.

In the example illustrated in FIG. 16, the second imaging element control unit 13C starts an exposure period GS1 corresponding to the first exposure timing (S0' exposure timing) of the second imaging element 12E2 at a timing when an offset time Toffset (=2×(Near_min−Near_min×0.01)/C) based on the short-distance minimum value Near_min elapses from the start timing of the light emission period Tp of the light source unit 11, and starts an exposure period GS1 corresponding to the second exposure timing (S1' exposure timing) of the second imaging element 12E2 at a timing when the offset time Toffset (=2×(Near_min−Near_min×0.01)/C) based on the short-distance minimum value Near_min elapses from the end timing of the light emission period Tp of the light source unit 11, similarly to the example illustrated in FIG. 1.

In the example illustrated in FIG. 16, the third imaging element control unit 13D starts an exposure period GS2 that corresponds to the first exposure timing (S0' exposure timing) of the third imaging element 12E3 and is set within the same frame as that of the exposure period GS1 corresponding to the first exposure timing (S0' exposure timing) of the second imaging element 12E2 at a timing when an offset time Toffset2 (=2×(Far_min−Far_min×0.01)/C) based on the long-distance minimum value Far_min elapses from the start timing of the light emission period Tp of the light source unit 11, and starts an exposure period GS2 that corresponds to the second exposure timing (S1' exposure timing) of the third imaging element 12E3 and is set within the same frame as that of the exposure period GS1 corresponding to the second exposure timing (S1' exposure timing) of the second imaging element 12E2 at a timing when the offset time Toffset2 (=2×(Far_min−Far_min×0.01)/C) based on the long-distance minimum value Far_min elapses from the end timing of the light emission period Tp of the light source unit 11, similarly to the example illustrated in FIG. 1.

In the example illustrated in FIG. 16, the measurement range determination unit 13I determines at least which of the short-distance measurement range Near_min to Far_min, the overlapping measurement range Far_min to Near_max, and the long-distance measurement range Near_max to Far_max the distance between the three-dimensional video imaging device 1 and the subject S measured by the three-dimensional video imaging device 1 is included in on the basis of a signal indicating the electric charge accumulated in the first part 12E21 of the second imaging element 12E2, a signal indicating the electric charge accumulated in the second part 12E22 of the second imaging element 12E2, a signal indicating the electric charge accumulated in the third part 12E23 of the second imaging element 12E2, a signal indicating the electric charge accumulated in the first part 12E31 of the third imaging element 12E3, a signal indicating the electric charge accumulated in the second part 12E32 of the third imaging element 12E3, a signal indicating the electric charge accumulated in the third part 12E33 of the third imaging element 12E3, and a preset determination rule illustrated in Table 2, unlike the example illustrated in FIG. 1.

In the second example (that is, the example in which the second imaging element 12E2 does not include the third part 12E23 and the third imaging element 12E3 does not include the third part 12E33) of the three-dimensional video imaging device 1 according to the aforementioned fourth embodiment, the measurement range determination unit 13I determines at least which of the short-distance measurement range Near_min to Far_min, the overlapping measurement range Far_min to Near_max, and the long-distance measurement range Near_max to Far_max the distance between the three-dimensional video imaging device 1 and the subject S measured by the three-dimensional video imaging device 1 is included in on the basis of a signal indicating the electric charge accumulated in the first part 12E21 of the second imaging element 12E2, a signal indicating the electric charge accumulated in the second part 12E22 of the second imaging element 12E2, a signal indicating the electric charge accumulated in the first part 12E31 of the third imaging element 12E3, a signal indicating the electric charge accumulated in the second part 12E32 of the third imaging element 12E3, and the preset determination rule illustrated in Table 2.

TABLE 2

| Measurement range | Details | AREA[2:0] |
|---|---|---|
| 0 to Near_min (mm) | A distance that is shorter than the short-distance measurement range | 0 |
| Near_min to Far_min (mm) | A short-distance measurement range | 1 |
| Far_min to Near_max (mm) | An overlapping measurement range | 2 |
| Near_max to Far_max (mm) | A long-distance measurement range | 3 |
| Far_max (mm) or more | A distance that is further than the long-distance measurement range | 4 |

In the example illustrated in FIG. 16, the distance data output switching unit 13J outputs first distance data Z1 (=S1t1/S0t1+Zoffset) calculated by the first distance data calculation unit 13F in a case where the measurement range determination unit 13I determines that the distance between the three-dimensional video imaging device 1 and the subject S measured by the three-dimensional video imaging device 1 is included in the short-distance measurement range Near_min to Far_min, outputs second distance data Z2 (=S1t2/S0t2+Zoffset2) calculated by the second distance data calculation unit 13G in a case where the measurement range determination unit 13I determines that the distance between the three-dimensional video imaging device 1 and the subject S measured by the three-dimensional video imaging device 1 is included in the long range Near_max to Far_max, and mixes and outputs the first distance data Z1 (=S1t1/S0t1+Zoffset) calculated by the first distance data calculation unit 13F and the second distance data Z2 (=S1t2/S0t2+Zoffset2) calculated by the second distance data calculation unit 13G as will be described later in a case where the measurement range determination unit 13I determines that the distance between the three-dimensional video imaging device 1 and the subject S measured by the three-dimensional video imaging device 1 is included in the overlapping measurement range Far_min to Near_max, unlike the example illustrated in FIG. 1.

In other words, the three-dimensional video imaging device 1 according to the fourth embodiment takes the point that smooth switching is not performed at a switching point due to variations in characteristics and noise in the second imaging element 12E2 and the third imaging element 12E3 and differences in sensitivity and shutter speeds (exposure periods) into consideration.

Thus, in the example illustrated in FIG. 16, the measurement target distance is caused to slightly overlap between the short-distance measurement range of the second imaging element 12E2 and the long-distance measurement range of the third imaging element 12E3, and the mixing (MIX) ratio is changed by the distances of the outputs of the second imaging element 12E2 and the third imaging element 12E3, such that gradual and smooth shift is achieved between the distance result of the output of the second imaging element 12E2 for the short distance range and the distance result of the output of the third imaging element 12E3 for the long distance range.

In the example illustrated in FIG. 16, the measurement ranges are set such that the short-distance maximum value Near_max>the long-distance minimum value Far_min is satisfied, and both the second imaging element 12E2 and the third imaging element 12E3 acquire distance data for the distance range of the long-distance minimum value Far_min to the short-distance maximum value Near_max which is the overlapping distance range.

In an example illustrated in FIG. 17 which is an example of the three-dimensional video imaging device 1 according to the fourth embodiment, the short distance measurement range (the short-distance minimum value Near_min to the short-distance maximum value Near_max) is set to 300 mm to 1050 mm, the long-distance measurement range (the long-distance minimum value Far_min to the long-distance maximum value Far_max) is set to 950 mm to 4000 mm, the overlapping distance range (the long-distance minimum value Far_min to the short-distance maximum value Near_max) is set to 950 mm to 1050 mm, and both the second imaging element 12E2 and the third imaging element 12E3 acquire the distance data for the overlapping distance range.

FIGS. 17A to 17D are diagrams illustrating timings in an example of the three-dimensional video imaging device 1 according to the fourth embodiment.

In the example illustrated in FIGS. 17A to 17D, since Near_max−Near_min<Far_max−Far_min is satisfied, the light emission period Tp of the light source unit 11 is obtained as follows on the basis of Far_max−Far_min (=3050 (mm)).

$$Tp = 3050/C + h = 12.16 \text{ nsec}$$

$$C: \text{speed of light} (3 \times 10^{11} [\text{mm/s}])$$

h: amount of pulse inclination correction (here, this is assumed to be 2 [nsec].)

The exposure period GS1 of the second imaging element 12E2 and the exposure period GS2 of the third imaging element 12E3 are obtained as follows.

$$GS1 = Tp + (1050 \text{ mm} - 300 \text{ mm} + 2 \times 300 \text{ mm} \times 0.01)/C = 14.69 \text{ nsec}$$

$$GS2 = Tp + (4000 \text{ mm} - 950 \text{ mm} + 2 \times 950 \text{ mm} \times 0.01)/C = 22.4 \text{ nsec}$$

In this manner, the light emission period Tp of the light source unit 11, the exposure period GS1 of the second imaging element 12E2, and the exposure period GS2 of the third imaging element 12E3 are set, the second imaging element 12E2 performs exposure at a matched timing in the exposure period GS1 (shutter speed) to measure a short distance, the third imaging element 12E3 performs exposure at a matched timing in the exposure period GS2 (shutter speed) to measure a long distance, and the processing unit 13 illustrated in FIG. 16 obtains a result of computation (S1t1/S0t1) in proportion to the measured distance and a result of computation (S1t2/S0t2). The processing unit 13 obtains the first distance data Z1 (=S1t1/S0t1+Zoffset) in proportion to the actual distance by adding the offset value Zoffset to the result of the computation (S1t1/S0t1). Also, the processing unit 13 obtains the second distance data Z2 (=S1t2/S0t2+Zoffset2) in proportion to the actual distance by adding the offset value Zoffset2 to the result of the computation (S1t2/

S0t2). The control unit 13H sets a value (Toffset/2×C) calculated in advance in the offset value Zoffset and inputs the set offset value Zoffset to the addition unit 13FX. Also, the control unit 13H sets a value (Toffset2/2×C) calculated in advance in the offset value Zoffset2 and inputs the set offset value Zoffset2 to the addition unit 13GX. In this manner, the processing unit 13 in FIG. 16 obtains the first distance data Z1 and the second distance data Z2 in proportion to the measured distance.

Next, the measurement range determination unit 13I determines which of the short distance measurement range, the long distance measurement range, and the overlapping distance range distance between the subject S corresponding to the pixel for which distance measurement is being currently performed and the three-dimensional video imaging device 1 is included in, and the distance data output switching unit 13J switches an output of the first distance data Z1, an output of the second distance data, or mixing and output of the first distance data Z1 and the second distance data Z2 in accordance with the determination result of the measurement range determination unit 13I. As a result, distance data S1wide/S0wide in proportion to the distance in a wider range that cannot be obtained by one TOF sensor is obtained. The measurement range determination unit 13I performs the determination on the basis of the determination rule illustrated in Table 2 and outputs a 3-bit signal of AREA [2:0].

The measurement range determination unit 13I checks the following conditions in order and determines which of the items in Table 2 the distance between the subject S and the three-dimensional video imaging device 1 that is being currently measured corresponds to.

Figure 17A:
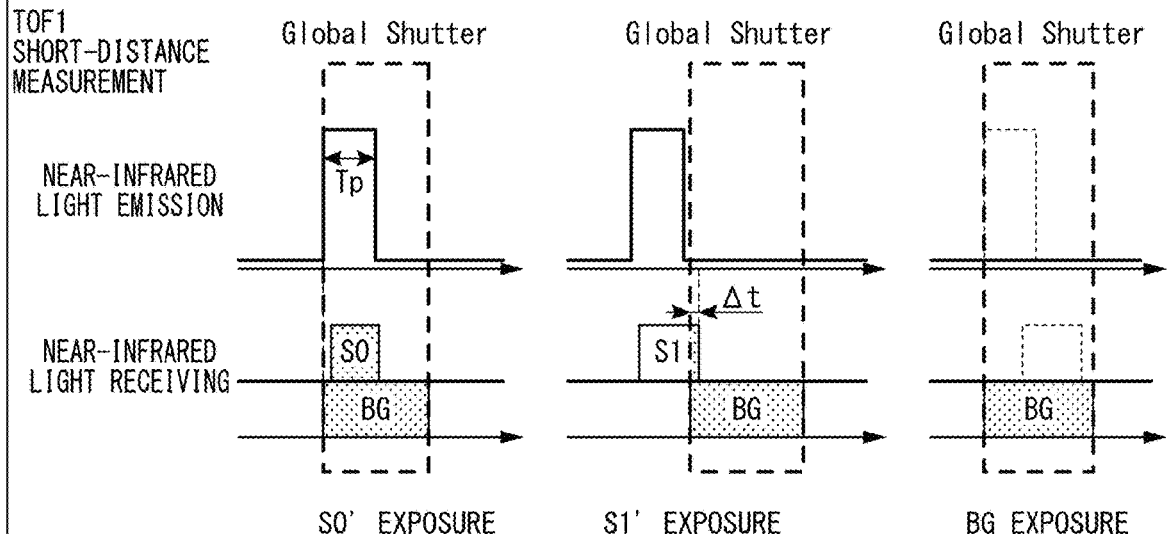
FIG. 17A is a diagram illustrating a timing in an example of three-dimensional video imaging device 1 according to the fourth embodiment.
Figure 17A:
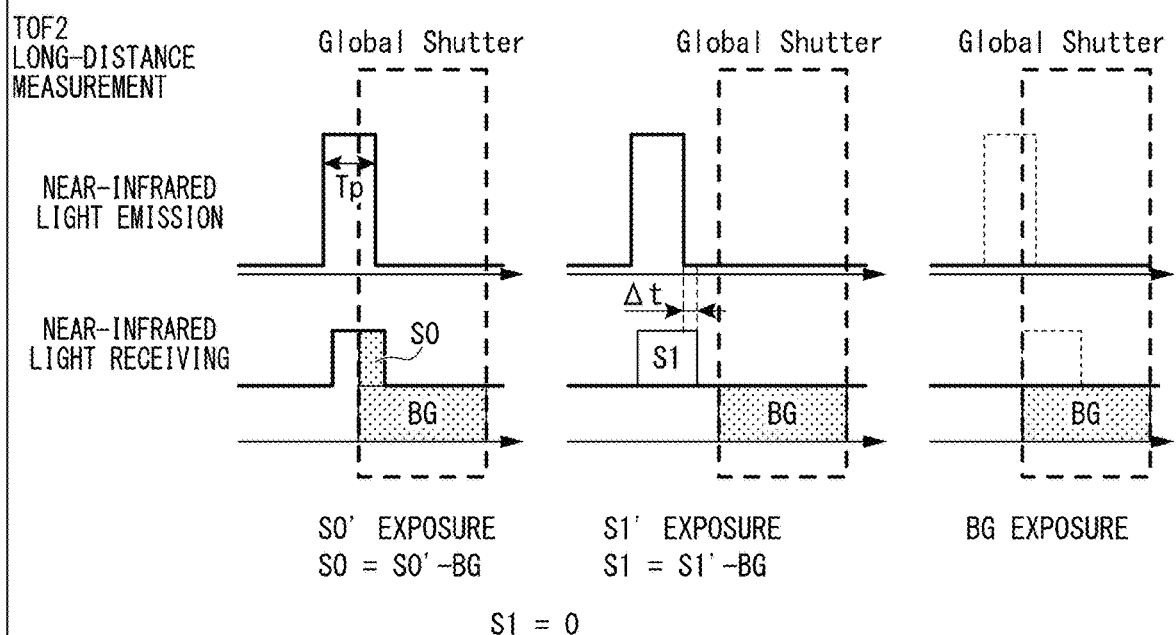
Figure 17B:
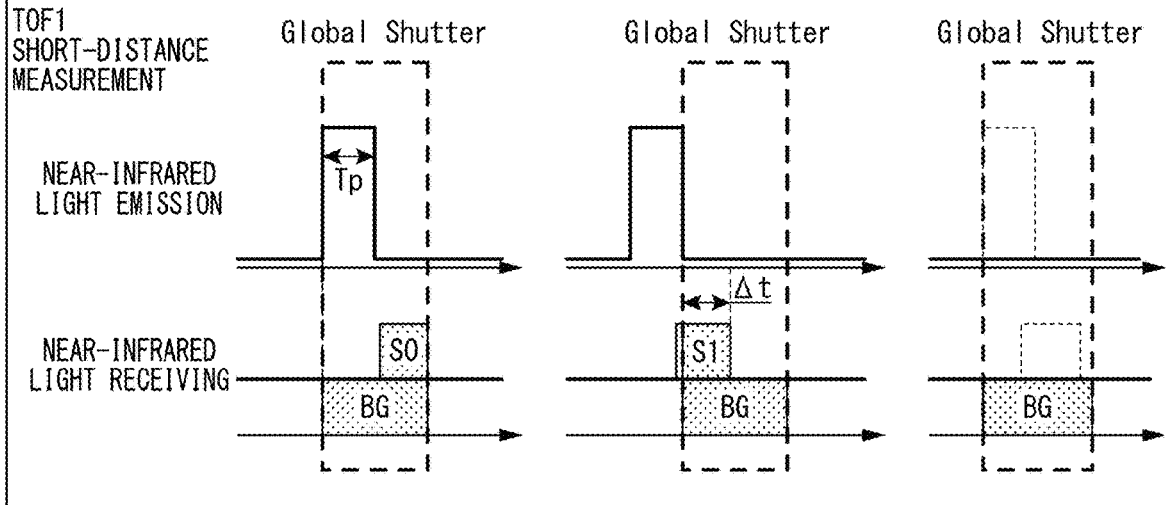
FIG. 17B is a diagram illustrating a timing in an example of the three-dimensional video imaging device 1 according to the fourth embodiment.
Figure 17B:
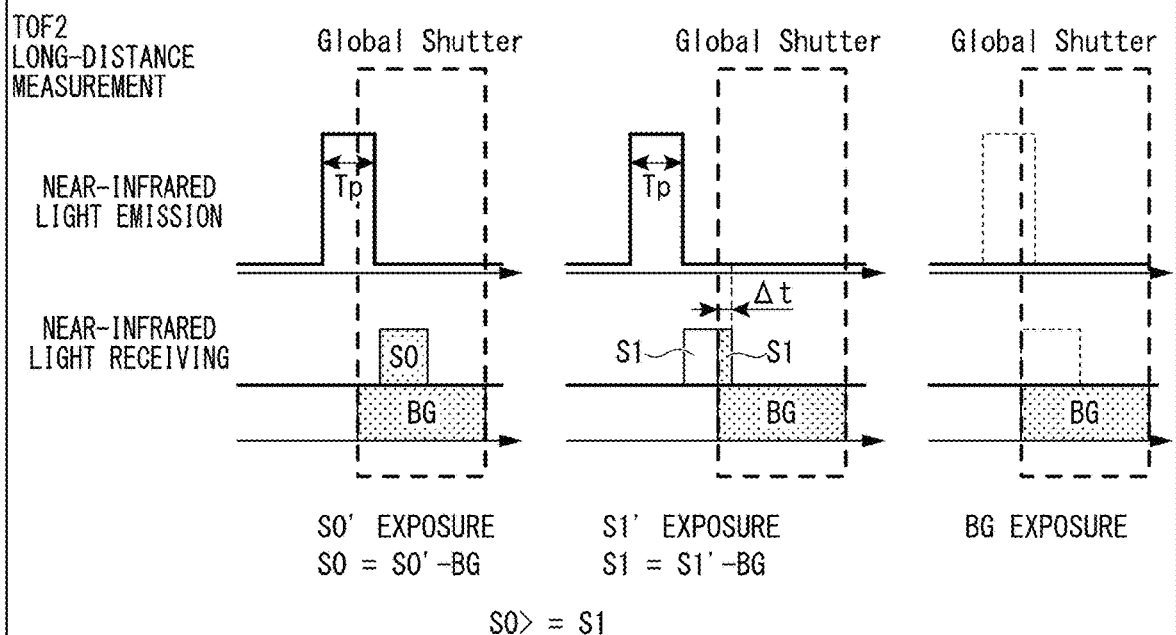
Figure 17C:
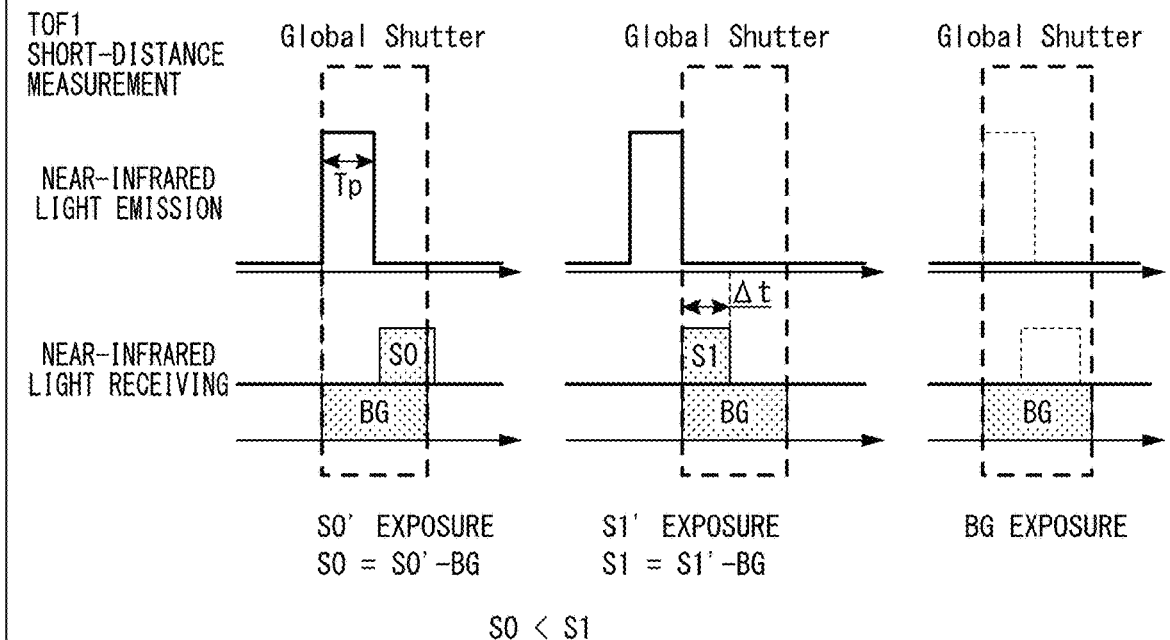
FIG. 17C is a diagram illustrating a timing in an example of the three-dimensional video imaging device 1 according to the fourth embodiment.
Figure 17D:
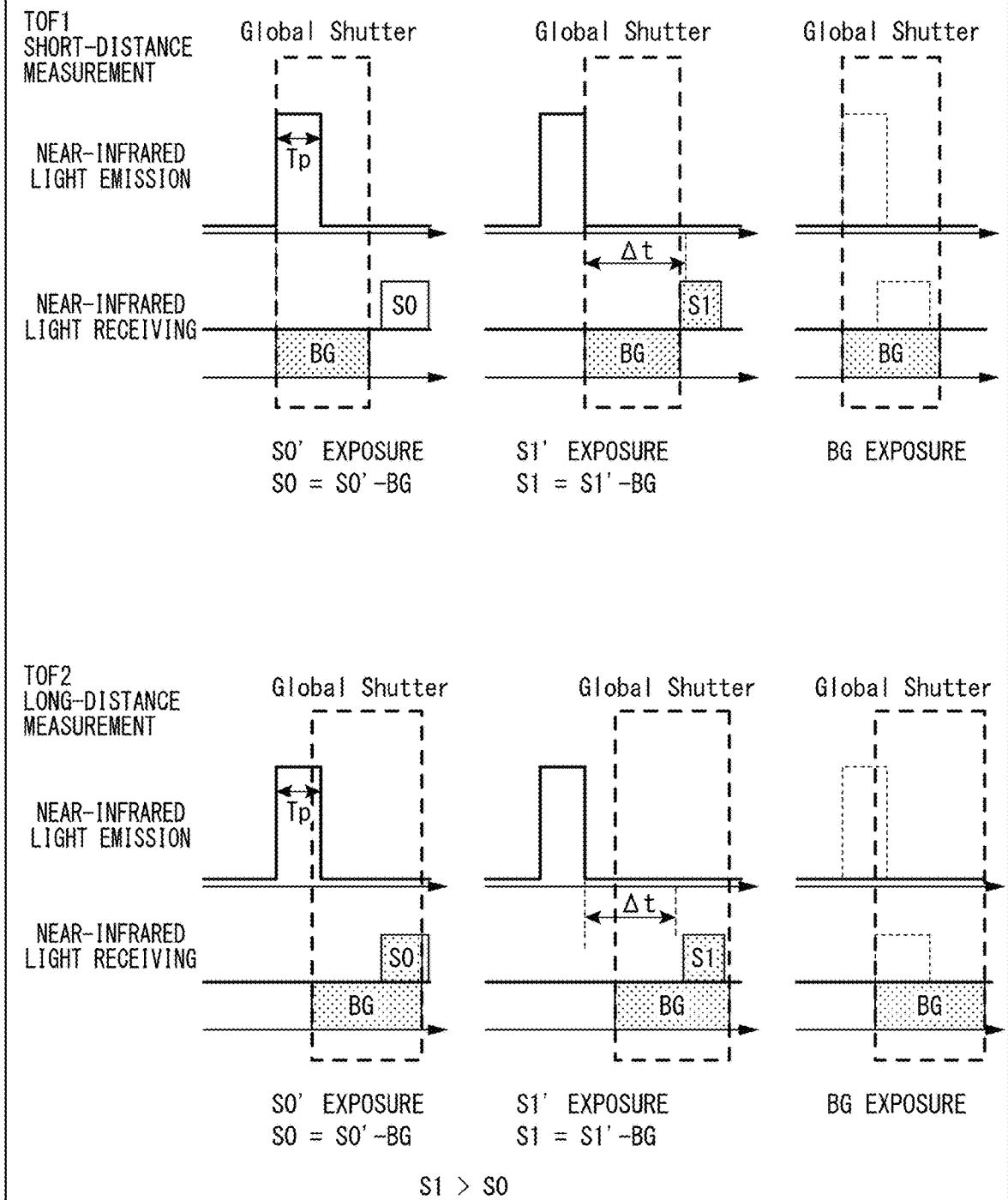
FIG. 17D is a diagram illustrating a timing in an example of the three-dimensional video imaging device 1 according to the fourth embodiment.

FIG. 17A illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=1. FIG. 17B illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=2. FIG. 17C illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=3. FIG. 17D illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=4.

Determination conditions of when AREA [2:0] illustrated in Table 2 are set with reference to the diming drawings illustrated in FIGS. 17A to 17D.

1) When the level S0 of reflection of the infrared light emission at the S0' exposure timing of the second imaging element 12E2 is not zero, and the level S1 of reflection of the infrared light emission at the S1' exposure timing of the second imaging element 12E2 is zero.

$$AREA[2:0] = 0$$

2) When the level S0 of reflection of the infrared light emission at the S0' exposure timing of the third imaging element 12E3 is not zero, the level S1 of reflection of the infrared light emission at the S1' exposure timing of the third imaging element 12E3 is zero, a relationship between the level S0 of reflection of the infrared light emission at the S0' exposure timing of the second imaging element 12E2 and the level S1 of reflection of the infrared light emission at the S1' exposure timing satisfies S0≥S1, and the first distance data Z1 (=S1t1/S0t1+Zoffset) calculated from the data obtained by the second imaging element 12E2 is equal to or less than Far_min (mm).

$$AREA[2:0] = 1$$

3) When the level S0 of reflection of the infrared light emission at the S0' exposure timing of the third imaging element 12E3 is not zero, the level S1 of reflection of the infrared light emission at the S1' exposure timing of the third imaging element 12E3 is not zero, the relationship between the level S0 of reflection of the infrared light emission at the S0' exposure timing of the third imaging element 12E3 and the level S1 of reflection of the infrared light emission at the S1' exposure timing satisfies S0≥S1, the relationship between the level S0 of reflection of the infrared light emission at the S0' exposure timing of the second imaging element 12E2 and the level S1 of reflection of the infrared light emission at the S1' exposure timing satisfies S0≥S1, the first distance data Z1 (=S1t1/S0t1+Zoffset) calculated from data obtained by the second imaging element 12E2 is equal to or greater than Far_min (mm), and the first distance data Z1 (=S1t1/S0t1+Zoffset) calculated from data obtained by the second imaging element 12E2 is equal to or less than Near_max (mm).

$$AREA[2:0] = 2$$

4) When the level S0 of reflection of the infrared light emission at the S0' exposure timing of the third imaging element 12E3 is not zero, the level S1 of reflection of the infrared light emission at the S1' exposure timing of the third imaging element 12E3 is not zero, the relationship between the level S0 of reflection of the infrared light emission at the S0' exposure timing of the third imaging element 12E3 and the level S1 of reflection of the infrared light emission at the S1' exposure timing satisfies S0≥S1, and the first distance data Z1 (=S1t1/S0t1+Zoffset) calculated from data obtained by the second imaging element 12E2 is equal to or greater than Near_max (mm) or S1>S0.

$$\text{AREA}[2:0] = 3$$

5) When the relationship between the level S0 of reflection of the infrared light emission at the S0' exposure timing of the third imaging element 12E3 and the level S1 of reflection of the infrared light emission at the S1' exposure timing satisfies S1>S0.

$$\text{AREA}[2:0] = 4$$

6) Cases other than the aforementioned conditions.

$$\text{AREA}[2:0] = 0$$

Noise included in signals output from the second imaging element 12E2 and the third imaging element 12E3 may be large. In view of that point, the measurement range determination unit 13I may perform processing, which will be described later, in another example of the three-dimensional video imaging device 1 according to the fourth embodiment.

In this example, an adjustable threshold value Zth is set.

1) When the level S0 (=S0'−BG) of reflection of the infrared light emission at the S0' exposure timing of the second imaging element 12E2 is greater than the threshold value Zth, and the level S1 (=S1'−BG) of reflection of the infrared light emission at the S1' exposure timing of the second imaging element 12E2 is equal to or less than the threshold value Zth.

$$\text{AREA}[2:0] = 0$$

2) When the level S0 of reflection of the infrared light emission at the S0' exposure timing of the third imaging element 12E3 is greater than the threshold value Zth, the level S1 of reflection of the infrared light emission at the S1' exposure timing of the third imaging element 12E3 is equal to or less than the threshold value Zth, the level S0 of reflection of the infrared light emission at the S0' exposure timing of the second imaging element 12E2 is equal to or greater than the level S1 of reflection of the infrared light emission at the S1' exposure timing of the second imaging element 12E2 (S0≥S1), and the distance Z between the subject S and the three-dimensional video imaging device 1 obtained by applying the level S0 of reflection of the infrared light emission at the S0' exposure timing of the second imaging element 12E2 and the level S1 of reflection of the infrared light emission at the S1' exposure timing to Expression 1 described above is equal to or less than the long-distance minimum value Far_min (mm).

$$\text{AREA}[2:0] = 1$$

3) When the level S0 of reflection of the infrared light emission at the S0' exposure timing and the level S1 of reflection of the infrared light emission at the S1' exposure timing of the third imaging element 12E3 are greater than the threshold value Zth, the level S0 of reflection of the infrared light emission at the S0' exposure timing of the third imaging element 12E3 is equal to or greater than the level S1 of reflection of the infrared light emission at the S1' exposure timing of the third imaging element 12E3 (S0≥S1), the distance Z between the subject S and the three-dimensional video imaging device 1 obtained by applying the level S0 of reflection of the infrared light emission at the S0' exposure timing of the second imaging element 12E2 and the level S1 of reflection of the infrared light emission at the S1' exposure timing to Expression 1 described above is equal to or greater than the long-distance minimum value Far_min, and the distance Z between the subject S and the three-dimensional video imaging device 1 obtained by applying the level S0 of reflection of the infrared light emission at the S0' exposure timing of the second imaging element 12E2 and the level S1 of reflection of the infrared light emission at the S1' exposure timing to Expression 1 described above is equal to or less than the short-distance maximum value Near_max.

$$\text{AREA}[2:0] = 2$$

4) When the level S0 of reflection of the infrared light emission at the S0' exposure timing of the third imaging element 12E3 and the level S1 of reflection of the infrared light emission at the S1' exposure timing are greater than the threshold value Zth, the level S0 of reflection of the infrared light emission at the S0' exposure timing of the third imaging element 12E3 is equal to or greater than the level S1 of reflection of the infrared light emission at the S1' exposure timing of the third imaging element 12E3 (S0≥S1), and the second distance data Z2 that satisfies the condition that the distance Z between the subject S and the three-dimensional video imaging device 1 obtained by applying the level S0 of reflection of the infrared light emission at the S0' exposure timing and the level S1 of reflection of the infrared light emission at the S1' exposure timing of the second imaging element 12E2 to Expression 1 described above is equal to or greater than the short-distance maximum value Near_max is calculated, or the level S1 of reflection of the infrared light emission at the S1' exposure timing of the second imaging element 12E2 is greater than the level S0 of reflection of the infrared light emission at the S0' exposure timing of the second imaging element 12E2 (S1>S0).

$$\text{AREA}[2:0] = 3$$

5) When the level S0 of reflection of the infrared light emission at the S0' exposure timing of the third imaging element 12E3 is smaller than the level S1 of reflection of the infrared light emission at the S1' exposure timing of the third imaging element 12E3 (S0<S1).

$$\text{AREA}[2:0] = 4$$

6) Cases other than the aforementioned conditions.

$$\text{AREA}[2:0] = 0$$

AREA [2:0] is set under such conditions, and accordingly, the distance data output switching unit 13J (DepthMIX) sets or switches the distance data S1wide/S0wide and outputs the distance data S1wide/S0wide. The distance data S1wide/S0wide is stored once in the second buffer memory 13K2.

The distance data output switching unit 13J (DepthMIX) provides the following output in accordance with the value of AREA [2:0].

When AREA [2:0]=0, the distance data output switching unit 13J determines that measurement is impossible and sets the distance data S1wide/S0wide to zero.

When AREA [2:0]=1, the distance data output switching unit 13J outputs the first distance data Z1.

When AREA [2:0]=2, the distance data output switching unit 13J changes the mixing ratio between the first distance data Z1 and the second distance data Z2 in accordance with the distance and outputs them.

When AREA [2:0]=3, the distance data output switching unit 13J outputs the second distance data Z2.

When AREA [2:0]=4, the distance data output switching unit 13J determines that measurement is impossible and maximize the distance data S1wide/S0wide. In other words, the distance data output switching unit 13J outputs the maximum value that can be taken as the distance data S1wide/S0wide. In a case of a 16-bit integer with no symbol, for example, the distance data output switching unit 13J outputs 65535.

When AREA [2:0]=2, the distance data output switching unit 13J performs mixing at a ratio in proportion to the distance as in Expression 7 at an overlapping part of the measurement range of the second imaging element 12E2 and the measurement range of the third imaging element 12E3 such that gradual switching from the first distance data Z1 to the second distance data Z2 is achieved.

The distance Z obtained from the first distance data Z1 obtained by Expression 1 is defined as Znear.

When AREA [2:0]=2, the distance data S1wide/S0wide is represented by Expression 7 below.

$S1wide/S0wide =$ Expression 7

$(Znear - \text{Far\_min})/(\text{Near\_max} - \text{Far\_min}) \times Z2 +$ $(\text{Near\_max} - Znear)/(\text{Near\_max} - \text{Far\_min}) \times Z1$ To summarize the above description, the distance data output switching unit 13J (DepthMIX) calculates the following expressions and outputs the distance data S1wide/S0wide.

When AREA [2:0]=0, S1wide/S0wide=0.
When AREA [2:0]=1, S1wide/S0wide=Z1.
When AREA [2:0]=2, S1wide/S0wide=(Znear−Far_min)/(Near_max−Far_min)×Z2+ (Near_max−Znear)/(Near_max−Far_min)×Z1
When AREA [2:0]=3, S1wide/S0wide=Z2.
When AREA [2:0]=4, S1wide/S0wide=MAX.

In a case of a 16-bit integer with no symbol, for example, the distance data output switching unit 13J outputs 65535 at the maximum value MAX.

In the example illustrated in FIG. 16, the IR data output switching unit 13L can select the S0*t*1 signal obtained from the second imaging element 12E2 and the S0*t*2 signal obtained from the third imaging element 12E3 in accordance with the AREA [2:0] signal and the IRsel[1:0] signal output from the control unit 13H similarly to the example illustrated in FIG. 1. Also, the S0*t*1 signal is also an infrared video signal of the second imaging element 12E2, and the S0*t*2 signal is also an infrared video signal of the third imaging element 12E3. Therefore, the user of the three-dimensional video imaging device 1 can view how the second imaging element 12E2 and the third imaging element 12E3 actually acquire the IR image produced by the infrared light emitted from the light source unit 11 when the distance data indicating the distance between the three-dimensional video imaging device 1 and the subject S (any of zero when AREA [2:0]=0, the first distance data Z1 when AREA [2:0]=1, the value represented by Expression 7 described above when AREA [2:0]=2, the second distance data Z2 when AREA [2:0]=3, and the maximum value MAX when AREA [2:0]=4 illustrated in Table 2) is acquired.

The IR data output switching unit 13L (IRMIX) switches the S0*t*1 signal and the S0*t*2 signal as follows.

The IRsel[1:0] signal can be set in the control unit 13H by the user of the three-dimensional video imaging device 1, for example, and breakdown of the IRsel[1:0] signal is as follows, for example.

When IRsel[1:0]=0, the IR data output switching unit 13L provides an output as follows in accordance with the AREA [2:0] signal.

When AREA [2:0]=0, the S0*t*1 signal is output.
When AREA [2:0]=1, the S0*t*1 signal is output.
When AREA [2:0]=2, the S0*t*1 signal of the second imaging element 12E2 and the S0*t*2 signal of the third imaging element 12E3 are output with the mixing ratio therebetween changed in accordance with the distance.
When AREA [2:0]=3, the S0*t*2 signal is output.
When AREA [2:0]=4, the S0*t*2 signal is output.
When IRsel[1:0]=1, the S0*t*1 signal is output.
When IRsel[1:0]=2, the S0*t*2 signal is output.
When IRsel[1:0]=0 and AREA [2:0]=2, the S0*t*1 signal of the second imaging element 12E2 and the S0*t*2 signal of the third imaging element 12E3 are output with the mixing ratio thereof changed in accordance with the distance as in Expression 8 below.

$IRmix = (Znear - \text{Far\_min})/(\text{Near\_max} - \text{Far\_min}) \times S0t2 +$ Expression 8

$(\text{Near\_max} - Znear)/(\text{Near\_max} - \text{Far\_min}) \times S0t1$

In this manner, the infrared images acquired by the second imaging element 12E2 and the third imaging element 12E3 are appropriately switched or mixed and are then output such that the connected part between the second imaging element 12E2 and the third imaging element 12E3 is not noticeable.

Fifth Embodiment

Hereinafter, a fifth embodiment of a three-dimensional video imaging device according to the present invention will be described.

A three-dimensional video imaging device 1 according to the fifth embodiment is configured similarly to the three-dimensional video imaging device 1 according to the aforementioned first embodiment other than the points, which will be described later. Therefore, according to the three-dimensional video imaging device 1 in the fifth embodiment, it is possible to achieve effects similar to those of the three-dimensional video imaging device 1 according to the aforementioned first embodiment other than the points, which will be described later.

As described above, according to the three-dimensional video imaging device 1 in the first embodiment, the short-distance maximum value Near_max and the long-distance minimum value Far_min are equal to each other.

On the other hand, according to the three-dimensional video imaging device 1 in the fifth embodiment, the short-distance maximum value Near_max is smaller than the long-distance minimum value Far_min.

In the three-dimensional video imaging device 1 according to the fifth embodiment, the measurement range determination unit 13I determines at least which of the short range Near_min to Near_max, the long range Far_min to Far_max, and the range Near_max to Far_min that is greater than the short-distance maximum value Near_max and is smaller than the long-distance minimum value Far_min the distance between the three-dimensional video imaging device 1 and the subject S measured by three-dimensional video imaging device 1 is included in on the basis of a signal indicating the electric charge accumulated in the first part 12E21 of the second imaging element 12E2, a signal indicating the electric charge accumulated in the second part 12E22 of the second imaging element 12E2, a signal indicating the electric charge accumulated in the third part 12E23 of the second imaging element 12E2, a signal indicating the electric charge accumulated in the first part 12E31 of the third imaging element 12E3, a signal indicating the electric charge accumulated in the second part 12E32 of the third imaging element 12E3, a signal indicating the electric charge accumulated in the third part 12E33 of the third imaging element 12E3, and a preset determination rule illustrated in Table 3.

13I determines that the distance between the three-dimensional video imaging device 1 and the subject S measured by the three-dimensional video imaging device 1 is included in the long range Far_min to Far_max, and outputs zero as the distance data in a case where the measurement range determination unit 13I determines that the distance between the three-dimensional video imaging device 1 and the subject S measured by the three-dimensional video imaging device 1 is included in the range Near_max to Far_min that is greater than the short-distance maximum value Near_max and is smaller than the long-distance minimum value Far_min.

FIGS. 18A to 18D are diagrams illustrating timings in an example of the three-dimensional video imaging device 1 according to the fifth embodiment.

In the example illustrated in FIGS. 18A to 18D, since Near_max−Near_min<Far_max−Far_min, the light emission period Tp of the light source unit 11 is obtained as follows on the basis of Far_max−Far_min (=3000 (mm)).

$$Tp = 3000/C + h = 12.00 \text{ nsec}$$

$$C: \text{speed of light} (3 \times 10^{11} [\text{mm/s}])$$

h: amount of pulse inclination correction (here, this is assumed to be 2 [nsec].)

The offset time Toffset is 2×(Near_min−Near_min×0.01)/C, while the offset time Toffset2 is obtained as follows.

If a difference between the short-distance maximum value Near_max and the long-distance minimum value Far_min is defined as sd2 (=Far_min−Near_max), the offset time Toffset2 is obtained by the following expression.

$$Toffset2 = 2 \times (\text{Near\_max} + sd2 - (\text{Near\_max} + sd2) \times 0.01)/C$$

Next, the measurement range determination unit 13I determines which of the short distance measurement range and the long distance measurement range the distance

TABLE 3

| Measurement range | Details | AREA[2:0] |
|---|---|---|
| 0 to Near_min (mm) | A distance that is shorter than the short-distance measurement range | 0 |
| Near_min to Near_min (mm) | A short-distance measurement range | 1 |
| Near_min to Far_min (mm) | Between a short-distance measurement range and a long-distance measurement range | 2 |
| Far_min to Far_max (mm) | A long-distance measurement range | 3 |
| Far_max (mm) or more | A distance that is further than the long-distance measurement range | 4 |

In the three-dimensional video imaging device 1 according to the fifth embodiment, the distance data output switching unit 13J outputs the first distance data Z1 (=S1t1/S0t1+Zoffset) calculated by the first distance data calculation unit 13F in a case where the measurement range determination unit 13I determines that the distance between the three-dimensional video imaging device 1 and the subject S measured by the three-dimensional video imaging device 1 is included in the short range Near_min to Near_max, outputs the second distance data Z2 (=S1t2/S0t2+Zoffset2) calculated by the second distance data calculation unit 13G in a case where the measurement range determination unit between the subject S corresponding to the pixel on which distance measurement is being currently performed and the three-dimensional video imaging device 1 is included in, and the distance data output switching unit 13J switches an output of the first distance data Z1 and an output of the second distance data Z2 in accordance with the determination result of the measurement range determination unit 13I. As a result, the distance data S1wide/S0wide in proportion to the distance between the two ranges, which cannot be obtained by one TOF sensor, is obtained. The measurement range determination unit 13I performs the determination on the basis of the determination rule illustrated in Table 3 and outputs a 3-bit signal of AREA [2:0].

Figure 18A:
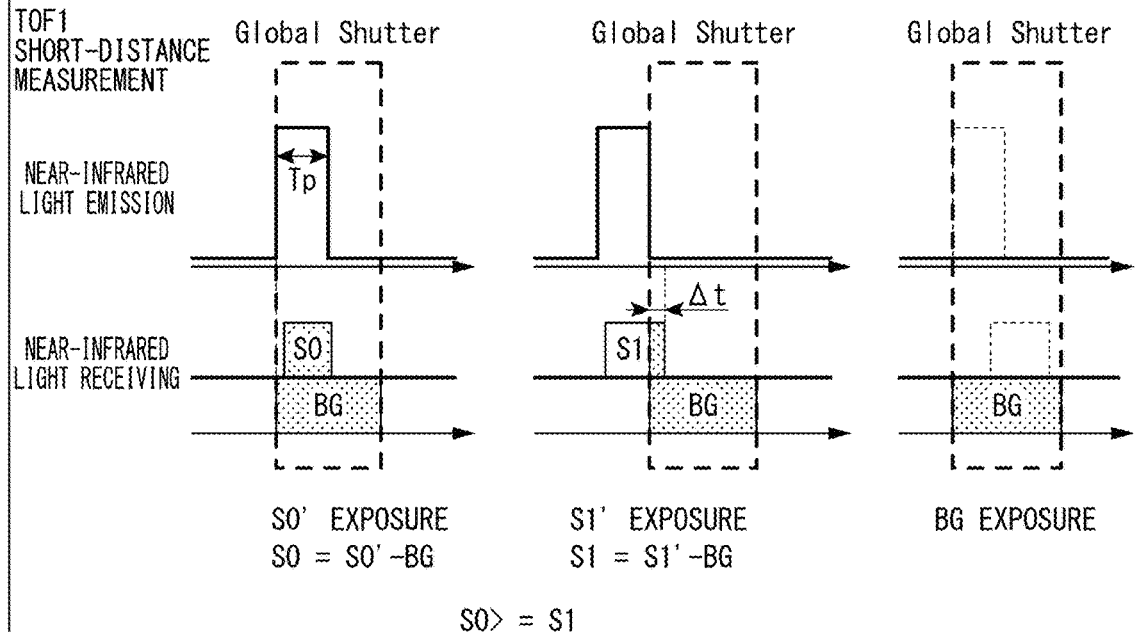
FIG. 18A is a diagram illustrating a timing in an example of a three-dimensional video imaging device 1 according to a fifth embodiment.
Figure 18A:
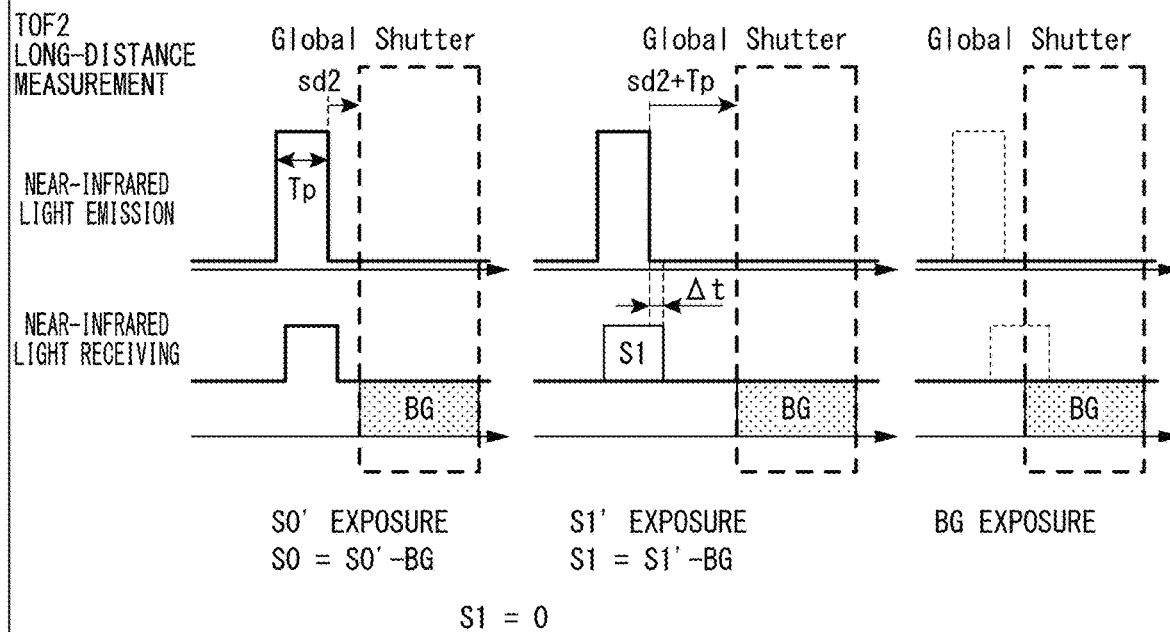
Figure 18B:
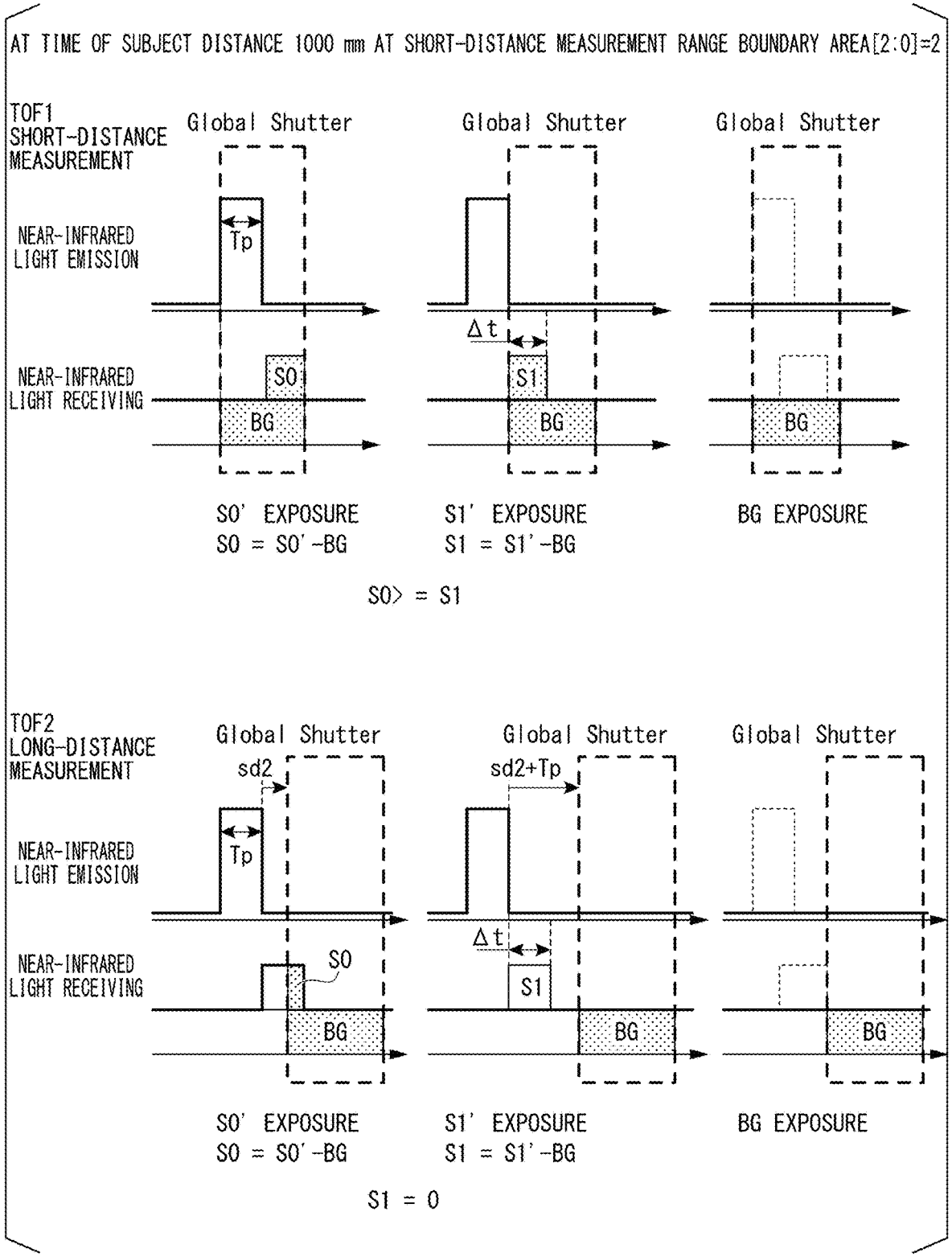
FIG. 18B is a diagram illustrating a timing in an example of the three-dimensional video imaging device 1 according to the fifth embodiment.
Figure 18C:
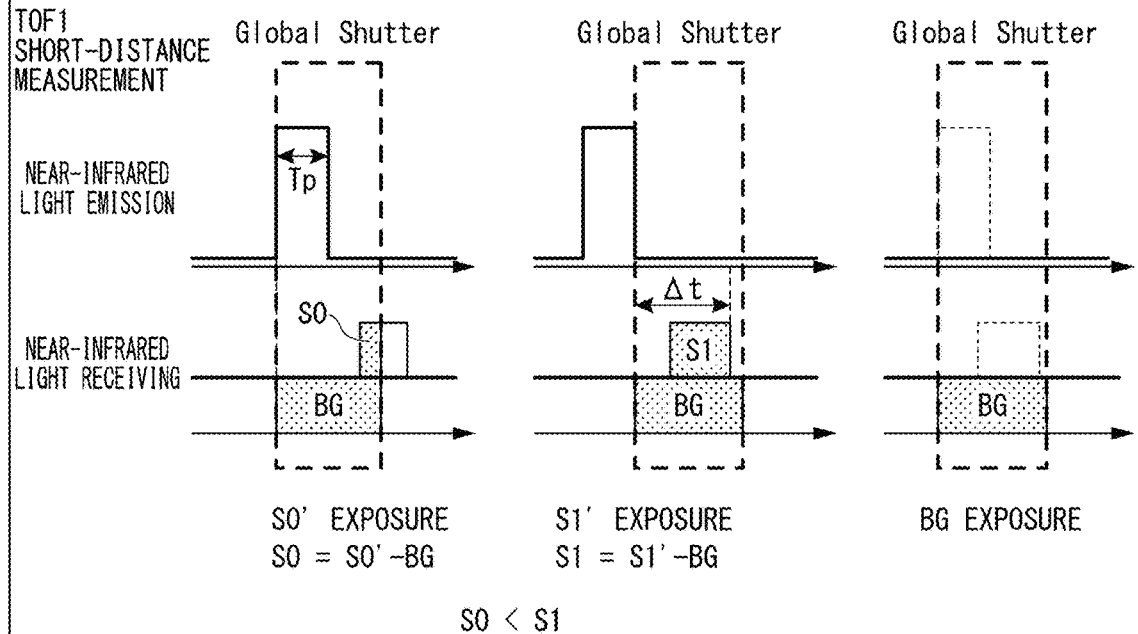
FIG. 18C is a diagram illustrating a timing in an example of the three-dimensional video imaging device 1 according to the fifth embodiment.
Figure 18C:
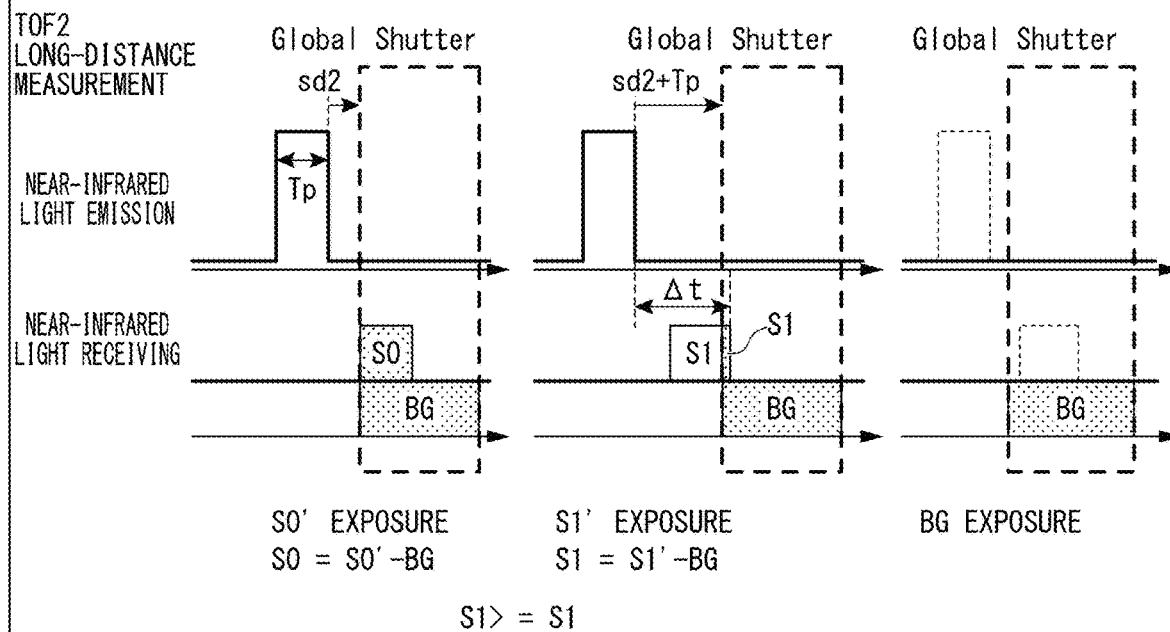
Figure 18D:
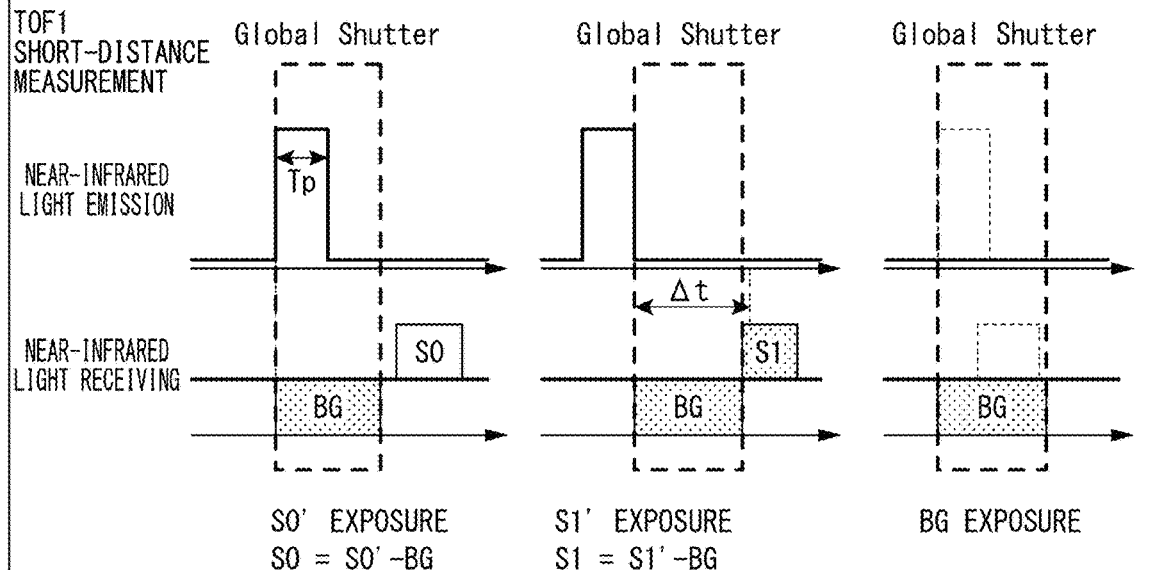
FIG. 18D is a diagram illustrating a timing in an example of the three-dimensional video imaging device 1 according to the fifth embodiment.
Figure 18D:
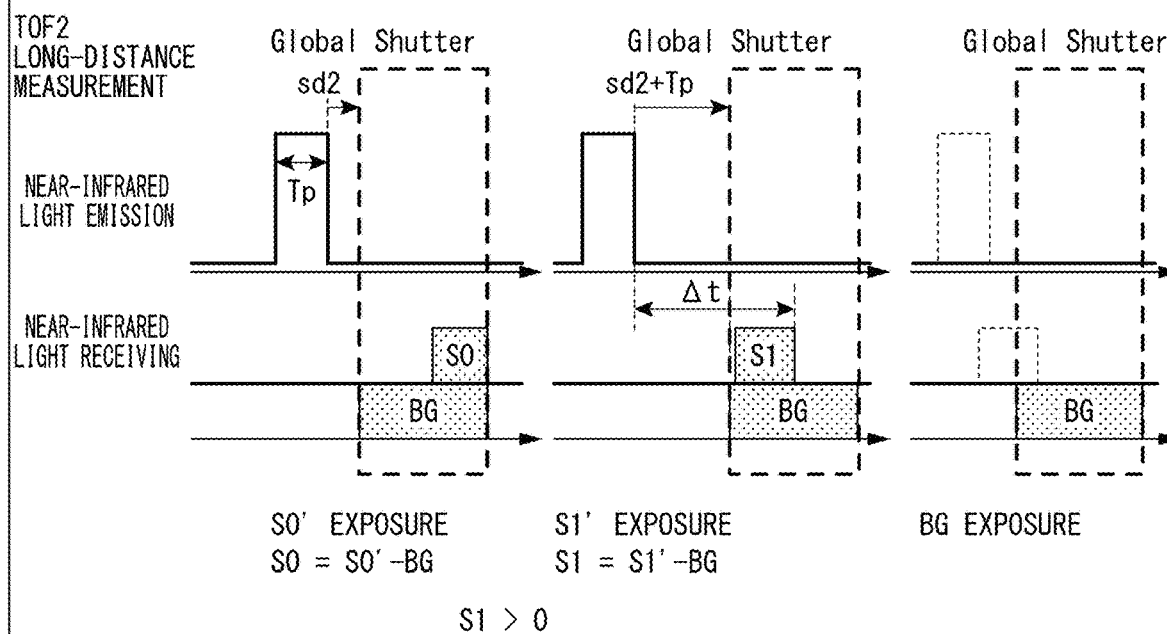

FIG. 18A illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=1. FIG. 18B illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=2. FIG. 18C illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=3. FIG. 18D illustrates the light emission period Tp of the light source unit 11, the first exposure timing (S0' exposure timing), the second exposure timing (S1' exposure timing), and the third exposure timing (BG exposure timing) of the second imaging element 12E2, and the first exposure timing (S0' exposure timing), the second exposure timing (S1' exposure timing), and the third exposure timing (BG exposure timing) of the third imaging element 12E3 when AREA [2:0]=4.

The determination conditions of AREA [2:0] illustrated in Table 3 are set with reference to the timing drawings illustrated in FIGS. 18A to 18D.

1) When the level S0 of reflection of the infrared light emission at the S0' exposure timing of the second imaging element 12E2 is not zero, and the level S1 of reflection of the infrared light at the S1' exposure timing of the second imaging element 12E2 is zero.

$$AREA[2:0] = 0$$

2) When the level S1 of reflection of the infrared light emission at the S1' exposure timing of the third imaging element 12E3 is zero, the relationship between the level S0 of reflection of the infrared light emission at the S0' exposure timing of the second imaging element 12E2 and the level S1 of reflection of the infrared light emission at the S1' exposure timing is S0≥S1, and the first distance data (=S1$t$1/S0$t$1+Zoffset) calculated from data obtained by the second imaging element 12E2 is equal to or less than Near_max (mm).

$$AREA[2:0] = 1$$

3) When the level S0 of reflection of the infrared light emission at the S0' exposure timing of the third imaging element 12E3 is not zero, the level S1 of reflection of the infrared light emission at the S1' exposure timing of the third imaging element 12E3 is not zero, the relationship between the level S0 of reflection of the infrared light emission at the S0' exposure timing of the third imaging element 12E3 and the level S1 of reflection of the infrared light emission at the S1' exposure timing is S0≥S1, and the second distance data Z2 (=S1$t$2/S0$t$2+Zoffset2) calculated from data obtained by the third imaging element 12E3 is equal to or greater than Far_min (mm).

$$AREA[2:0] = 3$$

4) When the level S0 of reflection of the infrared light emission at the S0' exposure timing of the second imaging element 12E2 is zero, the level S1 of reflection of the infrared light emission at the S1' exposure timing of the second imaging element 12E2 is zero, and the relationship between the level S0 of reflection of the infrared light emission at the S0' exposure timing and the level S1 of reflection of the infrared light emission at the S1' exposure timing of the third imaging element 12E3 is S1>S0.

$$AREA[2:0] = 4$$

5) Cases other than the above conditions.

$$AREA[2:0] = 2$$

Noise included in the signals output from the second imaging element 12E2 and the third imaging element 12E3 may be large. In view of that point, the measurement range determination unit 13I may perform processing, which will be described later, in another example of the three-dimensional video imaging device 1 according to the fifth embodiment.

In this example, an adjustable threshold value Zth is set.
1) When the level S0 (=S0'−BG) of reflection of the infrared light emission at the S0' exposure timing of the second imaging element 12E2 is greater than the threshold value Zth, and the level S1 (=S1'−BG) of reflection of the infrared light emission at the S1' exposure timing of the second imaging element 12E2 is smaller than the threshold value Zth.

$$AREA[2:0] = 0$$

2) When the level S1 of reflection of the infrared light emission at the S1' exposure timing of the third imaging element 12E3 is smaller than the threshold value Zth, the level S0 of reflection of the infrared light emission at the S0' exposure timing of the second imaging element 12E2 is equal to or greater than the level S1 of reflection of the infrared light emission at the S1' exposure timing of the second imaging element 12E2 (S0≥S1), and the distance Z between the subject S and the three-dimensional video imaging device 1 obtained by applying the level S0 of reflection of the infrared light emission at the S0' exposure timing and the level S1 of reflection of the infrared light emission at the S1' exposure timing of the second imaging element 12E2 to Expression 1 described above is equal to or less than the short-distance maximum value Near_max (mm).

$$AREA[2:0] = 1$$

3) When the level S0 of reflection of the infrared light emission at the S0' exposure timing and the level S1 of reflection of the infrared light emission at the S1' exposure timing of the third imaging element 12E3 are greater than the threshold value Zth, the level S0 of reflection of the infrared light emission at the S0' exposure timing of the third imaging element 12E3 is equal to or greater than the level S1 of reflection of the infrared light emission at the S1' exposure timing of the third imaging element 12E3 (S0≥S1), and the distance Z between the subject S and the three-dimensional video imaging device 1 obtained by applying the level S0 of reflection of the infrared light emission at the S0' exposure timing and the level S1 of reflection of the infrared light emission at the S1' exposure timing of the third imaging element 12E3 to Expression 1 described above is equal to or greater than the long-distance minimum value Far_min.

$$AREA[2:0] = 3$$

4) When the level S0 of reflection of the infrared light emission at the S0' exposure timing and the level S1 of reflection of the infrared light emission at the S1' exposure timing of the second imaging element 12E2 are smaller than the threshold value Zth, and the level S0 of reflection of the infrared light emission at the S0' exposure timing of the third imaging element 12E3 is smaller than the level S1 of reflection of the infrared light emission at the S1' exposure timing of the third imaging element 12E3 (S0<S1).

$$AREA[2:0] = 4$$

5) Cases other than the above conditions.

$$AREA[2:0] = 2$$

AREA [2:0] is set under such conditions, and accordingly, the distance data output switching unit 13J sets or switches the distance data S1wide/S0wide and outputs the distance data S1wide/S0wide. The distance data S1wide/S0wide is stored once in the second buffer memory 13K2.

In the example of the three-dimensional video imaging device 1 according to the fifth embodiment, the IR data output switching unit 13L can select the S0t1 signal obtained from the second imaging element 12E2 and the S0t2 signal obtained from the third imaging element 12E3 in accordance with the AREA [2:0] signal and the IRsel[1:0] signal output from the control unit 13H. Also, the S0t1 signal is also an infrared video signal of the second imaging element 12E2, and the S0t2 signal is also an infrared video signal of the third imaging element 12E3. Therefore, the user of the three-dimensional video imaging device 1 can view how the second imaging element 12E2 and the third imaging element 12E3 actually acquires an IR image produced by the infrared light emitted from the light source unit 11 when the distance data indicating the distance between the three-dimensional video imaging device 1 and the subject S (any of zero when AREA [2:0]=0, the first distance data Z1 when AREA [2:0]=1, zero when AREA [2:0]=2, the second distance data Z2 when AREA [2:0]=3, and the maximum value MAX when AREA [2:0]=4) is acquired from the three-dimensional video imaging device 1.

The IRsel[1:0] signal can be set in the control unit 13H by the user of the three-dimensional video imaging device 1, for example, and breakdown of the IRsel[1:0] signal is as follows, for example.

When IRsel[1:0]=0, the IR data output switching unit 13L provides an output as follows in accordance with the AREA [2:0] signal.
 When AREA [2:0]=0, the S0t1 signal is output.
 When AREA [2:0]=1, the S0t1 signal is output.
 When AREA [2:0]=2, zero is output.
 When AREA [2:0]=3, the S0t2 signal is output.
 When AREA [2:0]=4, the S0t2 signal is output.
When IRsel[1:0]=1, the IR data output switching unit 13L constantly outputs the S0t1 signal.
When IRsel[1:0]=2, the IR data output switching unit 13L constantly outputs the S0t2 signal.

In an example of the three-dimensional video imaging device 1 according to the fifth embodiment, the output signal from the IR data output switching unit 13L is handled as a monochrome IR video signal, black level adjustment is performed by the black level unit 13M1 of the IR data processing unit 13M, video gamma is applied by the gamma unit 13M2 of the IR data processing unit 13M, and the signal is temporarily stored in the third buffer memory 13K3 of the storage unit 13K.

Although modes for carrying out the present invention have been described using the embodiments, the present invention is not limited to such embodiments at all, and various modifications and replacements can be added without departing from the gist of the present invention. Configurations in each of the embodiments and examples may be appropriately combined.

REFERENCE SIGNS LIST

1 Three-dimensional video imaging device
11 Light source unit
12 three-chip imaging element unit
12A Lens
12B1 First prism
12B2 Second prism
12B3 Third prism
12C Reflection dichroic film
12D Half mirror
12E1 First imaging element
12E2 Second imaging element
12E21 First part
12E22 Second part
12E23 Third part
12E3 Third imaging element
12E31 First part
12E32 Second part
12E33 Third part
12F Infrared cut filter
12G1 Infrared 850 nm band pass filter
12G2 Infrared 850 nm band pass filter
13 Processing unit 13A Emission control unit
13A1 Light source unit drive control unit
13A2 Light source unit light emission control pulse setting unit
13B First imaging element control unit
13B1 First imaging element drive control unit
13B2 First imaging element drive control pulse setting unit
13C Second imaging element control unit
13C1 Second imaging element drive control unit
13C2 Second imaging element drive control pulse setting unit
13D Third imaging element control unit
13D1 Third imaging element drive control unit
13D2 Third imaging element drive control pulse setting unit
13E RGB camera process processing unit
13E1 Interface unit
13E2 Black balance unit
13E3 Debayer unit
13E4 Color matrix unit
13E5 Gamma unit
13E6 YCbCr conversion unit
13E7 Low pass filter
13E8 Multiplexing unit
13F First distance data calculation unit
13F1 Interface unit
13F2 Delay circuit
13F3 Delay circuit
13F4 Delay circuit
13F5 Timing adjustment unit
13F6 Timing adjustment unit
13F7 Subtraction unit
13F8 Subtraction unit
13F9 Computation unit
13FX Addition unit
13G Second distance data calculation unit
13G1 Interface unit
13G2 Horizontal inverting unit
13G3 Horizontal inverting unit
13G4 Horizontal inverting unit
13G5 Timing adjustment unit
13G6 Timing adjustment unit
13G7 Subtraction unit
13G8 Subtraction unit
13G9 Computation unit
13GX Addition unit
13H Control unit
13I Measurement range determination unit
13J Distance data output switching unit
13K Storage unit
13K1 First buffer memory
13K2 Second buffer memory
13K3 Third buffer memory
13L IR data output switching unit
13M IR data processing unit
13M1 Black level unit
13M2 Gamma unit
13N Output mixing unit
13P Output interface unit
S Subject

The invention claimed is:

1. A three-dimensional video imaging device comprising:
a light source unit configured to irradiate a subject with infrared light;
a three-chip imaging element unit on which reflected light of the infrared light emitted by the light source unit and reflected by the subject and reflected light of visible light from the subject are incident; and
a processing unit configured to perform control of the light source unit and the three-chip imaging element unit and processing of a signal output from the three-chip imaging element unit,
wherein the three-chip imaging element unit includes
a first prism on which the infrared light and the visible light from the subject are incident,
a reflection dichroic film configured to reflect the visible light and transmit the infrared light out of the infrared light and the visible light that have been incident on the first prism,
a first imaging element configured to receive the visible light reflected by the reflection dichroic film,
a second prism on which the infrared light transmitted by the reflection dichroic film is incident,
a half mirror configured to reflect a part of the infrared light that has been incident on the second prism and transmit a remainder of the infrared light that has been incident on the second prism,
a third prism on which the infrared light transmitted by the half mirror is incident,
one of a second imaging element and a third imaging element configured to receive the infrared light transmitted by the half mirror, and
the other one of the second imaging element and the third imaging element configured to receive the infrared light reflected by the half mirror,
the second imaging element is a short-range time-of-flight (TOF) sensor used to measure a short range, which is a distance range from a short-distance minimum value to a short-distance maximum value,
the third imaging element is a long-range TOF sensor used to measure a long range, which is a distance range that is further than the short range and is a distance range from a long-distance minimum value to a long-distance maximum value,
the second imaging element includes
a first part configured to accumulate an electric charge at a first exposure timing of the second imaging element, which is an exposure timing of the second imaging element, at least most of a light emission period of the light source unit being included in an exposure period of the second imaging element, and
a second part configured to accumulate an electric charge at a second exposure timing of the second imaging element, which is an exposure timing of the second imaging element, the exposure period of the second imaging element starting after the light emission period of the light source unit ends,
a third imaging element includes
a first part configured to accumulate an electric charge at a first exposure timing of the third imaging element, which is an exposure timing of the third imaging element, at least a part of the exposure period of the light source unit being included in an exposure period of the third imaging element, and
a second part configured to accumulate an electric charge at a second exposure timing of the third imaging element, which is an exposure timing of the third imaging element, the exposure period of the third imaging element starting after the light emission period of the light source unit ends,
the processing unit includes
an emission control unit configured to perform light emission control of the light source unit, a second imaging element control unit configured to control the exposure timing of the second imaging element, a third imaging element control unit configured to control the exposure timing of the third imaging element, a first distance data calculation unit configured to calculate first distance data indicating a distance between the three-dimensional video imaging device and the subject on the basis of at least the electric charge accumulated in the first part of the second imaging element and the electric charge accumulated in the second part of the second imaging element, a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element, a measurement range determination unit configured to determine at least which of the short range and the long range the distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and a distance data output switching unit configured to output the first distance data calculated by the first distance data calculation unit in a case where the measurement range determination unit determines that the distance between the three-dimensional video imaging device and the subject measured by the three-dimensional video imaging device is included in the short range and output the second distance data calculated by the second distance data calculation unit in a case where the measurement range determination unit determines that the distance between the three-dimensional video imaging device and the subject measured by the three-dimensional video imaging device is included in the long range.

2. The three-dimensional video imaging device according to claim 1, wherein the first imaging element is a color imaging element, the second imaging element and the third imaging element have functions as infrared imaging elements, and the processing unit includes an RGB camera process processing unit configured to generate an RGB video from a signal output by the first imaging element, an IR data output switching unit configured to output a short-range infrared image captured by the second imaging element in the case where the measurement range determination unit determines that the distance between the three-dimensional video imaging device and the subject measured by the three-dimensional video imaging device is included in the short range and output a long-range infrared image captured by the third imaging element in the case where the measurement range determination unit determines that the distance between the three-dimensional video imaging device and the subject measured by the three-dimensional video imaging device is included in the long range, and an output mixing unit configured to output at least either the first distance data or the second distance data output from the distance data output switching unit, the RGB video generated by the RGB camera process processing unit, and an IR video generated from the short-range infrared image or the long-range infrared image output from the IR data output switching unit in a synchronized manner.

3. The three-dimensional video imaging device according to claim 1, wherein a transmittance of the half mirror is smaller than 50% in a case where the second imaging element receives the infrared light transmitted by the half mirror, and the transmittance of the half mirror is greater than 50% in a case where the third imaging element receives the infrared light transmitted by the half mirror.

4. The three-dimensional video imaging device according to claim 1, wherein the second imaging element control unit starts the exposure period corresponding to the first exposure timing of the second imaging element at a timing when an offset time based on the short-distance minimum value has elapsed from a start timing of the light emission period of the light source unit, and starts the exposure period corresponding to the second exposure timing of the second imaging element at a timing when the offset time based on the short-distance minimum value has elapsed from an end timing of the light emission period of the light source unit, and the third imaging element control unit starts the exposure period corresponding to the first exposure timing of the third imaging element and set within the same frame as the exposure period corresponding to the first exposure timing of the second imaging element, at a timing when an offset time based on the long-distance minimum value has elapsed from the start timing of the light emission period of the light source unit, and starts the exposure period corresponding to the second exposure timing of the third imaging element and set within the same frame as the exposure period corresponding to the second exposure timing of the second imaging element, at a timing when the offset time based on the long-distance minimum value has elapsed from the end timing of the light emission period of the light source unit.

5. A three-dimensional video imaging device comprising:

a light source unit configured to irradiate a subject with infrared light;

a three-chip imaging element unit on which reflected light of the infrared light emitted by the light source unit and reflected by the subject and reflected light of visible light from the subject are incident; and a processing unit configured to perform control of the light source unit and the three-chip imaging element unit and processing of a signal output from the three-chip imaging element unit, wherein the three-chip imaging element unit includes
a first prism on which the infrared light and the visible light from the subject are incident,
a reflection dichroic film configured to reflect the visible light and transmit the infrared light out of the infrared light and the visible light that have been incident on the first prism,
a first imaging element configured to receive the visible light reflected by the reflection dichroic film,
a second prism on which the infrared light transmitted by the reflection dichroic film is incident,
a half mirror configured to reflect a part of the infrared light that has been incident on the second prism and transmit a remainder of the infrared light that has been incident on the second prism,
a third prism on which the infrared light transmitted by the half mirror is incident,
one of a second imaging element and a third imaging element configured to receive the infrared light transmitted by the half mirror, and
the other one of the second imaging element and the third imaging element configured to receive the infrared light reflected by the half mirror,
the second imaging element is a short-range time-of-flight (TOF) sensor used to measure a distance range from a short-distance minimum value to a short-distance maximum value,
the third imaging element is a long-range TOF sensor used to measure a distance range, which is a distance range that is further than the distance range from the short-distance minimum value to the short-distance maximum value and is a distance range from a long-distance minimum value to a long-distance maximum value,
a part of the distance range from the short-distance minimum value to the short-distance maximum value and a part of the distance range from the long-distance minimum value to the long-distance maximum value overlap with each other and configure an overlapping measurement range,
a range obtained by excluding the overlapping measurement range from the distance range from the short-distance minimum value to the short-distance maximum value is a short-distance measurement range,
a range obtained by excluding the overlapping measurement range from the distance range from the long-distance minimum value to the long-distance maximum value is a long-distance measurement range,
the second imaging element includes
a first part configured to accumulate an electric charge at a first exposure timing of the second imaging element, which is an exposure timing of the second imaging element, at least most of a light emission period of the light source unit being included in an exposure period of the second imaging element, and
a second part configured to accumulate an electric charge at a second exposure timing of the second imaging element, which is an exposure timing of the second imaging element, the exposure period of the second imaging element starting after the light emission period of the light source unit ends,
the third imaging element includes
a first part configured to accumulate an electric charge at a first exposure timing of the third imaging element, which is an exposure timing of the third imaging element, at least a part of the exposure period of the light source unit being included in an exposure period of the third imaging element, and
a second part configured to accumulate an electric charge at a second exposure timing of the third imaging element, which is an exposure timing of the third imaging element, the exposure period of the third imaging element starting after the light emission period of the light source unit ends,
the processing unit includes
an emission control unit configured to perform light emission control of the light source unit,
a second imaging element control unit configured to control the exposure timing of the second imaging element,
a third imaging element control unit configured to control the exposure timing of the third imaging element,
a first distance data calculation unit configured to calculate first distance data indicating a distance between the three-dimensional video imaging device and the subject on the basis of at least the electric charge accumulated in the first part of the second imaging element and the electric charge accumulated in the second part of the second imaging element,
a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element,
a measurement range determination unit configured to determine at least which of the short-distance measurement range, the overlapping measurement range, and the long-distance measurement range the distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and
a distance data output switching unit configured to output the first distance data calculated by the first distance data calculation unit in a case where the measurement range determination unit determines that the distance between the three-dimensional video imaging device and the subject measured by the three-dimensional video imaging device is included in the short-distance measurement range, output the second distance data calculated by the second distance data calculation unit in a case where the measurement range determination unit determines that the distance between the three-dimensional video imaging device and the subject measured by the three-dimensional video imaging device is included in the long-distance measurement range, and mix and output the first distance data calculated by the first distance data calculation unit and the second distance data calculated by the distance data calculation unit in a case where the measurement range determination unit determines that the distance between the three-dimensional video imaging device and the subject measured by the three-dimensional video imaging device is included in the overlapping measurement range.

6. A three-dimensional video imaging device comprising:
a light source unit configured to irradiate a subject with infrared light;
a three-chip imaging element unit on which reflected light of the infrared light emitted by the light source unit and reflected by the subject and reflected light of visible light from the subject are incident; and
a processing unit configured to perform control of the light source unit and the three-chip imaging element unit and processing of a signal output from the three-chip imaging element unit,
wherein the three-chip imaging element unit includes
a first prism on which the infrared light and the visible light from the subject are incident,
a reflection dichroic film configured to reflect the visible light and transmit the infrared light out of the infrared light and the visible light that have been incident on the first prism,
a first imaging element configured to receive the visible light reflected by the reflection dichroic film,
a second prism on which the infrared light transmitted by the reflection dichroic film is incident,
a half mirror configured to reflect a part of the infrared light that has been incident on the second prism and transmit a remainder of the infrared light that has been incident on the second prism,
a third prism on which the infrared light transmitted by the half mirror is incident,
one of a second imaging element and a third imaging element configured to receive the infrared light transmitted by the half mirror, and
the other one of the second imaging element and the third imaging element configured to receive the infrared light reflected by the half mirror,
the second imaging element is a short-range time-of-flight (TOF) sensor used to measure a short range, which is a distance range from a short-distance minimum value to a short-distance maximum value,
the third imaging element is a long-range TOF sensor used to measure a long range, which is a distance range that is further than the short range and is a distance range from a long-distance minimum value to a long-distance maximum value,
the short-distance maximum value is smaller than the long-distance minimum value,
the second imaging element includes
a first part configured to accumulate an electric charge at a first exposure timing of the second imaging element, which is an exposure timing of the second imaging element, at least most of a light emission period of the light source unit being included in an exposure period of the second imaging element, and
a second part configured to accumulate an electric charge at a second exposure timing of the second imaging element, which is an exposure timing of the second imaging element, the exposure period of the second imaging element starting after the light emission period of the light source unit ends,
the third imaging element includes
a first part configured to accumulate an electric charge at a first exposure timing of the third imaging element, which is an exposure timing of the third imaging element, at least a part of the light emission period of the light source unit being included in an exposure period of the third imaging element, and
a second part configured to accumulate an electric charge at a second exposure timing of the third imaging element, which is an exposure timing of the third imaging element, the exposure period of the third imaging element starting after the light emission period of the light source unit ends, and
the processing unit includes
an emission control unit configured to perform light emission control of the light source unit,
a second imaging element control unit configured to control the exposure timing of the second imaging element,
a third imaging element control unit configured to control the exposure timing of the third imaging element,
a first distance data calculation unit configured to calculate first distance data indicating a distance between the three-dimensional video imaging device and the subject on the basis of at least the electric charge accumulated in the first part of the second imaging element and the electric charge accumulated in the second part of the second imaging element,
a second distance data calculation unit configured to calculate second distance data indicating the distance between the three-dimensional video imaging device and the subject on the basis of at least the electric charge accumulated in the first part of the third imaging element and the electric charge accumulated in the second part of the third imaging element,
a measurement range determination unit configured to determine at least which of the short range, the long range, and a range that is greater than the short-distance maximum value and is smaller than the long-distance minimum value the distance between the three-dimensional video imaging device and the subject measured by the three-dimensional video imaging device is included in on the basis of at least a signal indicating the electric charge accumulated in the first part of the second imaging element, a signal indicating the electric charge accumulated in the second part of the second imaging element, a signal indicating the electric charge accumulated in the first part of the third imaging element, a signal indicating the electric charge accumulated in the second part of the third imaging element, and a preset determination rule, and
a distance data output switching unit configured to output the first distance data calculated by the first distance data calculation unit in a case where the measurement range determination unit determines that the distance between the three-dimensional video imaging device and the subject measured by the three-dimensional video imaging device is included in the short range, output the second distance data calculated by the second distance data calculation unit in a case where the measurement range determination unit determines that the distance between the three-dimensional video imaging device and the subject measured by the three-dimensional video imaging device is included in the long range, and output zero as distance data in a case where the measurement range determination unit determines that the distance between the three-dimensional video imaging device and the subject measured by the three-dimensional video imaging device is included in the range that is greater than the short-distance maximum value and is smaller than the long-distance minimum value.

\* \* \* \* \*